US012442975B2

(12) United States Patent
Amezcua-Correa et al.

(10) Patent No.: US 12,442,975 B2
(45) Date of Patent: Oct. 14, 2025

(54) ANTI-RESONANT HOLLOW-CORE FIBERS FEATURING SUPPORT STRUCTURES

(71) Applicant: University of Central Florida Research Foundation, Inc., Orlando, FL (US)

(72) Inventors: Rodrigo Amezcua-Correa, Orlando, FL (US); Jose Enrique Antonio-Lopez, Orlando, FL (US); Stephanos Yerolatsitis, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/883,631

(22) Filed: Sep. 12, 2024

(65) Prior Publication Data
US 2025/0004192 A1    Jan. 2, 2025

Related U.S. Application Data

(63) Continuation of application No. 18/662,573, filed on May 13, 2024.
(Continued)

(51) Int. Cl.
*G02B 6/032*     (2006.01)
*C03B 37/012*    (2006.01)
(Continued)

(52) U.S. Cl.
CPC .......... *G02B 6/032* (2013.01); *C03B 37/0122* (2013.01); *C03B 37/0256* (2013.01);
(Continued)

(58) Field of Classification Search
CPC ............... G02B 6/02328; G02B 6/02371; G02B 6/032; G02B 6/036; C03B 37/0122; C03B 2203/42
See application file for complete search history.

(56) References Cited

U.S. PATENT DOCUMENTS

| 7,346,249 B2 | 3/2008 | Russell et al. |
| 7,529,453 B2 | 5/2009 | Miyabe et al. |

(Continued)

FOREIGN PATENT DOCUMENTS

| CN | 105807363 A | 7/2016 |
| CN | 108181684 A | 6/2018 |

(Continued)

OTHER PUBLICATIONS

English Translation of CN-115508943-A, 7 pages (Year: 2022).*
(Continued)

*Primary Examiner* — Daniel Petkovsek
(74) *Attorney, Agent, or Firm* — Suiter Swantz IP

(57) ABSTRACT

An optical fiber may include a cladding structure extending along a fiber length providing a hollow interior fiber region, and anti-resonant (AR) elements formed as walled structures with walls extending along the fiber length. At least one of the AR elements surrounds an interior region and further includes one or more support structures in the interior region and formed as at least a portion of at least one of the walls, where the one or more support structures have a non-uniform thickness profile, and where the plurality AR elements is configured to guide light along the fiber length in a central portion of the hollow interior fiber region based on optical anti-resonance.

17 Claims, 55 Drawing Sheets

Related U.S. Application Data

(60) Provisional application No. 63/626,922, filed on Jan. 30, 2024, provisional application No. 63/465,716, filed on May 11, 2023, provisional application No. 63/465,762, filed on May 11, 2023.

(51) Int. Cl.
    *C03B 37/025*     (2006.01)
    *G02B 6/02*     (2006.01)
    *G02B 6/036*     (2006.01)

(52) U.S. Cl.
    CPC ..... *G02B 6/02328* (2013.01); *G02B 6/02371* (2013.01); *C03B 2203/16* (2013.01); *G02B 6/036* (2013.01)

(56) References Cited

U.S. PATENT DOCUMENTS

| | | | |
|---|---|---|---|
| 7,590,323 | B2 | 9/2009 | Broeng et al. |
| 9,146,345 | B1 | 9/2015 | Dong et al. |
| 9,904,008 | B2 | 2/2018 | Fokoua et al. |
| 10,139,560 | B2* | 11/2018 | Poletti ............ H01S 3/1618 |
| 10,816,721 | B1 | 10/2020 | Chenard et al. |
| 10,822,262 | B2 | 11/2020 | Gibson et al. |
| 11,009,654 | B2* | 5/2021 | Wang ............ G02B 6/02328 |
| 11,029,464 | B2 | 6/2021 | Bauerschmidt et al. |
| 11,034,607 | B2 | 6/2021 | Fokoua et al. |
| 11,099,319 | B2 | 8/2021 | Uebel et al. |
| 11,203,547 | B2 | 12/2021 | Corrado et al. |
| 11,209,591 | B2* | 12/2021 | Gao ............ G02B 6/02328 |
| 11,212,005 | B1 | 12/2021 | Jopson |
| 11,215,751 | B2 | 1/2022 | Poletti et al. |
| 11,249,250 | B2 | 2/2022 | Jasion et al. |
| 11,269,135 | B2 | 3/2022 | Russell et al. |
| 11,428,865 | B2 | 8/2022 | Jasion et al. |
| 11,493,684 | B2 | 11/2022 | Taranta et al. |
| 11,493,685 | B2* | 11/2022 | Wang ............ G02B 6/02304 |
| 11,555,958 | B2 | 1/2023 | Sakr et al. |
| 11,640,029 | B2 | 5/2023 | Jasion et al. |
| 11,668,871 | B2* | 6/2023 | Poletti ............ C03B 37/01493 |
| | | | 385/125 |
| 11,835,755 | B2 | 12/2023 | Harker et al. |
| 2012/0027368 | A1 | 2/2012 | Bansal et al. |
| 2016/0075094 | A1 | 3/2016 | Kihara et al. |
| 2016/0209586 | A1 | 7/2016 | Fokoua et al. |
| 2016/0236964 | A1 | 8/2016 | Fokoua et al. |
| 2017/0160467 | A1 | 6/2017 | Poletti et al. |
| 2018/0356589 | A1 | 12/2018 | Mukasa et al. |
| 2019/0101695 | A1 | 4/2019 | Poletti et al. |
| 2020/0079680 | A1 | 3/2020 | Corrado et al. |
| 2020/0115270 | A1 | 4/2020 | Yoo et al. |
| 2020/0156987 | A1 | 5/2020 | Wheeler et al. |
| 2020/0241200 | A1 | 7/2020 | Wang et al. |
| 2020/0278491 | A1 | 9/2020 | Poletti et al. |
| 2020/0319400 | A1 | 10/2020 | Uebel et al. |
| 2020/0378864 | A1 | 12/2020 | O'Sullivan |
| 2021/0088717 | A1 | 3/2021 | Jasion et al. |
| 2021/0311248 | A1 | 10/2021 | Taranta et al. |
| 2021/0311250 | A1 | 10/2021 | Jasion et al. |
| 2021/0387892 | A1 | 12/2021 | Van Leeuwen et al. |
| 2021/0396927 | A1 | 12/2021 | Harker et al. |
| 2022/0011501 | A1 | 1/2022 | Lyngsoe et al. |
| 2022/0011502 | A1 | 1/2022 | Poletti et al. |
| 2022/0011644 | A1 | 1/2022 | Uebel et al. |
| 2022/0045470 | A1 | 2/2022 | Uebel et al. |
| 2022/0155517 | A1 | 5/2022 | Jasion et al. |
| 2022/0196907 | A1 | 6/2022 | Poletti |
| 2022/0227656 | A1 | 7/2022 | Rosenberger et al. |
| 2022/0227658 | A1 | 7/2022 | Rosenberger et al. |
| 2022/0234936 | A1 | 7/2022 | Rosenberger et al. |
| 2022/0242773 | A1 | 8/2022 | Rosenberger et al. |
| 2022/0244452 | A1 | 8/2022 | Benabid et al. |
| 2022/0244453 | A1 | 8/2022 | Rosenberger et al. |
| 2022/0252788 | A1 | 8/2022 | Bawn |
| 2022/0267192 | A1 | 8/2022 | Rosenberger et al. |
| 2022/0267193 | A1 | 8/2022 | Rosenberger et al. |
| 2022/0291443 | A1 | 9/2022 | Rosenberger et al. |
| 2022/0317369 | A1 | 10/2022 | Sakr et al. |
| 2022/0356108 | A1 | 11/2022 | Rosenberger et al. |
| 2023/0009601 | A1 | 1/2023 | Taranta et al. |
| 2023/0018465 | A1 | 1/2023 | Lyngsoe et al. |
| 2023/0124226 | A1 | 4/2023 | Hui et al. |
| 2024/0019630 | A1 | 1/2024 | Li et al. |
| 2024/0036253 | A1* | 2/2024 | Dainese, Jr. ....... G02B 6/02328 |
| 2024/0101464 | A1 | 3/2024 | Rosenberger et al. |
| 2024/0411083 | A1* | 12/2024 | Amezcua-Correa ...................... |
| | | | C03B 37/0256 |

FOREIGN PATENT DOCUMENTS

| | | |
|---|---|---|
| CN | 108549128 A | 9/2018 |
| CN | 108760718 A | 11/2018 |
| CN | 108919418 B | 11/2018 |
| CN | 109116467 A | 1/2019 |
| CN | 109541741 A | 3/2019 |
| CN | 109932778 A | 6/2019 |
| CN | 110221381 B | 9/2019 |
| CN | 110501777 B | 11/2019 |
| CN | 209690556 U | 11/2019 |
| CN | 110673256 B | 1/2020 |
| CN | 111175884 A | 5/2020 |
| CN | 111257992 A | 6/2020 |
| CN | 111474627 A | 7/2020 |
| CN | 111474628 B | 7/2020 |
| CN | 111796364 A | 10/2020 |
| CN | 111947805 A | 11/2020 |
| CN | 111999800 A | 11/2020 |
| CN | 112014920 A | 12/2020 |
| CN | 112230329 B | 1/2021 |
| CN | 112305663 B | 2/2021 |
| CN | 112526669 A | 3/2021 |
| CN | 112596280 A | 4/2021 |
| CN | 112666649 A | 4/2021 |
| CN | 112698439 A | 4/2021 |
| CN | 112740086 A | 4/2021 |
| CN | 112859236 A | 5/2021 |
| CN | 113049138 A | 6/2021 |
| CN | 113067572 A | 7/2021 |
| CN | 113126203 A | 7/2021 |
| CN | 113296186 A | 8/2021 |
| CN | 113311533 A | 8/2021 |
| CN | 113448010 A | 9/2021 |
| CN | 113497404 A | 10/2021 |
| CN | 113589456 A | 11/2021 |
| CN | 113711095 A | 11/2021 |
| CN | 113874332 A | 12/2021 |
| CN | 113885120 A | 1/2022 |
| CN | 113891864 A | 1/2022 |
| CN | 113900172 A | 1/2022 |
| CN | 113905991 A | 1/2022 |
| CN | 113933928 A | 1/2022 |
| CN | 113939482 A | 1/2022 |
| CN | 113939483 A | 1/2022 |
| CN | 113940613 A | 1/2022 |
| CN | 215415988 U | 1/2022 |
| CN | 114007990 A | 2/2022 |
| CN | 114007991 A | 2/2022 |
| CN | 114008499 A | 2/2022 |
| CN | 114026048 A | 2/2022 |
| CN | 114026049 A | 2/2022 |
| CN | 114114526 A | 3/2022 |
| CN | 114127022 A | 3/2022 |
| CN | 114167542 A | 3/2022 |
| CN | 114206792 A | 3/2022 |
| CN | 114721086 A | 7/2022 |
| CN | 114966954 A | 8/2022 |
| CN | 115124232 A | 9/2022 |
| CN | 115236793 A | 10/2022 |
| CN | 115508943 A * | 12/2022 ......... G02B 6/02328 |
| CN | 115629444 A | 1/2023 |
| CN | 218497187 U | 2/2023 |
| CN | 115903126 A | 4/2023 |
| CN | 116430511 A | 7/2023 |

(56) References Cited

FOREIGN PATENT DOCUMENTS

| | | | | |
|---|---|---|---|---|
| CN | 116594097 | A | 8/2023 | |
| CN | 116661054 | A | 8/2023 | |
| CN | 116661055 | A | 8/2023 | |
| CN | 117192681 | A | 12/2023 | |
| CN | 117348147 | A | 1/2024 | |
| CN | 117388980 | A | 1/2024 | |
| CN | 117740065 | A | 3/2024 | |
| DE | 102014011041 | A1 | 1/2016 | |
| DK | 3152607 | T3 | 6/2019 | |
| EP | 2082462 | B1 | 8/2014 | |
| EP | 3199991 | A1 | 8/2017 | |
| EP | 3249432 | A1 | 11/2017 | |
| EP | 2321678 | B1 | 12/2018 | |
| EP | 3152607 | B1 | 3/2019 | |
| EP | 3047318 | B1 | 7/2020 | |
| EP | 3249431 | B1 | 8/2020 | |
| EP | 3719551 | A1 | 10/2020 | |
| EP | 3766842 | A1 * | 1/2021 | ......... G02B 6/02328 |
| EP | 3047319 | B1 | 5/2021 | |
| EP | 4001976 | A1 | 5/2022 | |
| EP | 4020026 | A1 | 6/2022 | |
| EP | 3834020 | B1 | 9/2022 | |
| EP | 4067952 | A2 | 10/2022 | |
| EP | 3662310 | B1 | 11/2022 | |
| GB | 2518420 | B | 3/2015 | |
| GB | 2562687 | B | 11/2018 | |
| GB | 2562688 | B | 11/2018 | |
| GB | 2562689 | B | 11/2018 | |
| GB | 2562971 | B | 11/2018 | |
| GB | 2563758 | B | 12/2018 | |
| GB | 2576190 | B | 2/2020 | |
| HK | 40002087 | B | 3/2020 | |
| HK | 40066163 | A | 8/2022 | |
| JP | 2017520804 | A | 7/2017 | |
| JP | 6636509 | B2 | 1/2020 | |
| JP | 2020016891 | A | 1/2020 | |
| JP | 2020525391 | A | 8/2020 | |
| JP | 2020533264 | A | 11/2020 | |
| JP | 6876762 | B2 | 5/2021 | |
| JP | 6910486 | B2 | 7/2021 | |
| JP | 2021534445 | A | 12/2021 | |
| JP | 2022033896 | A | 3/2022 | |
| JP | 2022530426 | A | 6/2022 | |
| JP | 2022541097 | A | 9/2022 | |
| JP | 7178471 | B2 | 11/2022 | |
| JP | 7193530 | B2 | 12/2022 | |
| TW | 202240264 | A | 10/2022 | |
| WO | 2015040187 | A1 | 3/2015 | |
| WO | 2015040189 | A2 | 3/2015 | |
| WO | 2015185761 | A1 | 12/2015 | |
| WO | 2017072750 | A1 | 5/2017 | |
| WO | 2019008352 | A1 | 1/2019 | |
| WO | 2019025797 | A1 | 2/2019 | |
| WO | 2019053412 | A1 | 3/2019 | |
| WO | 2020030888 | A1 | 2/2020 | |
| WO | 2020030894 | A1 | 2/2020 | |
| WO | 2020070488 | A1 | 4/2020 | |
| WO | 2020210208 | A1 | 10/2020 | |
| WO | 2020217052 | A1 | 10/2020 | |
| WO | 2021018593 | A1 | 2/2021 | |
| WO | 2021023969 | A1 | 2/2021 | |
| WO | 2021089360 | A1 | 5/2021 | |
| WO | 2022028812 | A1 | 2/2022 | |
| WO | 2022053783 | A1 | 3/2022 | |
| WO | 2022122350 | A1 | 6/2022 | |
| WO | 2022128272 | A1 | 6/2022 | |
| WO | 2022156956 | A1 | 7/2022 | |
| WO | 2022157010 | A1 | 7/2022 | |
| WO | 2022157179 | A1 | 7/2022 | |
| WO | 2022161703 | A1 | 8/2022 | |
| WO | 2022175647 | A1 | 8/2022 | |
| WO | 2022263788 | A1 | 12/2022 | |
| WO | 2023014550 | A1 | 2/2023 | |

OTHER PUBLICATIONS

English Translation of EP-3766842-A1, 13 pages (Year: 2021).*
International Search Report and Written Opinion received in International Application No. PCT/US2024/029157, Aug. 14, 2024, 11 pages.
Kolyadin et al., "Light transmission in negative curvature hollow core fiber in extremely high material loss region," Optics Express, vol. 21, No. 8, Apr. 10, 2013, 6 pages.
Amrani et al., "Low-loss single-mode hybrid-lattice hollow-core photonic-crystal fibre," Light: Science & Applications, 2021, 12 pages.
Belari et al., "Negative curvature fibers with reduced leakage loss," Center for Photonics and Photonics Materials, 2014, 1 page.
Bradley et al., "Record Low-Loss 1.3dB/km Data Transmitting Antiresonant Hollow Core Fibre," 2018 European Conference on Optical Communication, Sep. 2018, 3 pages.
Cordeiro et al., "Azimuthally asymmetric tubular lattice hollow-core optical fiber," Journal of the Optical Society of America, Optical Physics, vol. 38, No. 12, Dec. 2021, 6 pages.
Couny et al., "Reduction of Fresnel Back-Reflection at Splice Interface Between Hollow Core PCF and Single-Mode Fiber," IEEE Photonics Technology Letters, vol. 19, No. 13, Jul. 1, 2007, 3 pages.
Ding et al., "Recent Progress in Low-Loss Hollow-Core Anti-Resonant Fibers and Their Applications," IEEE Journal of Selected Topics in Quantum Electronics, vol. 26, No. 4, Jul./Aug. 2020, 12 pages.
Fokoua et al., "Loss in hollow-core optical fibers: mechanisms, scaling rules, and limits," Advances in Optics and Photonics, vol. 15, No. 1, Mar. 2023, 85 pages.
Gao et al., "Hollow-core conjoined-tube negative-curvature fibre with ultralow loss," Nature Communications, Jul. 19, 2018, 6 pages.
Gerome et al., "Tapered hollow-core photonic crystal fibers," The European Optical Society Annual Meeting, HAL open science, Sep. 14, 2022, 3 pages.
Habib et al., "Single-mode, low loss hollow-core anti-resonant fiber designs," Optics Express, vol. 27, No. 4, Feb. 18, 2019, 13 pages.
Hartung et al., "Double antiresonant hollow core fiber—guidance in the deep ultraviolet by modified tunneling leaky modes," Optical Society of America, vol. 22, No. 16, Jul. 30, 2014, 10 pages.
Hong et al., "Highly Birefringent Anti-Resonant Hollow-Core Fiber with a Bi-Thickness Fourfold Semi-Tube Structure," Laser & Photonics Reviews, Research Article, Feb. 2022, 9 pages.
Jaison et al., "Hollow Core NANF with 0.28 dB/km Attenuation in the C and L Bands," Optical Fiber Communication Conference, Jan. 2020, 3 pages.
Komanec et al., "Low-Loss and Low-Back-Reflection Hollow-Core to Standard Fiber Interconnection," IEEE Photonics Technology Letters, vol. 31, No. 10, May 15, 2019, 4 pages.
Masruri et al., "Confinement loss scaling law analysis in tube lattice fibers for terahertz applications," Proceedings of SPIE, Mar. 7, 2014, 7 pages.
Ordu et al., "Re-thinking the design of low-loss hollow-core fibers via optimal positioning of the nested elements," Optics Letters, vol. 47, No. 12, Jun. 15, 2022, 4 pages.
Osorio et al., "Hollow-core fibers with reduced surface roughness and ultralow loss in the short-wavelength range," nature communications, Feb. 28, 2023, 10 pages.
Osorio et al., "Hollow-core fibers with specific modal operation and low loss in the short-wavelength range," HAL open science, Jul. 2020, 5 pages.
Osorio et al., "Sub-thermodynamic equilibrium surface roughness in hollowcore fibers for the ultraviolet range," HAL open science, Sep. 2021, 3 pages.
Poletti, "Nested antiresonant nodeless hollow core fiber," Optical Society of America, vol. 22, No. 20, Sep. 22, 2014, 22 pages.
Pryamikov et al., "Hollow-core optical fibers: current state and development prospects," Russian Academy of Sciences, Mar. 2024, 29 pages.
Sakr et al., "Hollow Core NANFs with Five Nested Tubes and Record Low Loss at 850, 1060, 1300 and 1625nm," Optical Fiber Communication Conference, Jun. 2021, 3 pages.

(56) References Cited

OTHER PUBLICATIONS

Shaha et al., "Low-loss single-mode modified conjoined tube hollow-core fiber," Applied Optics, vol. 60, No. 21, Jul. 20, 2021, 8 pages.
Suslov et al., "Low loss and broadband low back-reflection interconnection between a hollow-core and standard single-mode fiber," Optics Express, vol. 30, No. 20, Sep. 26, 2022, 9 pages.
Suslov et al., "Low loss and high performance interconnection between standard single-mode fiber and antiresonant hollow-core fiber," Scientific Reports, Nature Portfolio, Apr. 22, 2021, 9 pages.
Vincetti et al., "Waveguiding mechanism in tube lattice fibers," Optical Society of America, Optics Express, vol. 18, No. 22, Oct. 19, 2010, 14 pages.
Wang et al., "Birefringent and low loss semi-tube hollow-core fiber," Optica Publishing Group, Jan. 2023, 3 pages.
Zhang et al., "Angle-Spliced SMF to Hollow Core Fiber Connection with Optimized Back-Reflection and Insertion Loss," Journal of Lightwave Technology, vol. 40, No. 19, Oct. 1, 2022, 6 pages.
Zhong et al., "Gap design to enable functionalities into nested antiresonant nodeless fiber based systems," Optics Express, vol. 31, No. 9, Apr. 24, 2023, 10 pages.

* cited by examiner

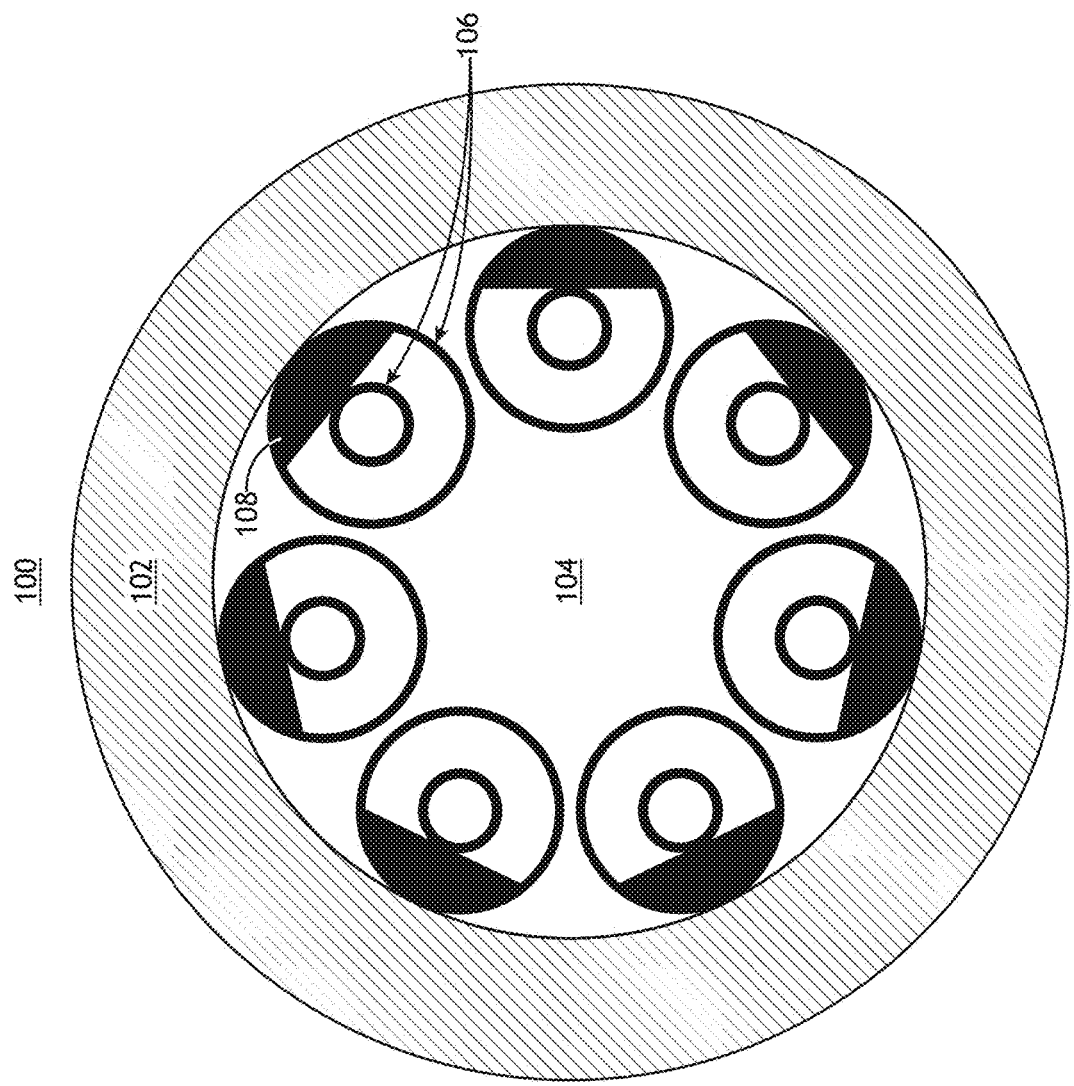
FIG. 1
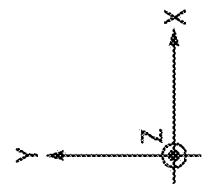

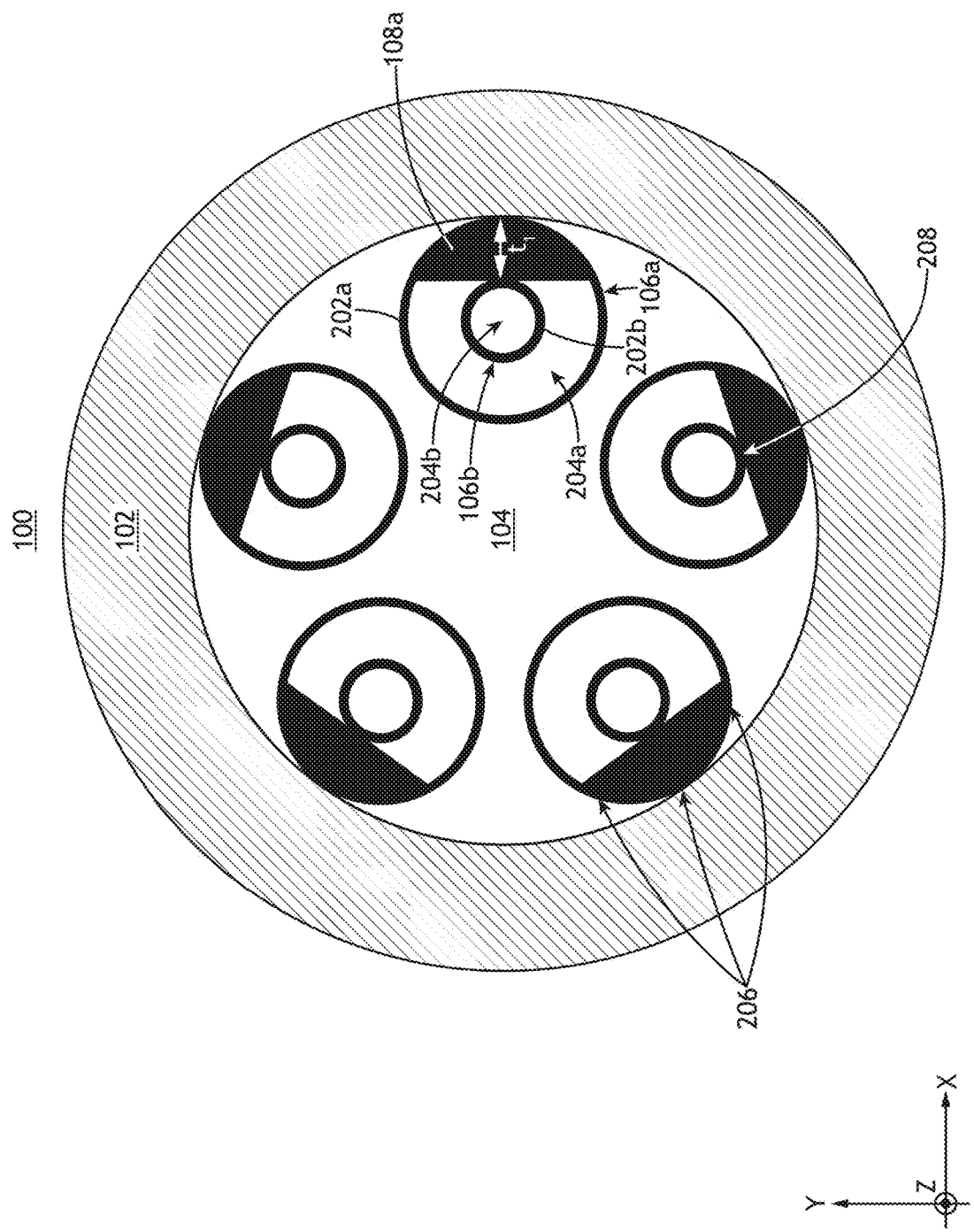

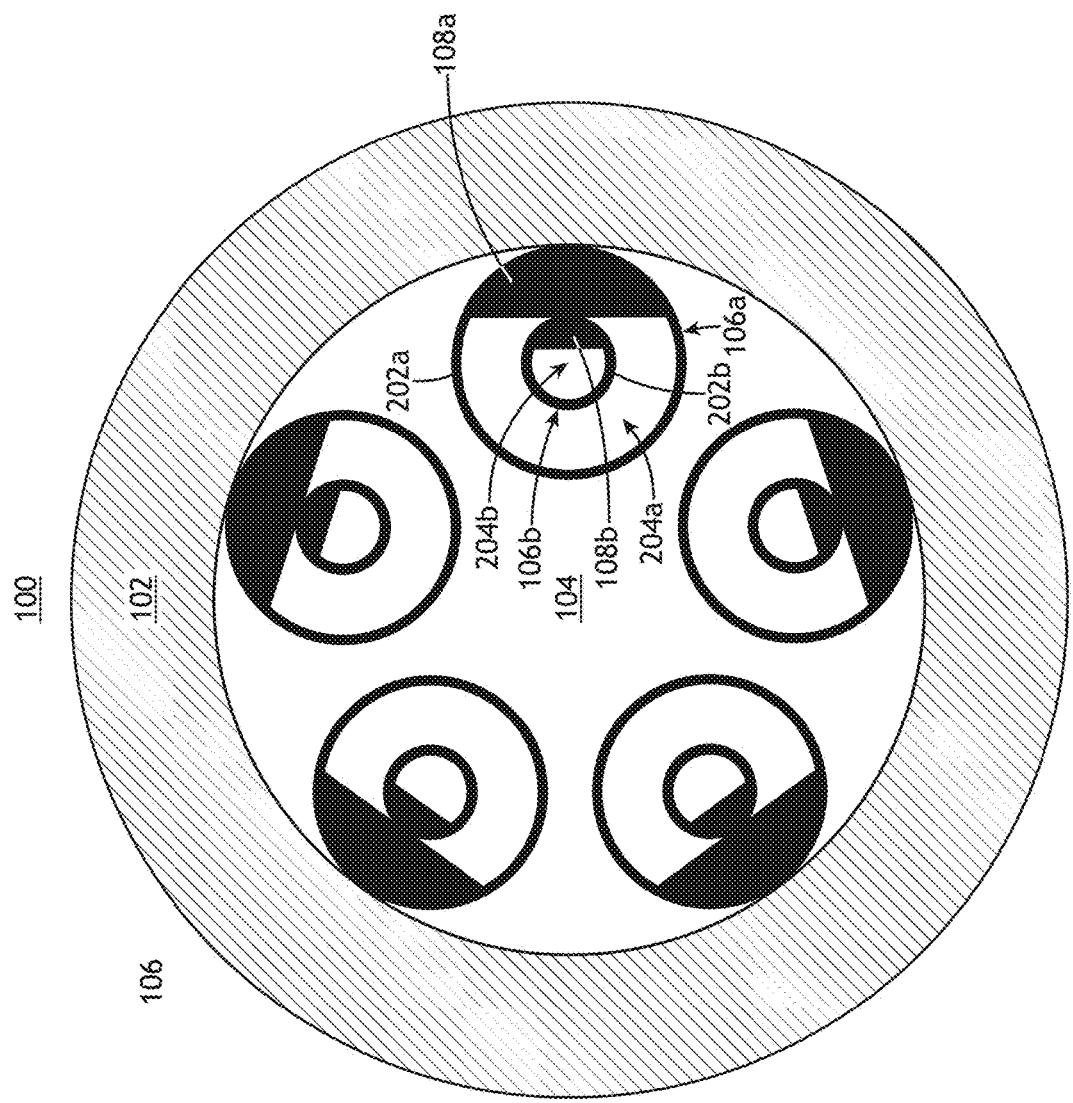
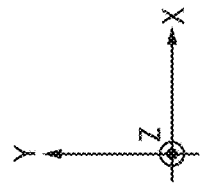
FIG.2B

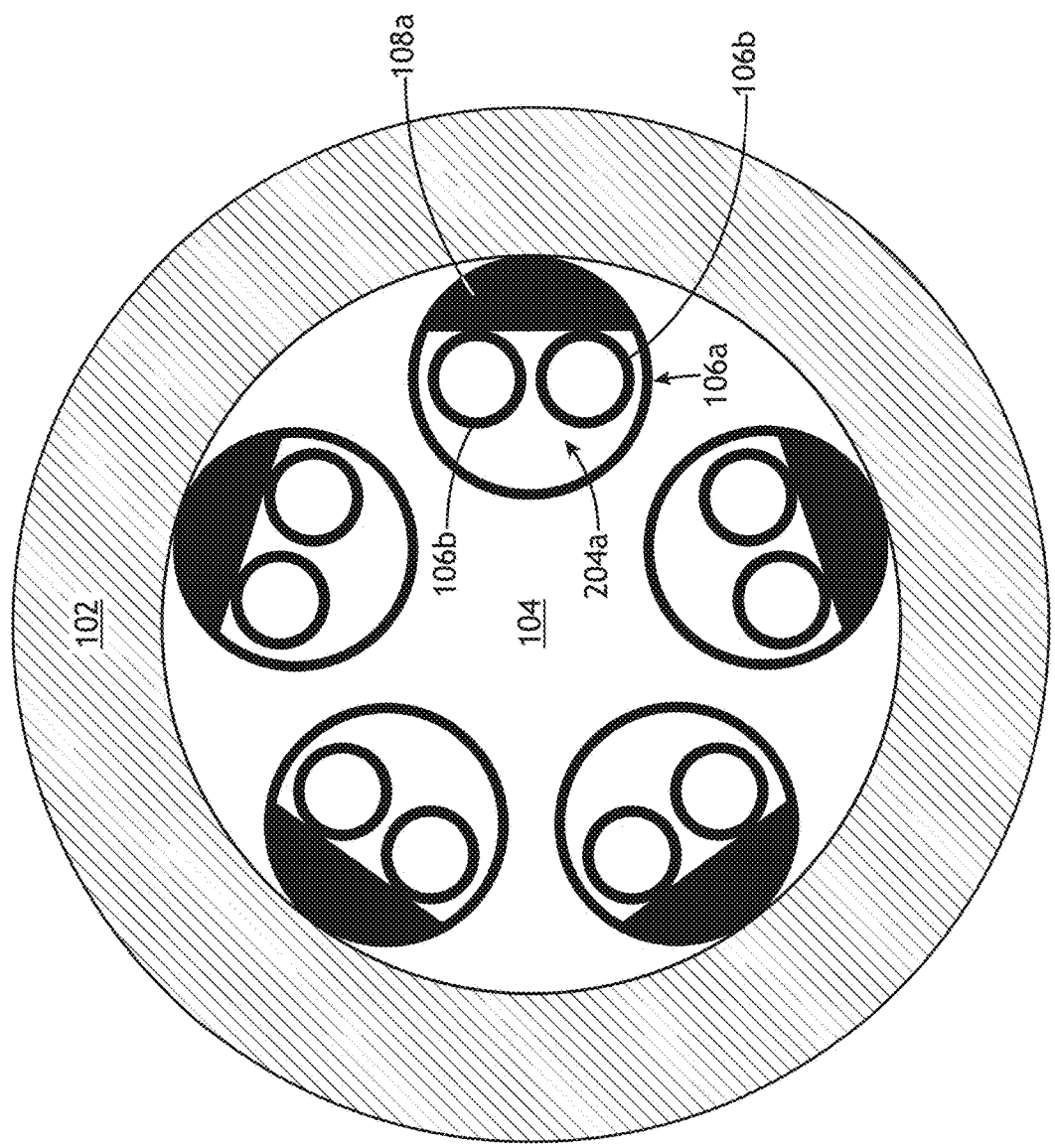
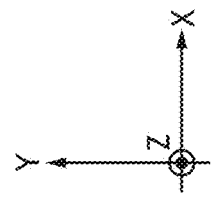
FIG.2D

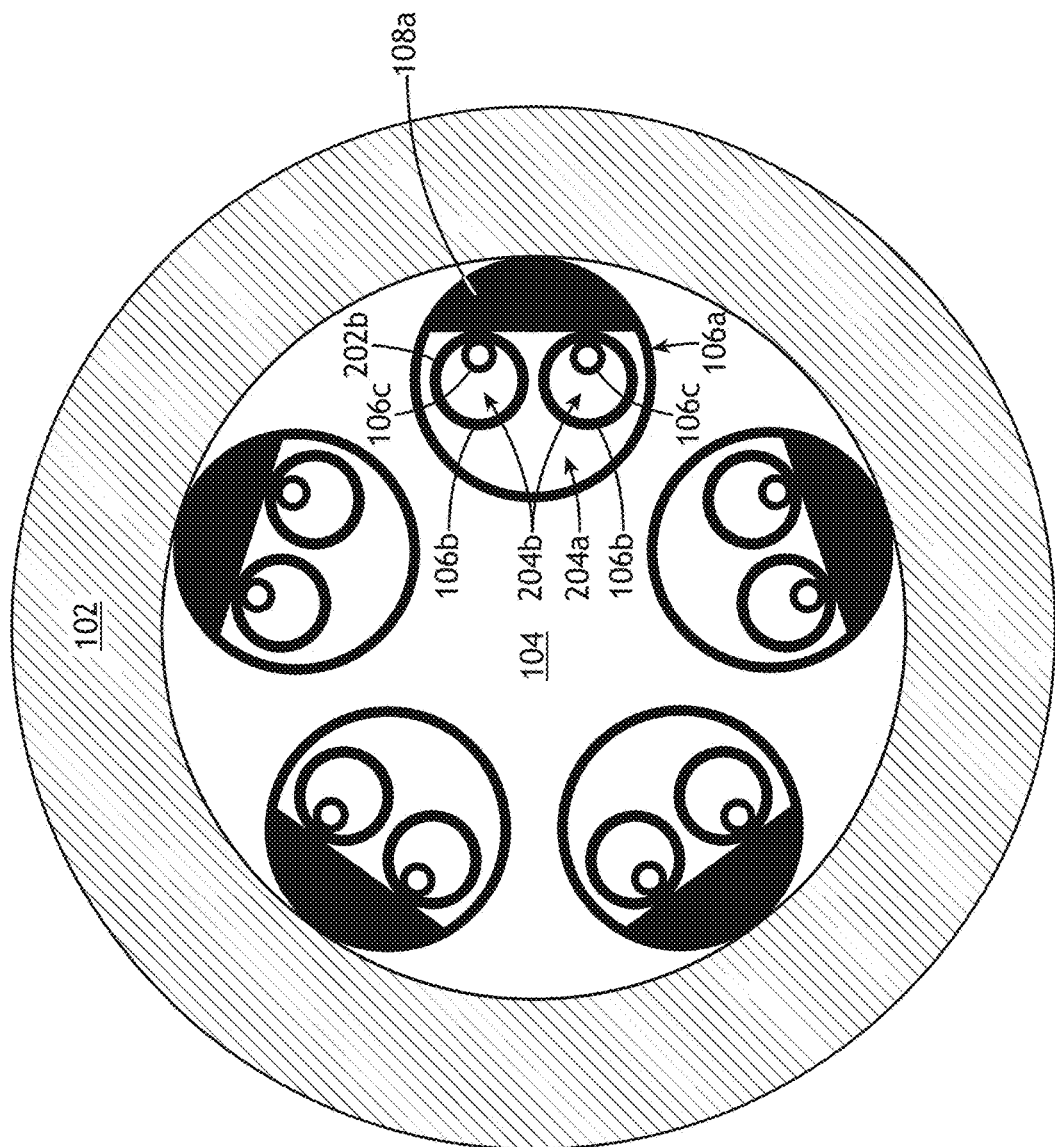
FIG. 2E
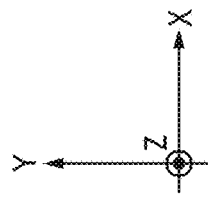

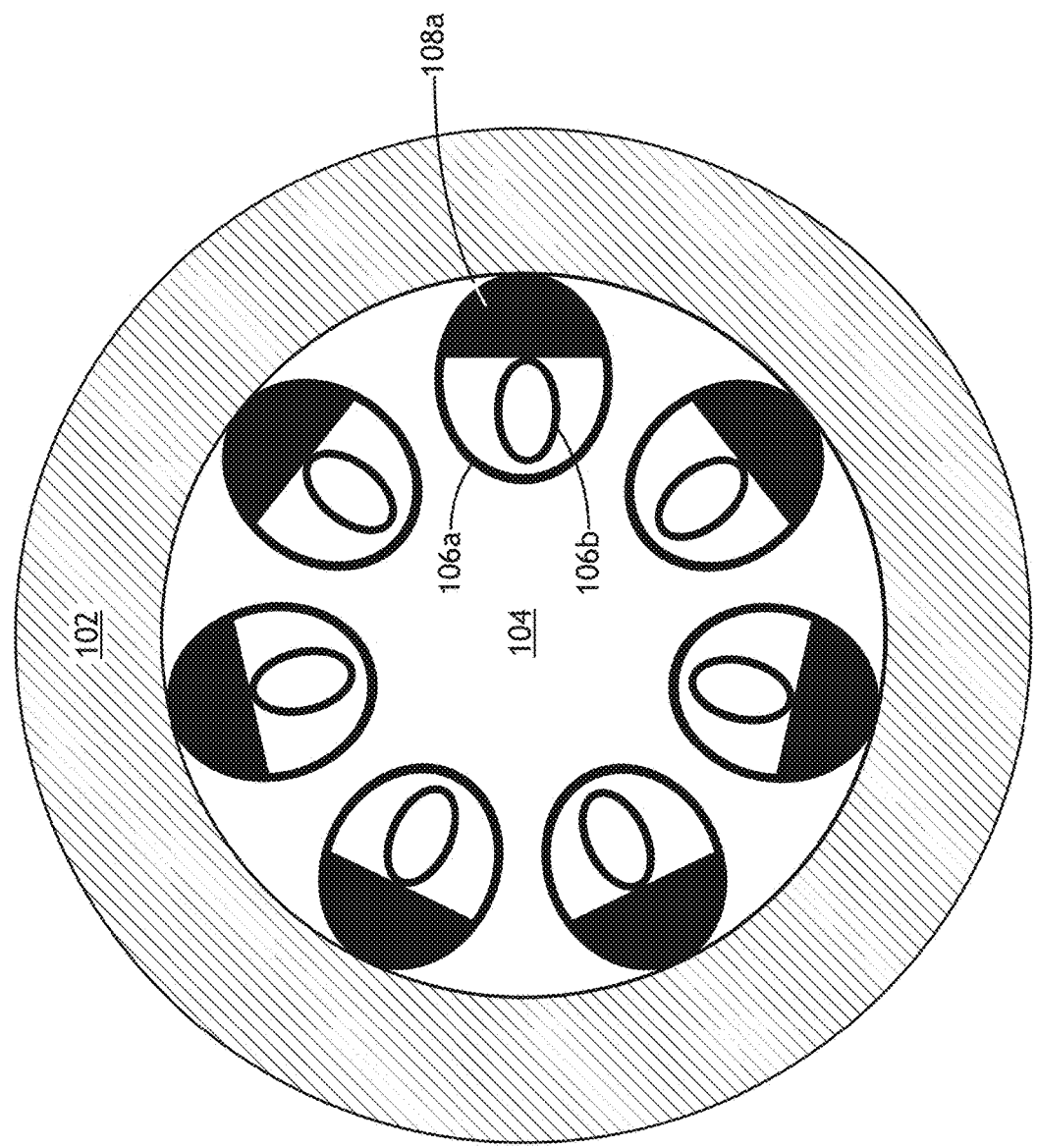
FIG. 2Q
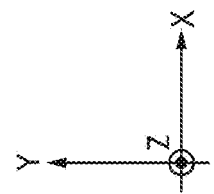

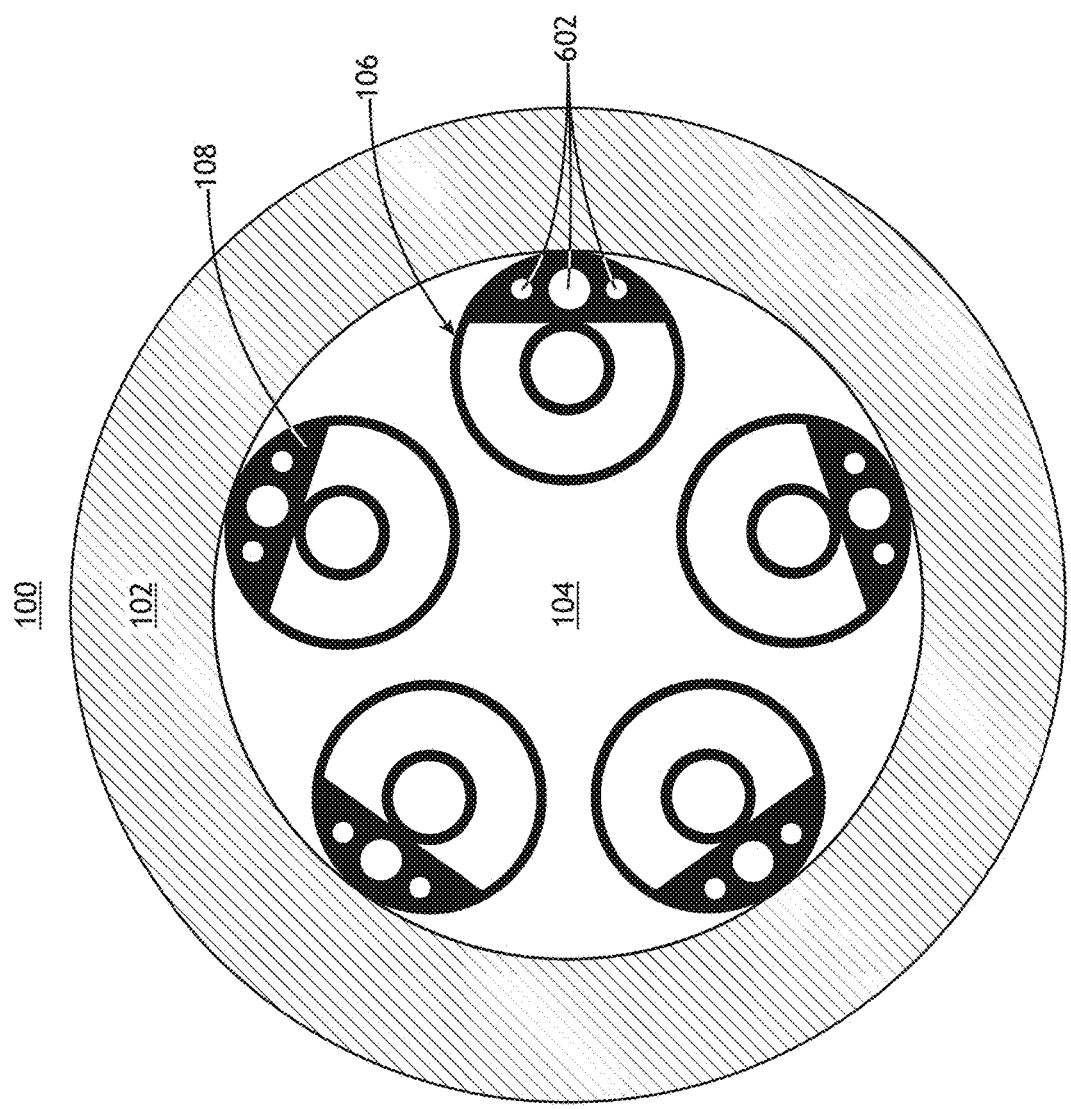
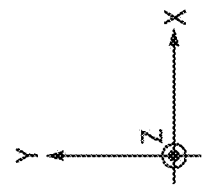
FIG.6A

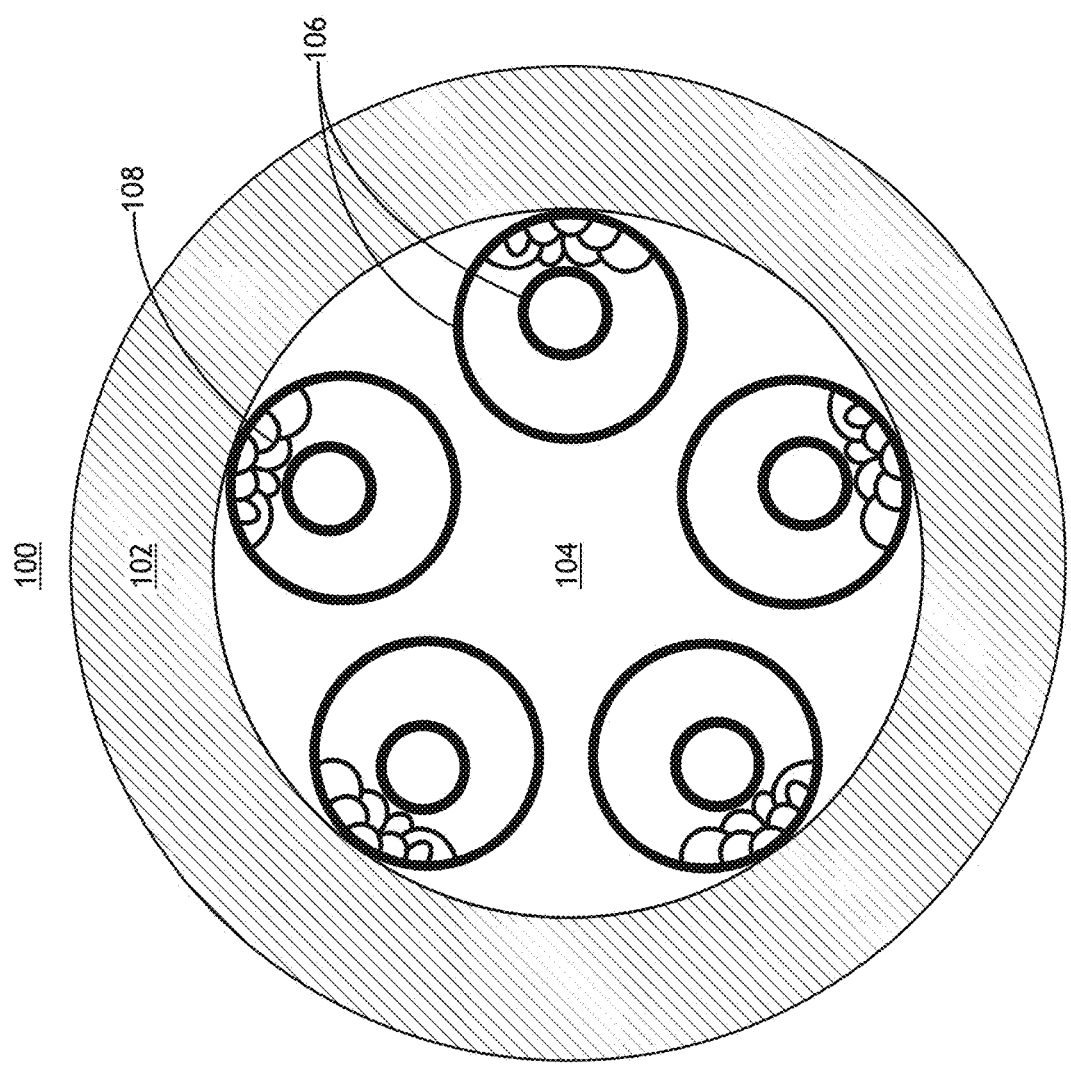
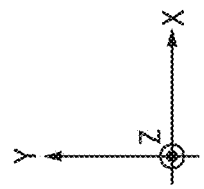
FIG.6C

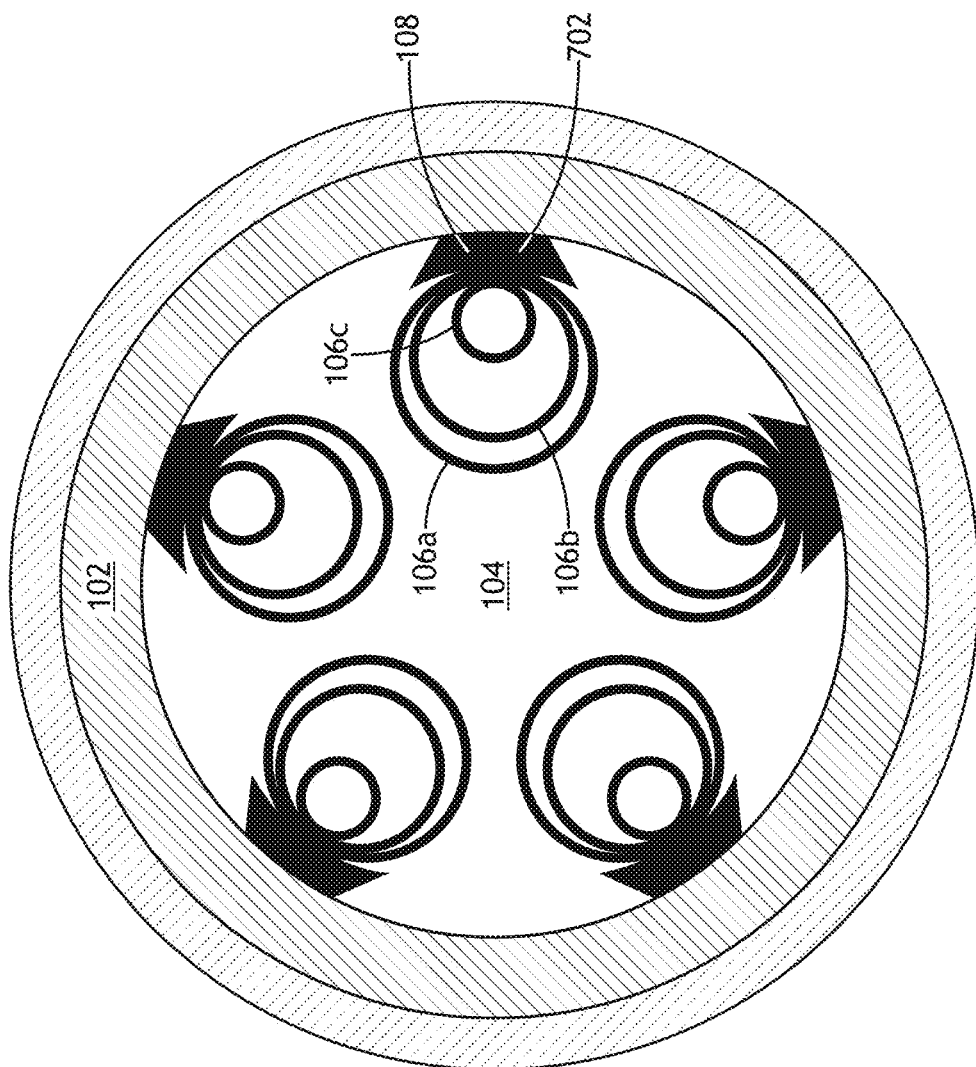
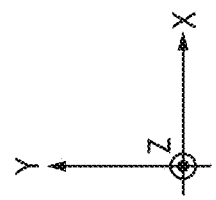
FIG.7H

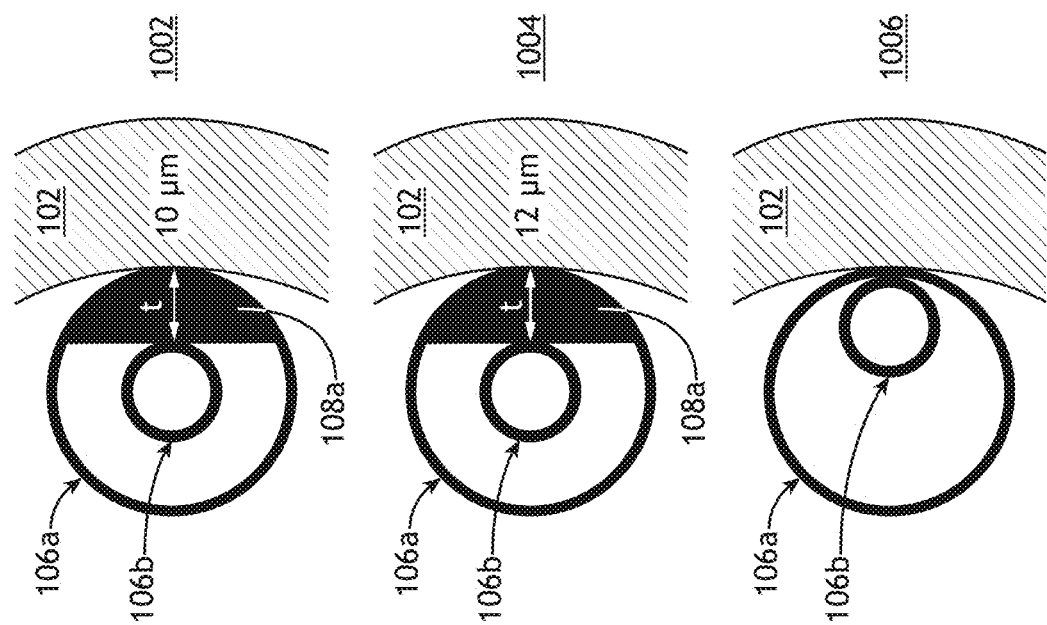
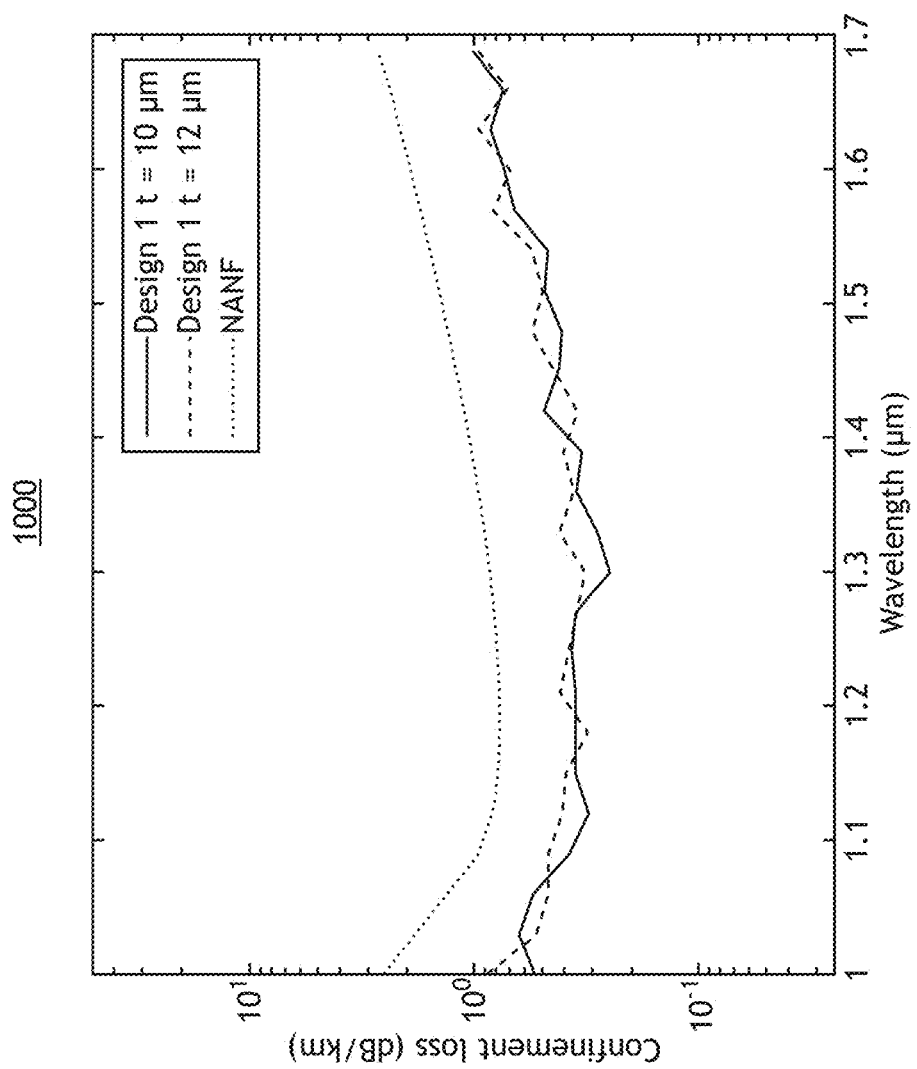
FIG. 10

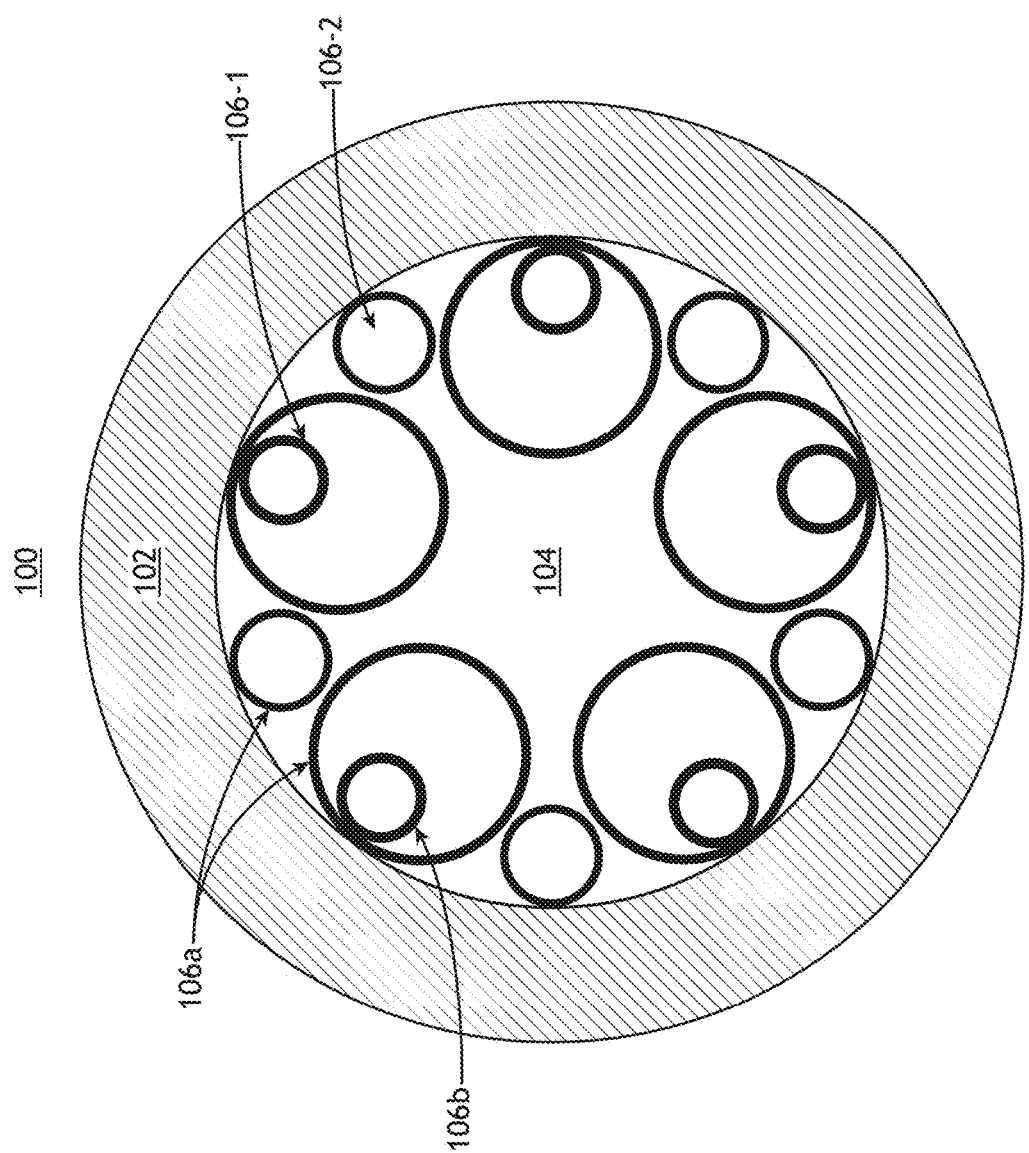
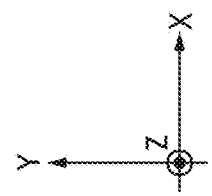
FIG.15

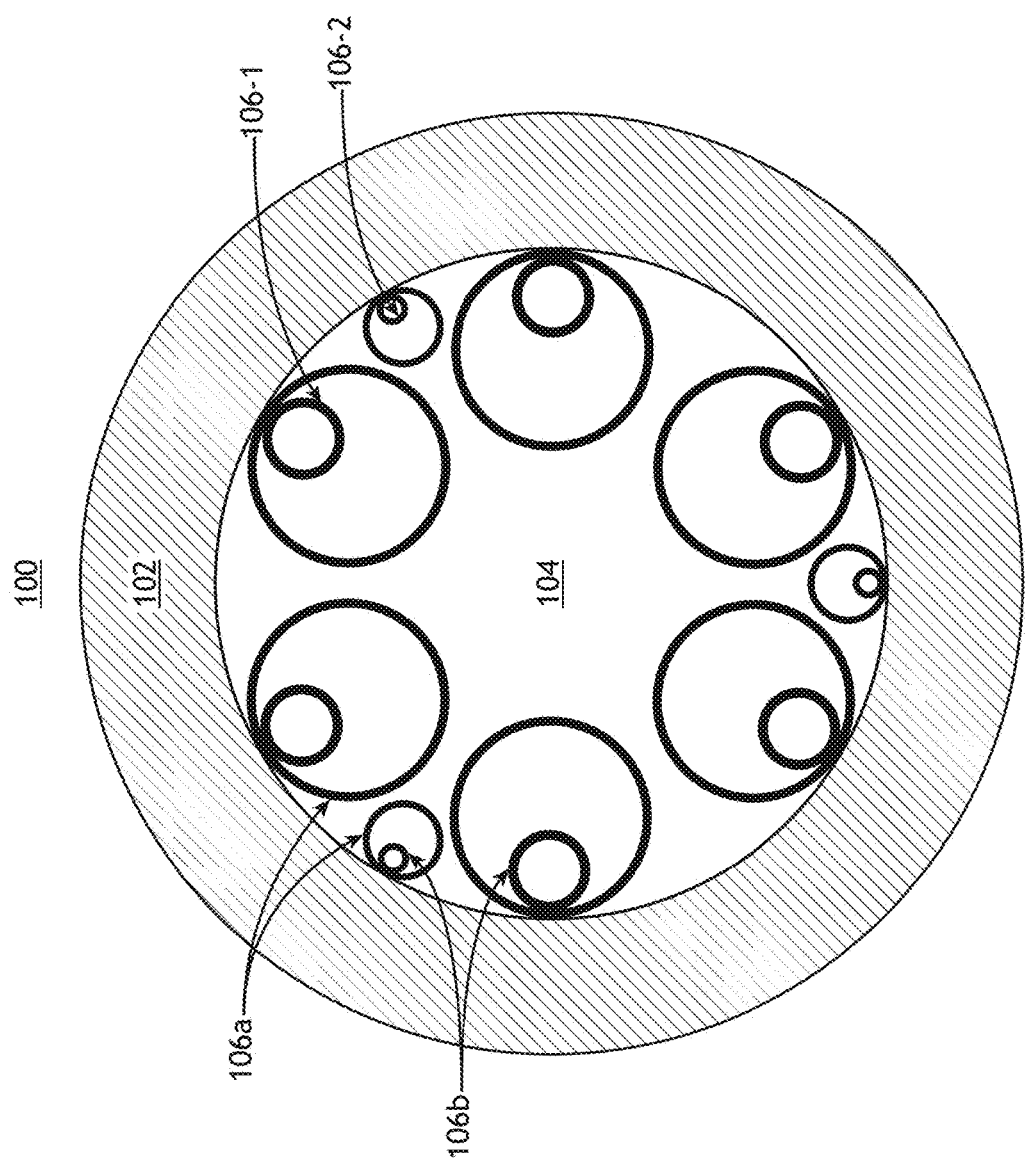
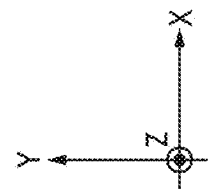
FIG. 20

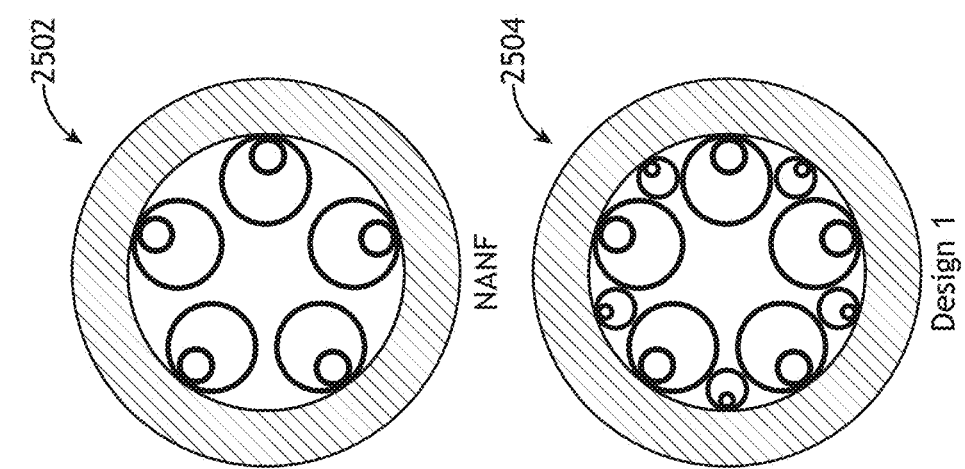
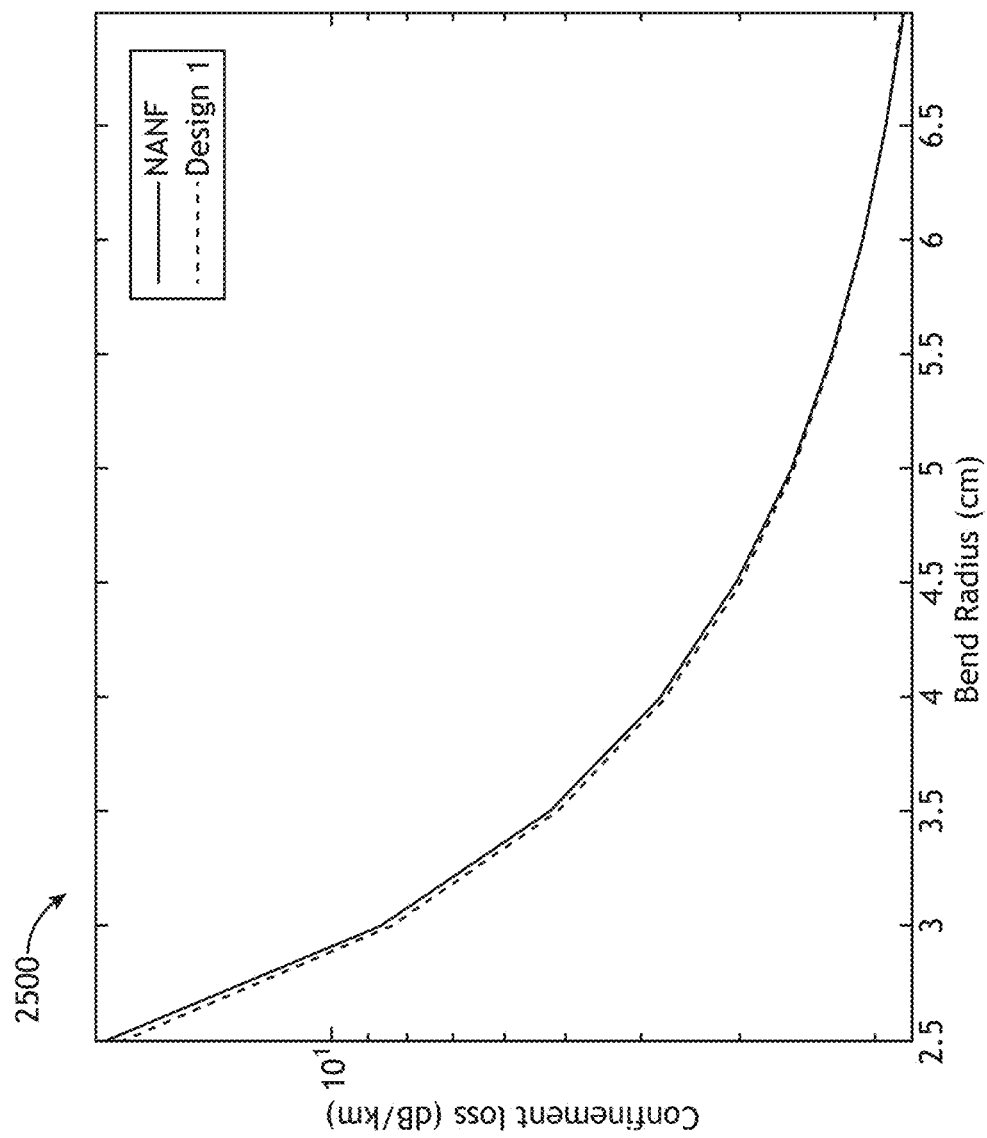
FIG. 25

ANTI-RESONANT HOLLOW-CORE FIBERS FEATURING SUPPORT STRUCTURES

CROSS-REFERENCE TO RELATED APPLICATION

The present application is a continuation of and claims the benefit of U.S. patent application Ser. No. 18/662,573 filed on May 13, 2024, which claims the benefit of U.S. Provisional Patent Application 63/465,716 filed on May 11, 2023, U.S. Provisional Patent Application 63/465,762 filed on May 11, 2023, and U.S. Provisional Patent Application 63/626,922 filed on Mar. 26, 2024; all of which are all incorporated herein by reference in their entireties.

TECHNICAL FIELD

The present disclosure relates generally to optical fiber designs and, more particularly, to designs of anti-resonant hollow core fibers.

BACKGROUND

Anti-resonant (AR) hollow core fibers have the potential to replace solid-core standard silica fibers in a wide range of applications, including many telecommunication applications. Many of these applications require fibers that have attenuation losses comparable to state-of-the-art silica single-mode fibers and operate in a broadband range (i.e. low losses for a wide range of wavelengths). There is therefore a need to develop systems and methods for designing and manufacturing AR hollow core fibers. Prior AR hollow core fibers focused on maintaining a thin thickness (thin meaning smaller length thickness when compared to the wavelength of the propagating light within the fiber) of the tubular elements and/or other structures that impact the optical resonance conditions.

SUMMARY

In embodiments, the techniques described herein relate to an optical fiber including a cladding structure extending along a fiber length providing a hollow interior fiber region; and a plurality of anti-resonant (AR) elements formed as walled structures with walls extending along the fiber length, where at least one of the plurality of AR elements surrounds an interior region and further includes one or more support structures in the interior region and formed as at least a portion of at least one of the walls, where the one or more support structures have a non-uniform thickness profile, where the plurality AR elements is configured to guide light along the fiber length in a central portion of the hollow interior fiber region based on optical anti-resonance.

In embodiments, the techniques described herein relate to an optical fiber, where the plurality of AR elements include one or more sets of nested AR elements, where at least one of the one or more sets of nested AR elements includes a first AR element of the plurality of AR elements; and a second AR element of the plurality of AR elements located within an interior region of the first AR element bounded at least in part by the walls of the first AR element, where the second AR element is connected to one or more first support structures of the one or more support structures.

In embodiments, the techniques described herein relate to an optical fiber, where the one or more first support structures are formed from the walls of the first AR element, where the walls of the first AR element have the non-uniform wall thickness profile in a cross-sectional plane defining shapes of the one or more first support structures, where the cross-sectional plane is orthogonal to a direction along the fiber length.

In embodiments, the techniques described herein relate to an optical fiber, where a fill factor defined as a ratio of an area of the walls of the first AR element in the cross-sectional plane to an area of the first AR element bounded by an outer face in the cross-sectional plane is at least 5%.

In embodiments, the techniques described herein relate to an optical fiber, where a fill factor defined as a ratio of an area of the walls of the first AR element in the cross-sectional plane to an area of the first AR element bounded by an outer face in the cross-sectional plane is at least 20%.

In embodiments, the techniques described herein relate to an optical fiber, where a fill factor defined as a ratio of an area of the one or more first support structures in the cross-sectional plane to an area of the first AR element bounded by an outer face in the cross-sectional plane is at least 5%.

In embodiments, the techniques described herein relate to an optical fiber, where a fill factor defined as a ratio of an area of the one or more first support structures in the cross-sectional plane to an area of the first AR element bounded by an outer face in the cross-sectional plane is at least 20%.

In embodiments, the techniques described herein relate to an optical fiber, where the second AR element is connected to the one or more first support structures at one or more contact points, where the non-uniform wall thickness profile of the first AR element is selected to provide selected separation distances between the one or more contact points and an outer face of the first AR element.

In embodiments, the techniques described herein relate to an optical fiber, where the second AR element is connected to the one or more first support structures at two or more contact points.

In embodiments, the techniques described herein relate to an optical fiber, where the one or more first support structures include at least one of a notch or groove to provide the two or more contact points.

In embodiments, the techniques described herein relate to an optical fiber, where the second AR element is connected to the one or more first support structures along a spatially extended integration region.

In embodiments, the techniques described herein relate to an optical fiber, where the spatially extended integration region extends along at least 5% of a circumference of the first AR element.

In embodiments, the techniques described herein relate to an optical fiber, where at least one of the selected separation distances is at least 5% of a radial distance between a centroid of the first AR element and the outer face of the first AR element at a location crossing an associated one of the one or more contact points.

In embodiments, the techniques described herein relate to an optical fiber, where at least one of the selected separation distances is at least 30% of a radial distance between a centroid of the first AR element and the outer face of the first AR element at a location crossing an associated one of the one or more contact points.

In embodiments, the techniques described herein relate to an optical fiber, where the one or more first support structures position the second AR element within the interior region of the first AR element.

In embodiments, the techniques described herein relate to an optical fiber, where the one or more first support structures center the second AR element within the interior region of the first AR element.

In embodiments, the techniques described herein relate to an optical fiber, where at least one of the one or more first support structures are solid.

In embodiments, the techniques described herein relate to an optical fiber, where at least one of the one or more first support structures have air gaps extending along the fiber length.

In embodiments, the techniques described herein relate to an optical fiber, where at least one of the one or more first support structures are porous.

In embodiments, the techniques described herein relate to an optical fiber, where the one or more first support structures include a single first support structure shaped as at least one of an ellipse or a circle in a cross-sectional plane orthogonal to a direction along the fiber length.

In embodiments, the techniques described herein relate to an optical fiber, where the one or more first support structures include a single first support structure shaped as at least one of a truncated ellipse or a truncated circle in a cross-sectional plane orthogonal to a direction along the fiber length.

In embodiments, the techniques described herein relate to an optical fiber, where the single first support structure has a notch.

In embodiments, the techniques described herein relate to an optical fiber, where the one or more first support structures include a single first support structure shaped as a trapezium in a cross-sectional plane orthogonal to a direction along the fiber length.

In embodiments, the techniques described herein relate to an optical fiber, where the at least one of the one or more sets of nested AR elements further includes one or more additional second AR elements located within an interior region of the first AR element bounded at least in part by the walls of the second AR element and attached to the one or more first support structures.

In embodiments, the techniques described herein relate to an optical fiber, where the at least one of the one or more sets of nested AR elements further includes a third AR element of the plurality of AR elements located within an interior region of the second AR element bounded at least in part by the walls of the second AR element.

In embodiments, the techniques described herein relate to an optical fiber, where the third AR element is connected to one or more second support structures of the one or more support structures.

In embodiments, the techniques described herein relate to an optical fiber, where the at least one of the one or more sets of nested AR elements further includes a third AR element of the plurality of AR elements, where the first AR element is located within an interior region of the third AR element bounded at least in part by the walls of the third AR element.

In embodiments, the techniques described herein relate to an optical fiber, where the first AR element is connected to one or more third support structures of the one or more support structures.

In embodiments, the techniques described herein relate to an optical fiber, where the first AR element is connected to the cladding structure.

In embodiments, the techniques described herein relate to an optical fiber, where the one or more support structures include one or more outer support structures connected to the cladding structure, where the first structure is connected to at least one of the one or more outer support structures.

In embodiments, the techniques described herein relate to an optical fiber, where at least one of the one or more outer support structures includes a solid rod extending along the fiber length.

In embodiments, the techniques described herein relate to an optical fiber, where at least one of the one or more outer support structures includes a porous rod along the fiber length.

In embodiments, the techniques described herein relate to an optical fiber, where at least one of the one or more outer support structures includes a tube extending along the fiber length.

In embodiments, the techniques described herein relate to an optical fiber, further including one or more additional structures connected to the cladding structure.

In embodiments, the techniques described herein relate to an optical fiber, where at least one of the plurality of AR elements is connected to at least one of the one or more additional structures.

In embodiments, the techniques described herein relate to an optical fiber, where the cladding structure is formed from two or more layers of material.

In embodiments, the techniques described herein relate to an optical fiber, further including one or more additional structures connected to at least one of the plurality of AR elements.

In embodiments, the techniques described herein relate to an optical fiber, where the plurality of AR elements is divided into two or more sets of AR elements, where each of the two or more sets of AR elements is connected to at least one of the cladding structure or at least one of the one or more support structures.

In embodiments, the techniques described herein relate to an optical fiber, where the two or more sets of AR elements are uniformly distributed around a perimeter of the hollow interior fiber region.

In embodiments, the techniques described herein relate to an optical fiber, where the two or more sets of AR elements are non-uniformly distributed around a perimeter of the hollow interior fiber region.

In embodiments, the techniques described herein relate to an optical fiber, where the two or more sets of AR elements each have a common design.

In embodiments, the techniques described herein relate to an optical fiber, where the two or more sets of AR elements include a first set of AR elements having a first design; and a second set of AR elements having a second design.

In embodiments, the techniques described herein relate to an optical fiber, where the first set of AR elements is a first nested set of AR elements including a first AR element of the plurality of AR elements, where the walls of the first AR element form a tube extending along the fiber length; and a second AR element of the plurality of AR elements located within an interior region of the first AR element bounded at least in part by the walls of the first AR element, where the second AR element is connected to one or more first support structures of the one or more support structures.

In embodiments, the techniques described herein relate to an optical fiber, where the hollow interior fiber region is filled with a gas.

In embodiments, the techniques described herein relate to an optical fiber, where the hollow interior fiber region is under vacuum.

In embodiments, the techniques described herein relate to an optical fiber including a cladding structure extending along a fiber length providing a hollow interior fiber region; a plurality of anti-resonant (AR) elements formed as walled structures with walls extending along the fiber length; and one or more structures between at least one of the plurality of AR elements and the cladding structure, where the one or more structures are integrated with at least one the cladding structure along a spatially extended integration region, where the one or more structures have a non-uniform thickness profile, where the plurality AR elements is configured to guide light along the fiber length in a central portion of the interior fiber region based on optical anti-resonance.

In embodiments, the techniques described herein relate to an optical fiber, where the spatially extended integration region extends along at least 5% of a circumference of a connected one of the plurality of AR elements.

In embodiments, the techniques described herein relate to an optical fiber, where at least one of the structures is solid.

In embodiments, the techniques described herein relate to an optical fiber, where at least one of the structures is porous.

In embodiments, the techniques described herein relate to an optical fiber, where at least one of the structures is hollow.

In embodiments, the techniques described herein relate to an optical fiber, where the plurality of AR elements include one or more sets of nested AR elements, where at least one of the one or more sets of nested AR elements includes a first AR element of the plurality of AR elements; and a second AR element of the plurality of AR elements located within an interior region of the first AR element bounded at least in part by the walls of the first AR element, where the second AR element is connected to one or more first support structures, where the first AR element surrounds an interior region and further includes one or more first support structures in the interior region and formed as at least a portion of at least one of the walls.

In embodiments, the techniques described herein relate to an optical fiber, where the one or more first support structures are formed from the walls of the first AR element, where the walls of the first AR element have the non-uniform wall thickness profile in a cross-sectional plane defining shapes of the one or more first support structures, where the cross-sectional plane is orthogonal to a direction along the fiber length.

In embodiments, the techniques described herein relate to an optical fiber, where a fill factor defined as a ratio of an area of the walls of the first AR element in the cross-sectional plane to an area of the first AR element bounded by an outer face in the cross-sectional plane is at least 5%.

In embodiments, the techniques described herein relate to an optical fiber, where a fill factor defined as a ratio of an area of the walls of the first AR element in the cross-sectional plane to an area of the first AR element bounded by an outer face in the cross-sectional plane is at least 20%.

In embodiments, the techniques described herein relate to an optical fiber, where a fill factor defined as a ratio of an area of the one or more first support structures in the cross-sectional plane to an area of the first AR element bounded by an outer face in the cross-sectional plane is at least 5%.

In embodiments, the techniques described herein relate to an optical fiber, where a fill factor defined as a ratio of an area of the one or more first support structures in the cross-sectional plane to an area of the first AR element bounded by an outer face in the cross-sectional plane is at least 20%.

In embodiments, the techniques described herein relate to an optical fiber, where the second AR element is connected to the one or more first support structures at one or more contact points, where the non-uniform wall thickness profile of the first AR element is selected to provide selected separation distances between the one or more contact points and an outer face of the first AR element.

In embodiments, the techniques described herein relate to an optical fiber, where the second AR element is connected to the one or more first support structures at two or more contact points.

In embodiments, the techniques described herein relate to an optical fiber, where the one or more first support structures include at least one of a notch or groove to provide the two or more contact points.

In embodiments, the techniques described herein relate to an optical fiber, where the second AR element is connected to the one or more first support structures along a spatially extended integration region.

In embodiments, the techniques described herein relate to an optical fiber, where the spatially extended integration region extends along at least 5% of a circumference of the first AR element.

In embodiments, the techniques described herein relate to an optical fiber, where at least one of the selected separation distances is at least 5% of a radial distance between a centroid of the first AR element and the outer face of the first AR element at a location crossing an associated one of the one or more contact points.

In embodiments, the techniques described herein relate to an optical fiber, where at least one of the selected separation distances is at least 30% of a radial distance between a centroid of the first AR element and the outer face of the first AR element at a location crossing an associated one of the one or more contact points.

In embodiments, the techniques described herein relate to an optical fiber, where the one or more first support structures position the second AR element within the interior region of the first AR element.

In embodiments, the techniques described herein relate to an optical fiber, where the one or more first support structures center the second AR element within the interior region of the first AR element.

In embodiments, the techniques described herein relate to an optical fiber, where at least one of the one or more first support structures are solid.

In embodiments, the techniques described herein relate to an optical fiber, where at least one of the one or more first support structures have air gaps extending along the fiber length.

In embodiments, the techniques described herein relate to an optical fiber, where at least one of the one or more first support structures are porous.

In embodiments, the techniques described herein relate to an optical fiber, where the one or more first support structures include a single first support structure shaped as at least one of an ellipse or a circle in a cross-sectional plane orthogonal to a direction along the fiber length.

In embodiments, the techniques described herein relate to an optical fiber, where the one or more first support structures include a single first support structure shaped as at least one of a truncated ellipse or a truncated circle in a cross-sectional plane orthogonal to a direction along the fiber length.

In embodiments, the techniques described herein relate to an optical fiber, where the single first support structure has a notch.

In embodiments, the techniques described herein relate to an optical fiber, where the one or more first support structures include a single first support structure shaped as a trapezium in a cross-sectional plane orthogonal to a direction along the fiber length.

In embodiments, the techniques described herein relate to an anti-resonant hollow-core optical fiber (AR-HCF) including a cladding structure extending along a length of the AR-HCF providing a hollow interior fiber region; a first set of anti-resonant (AR) elements formed as walled structures with walls extending along the length of the AR-HCF, where the first set of AR elements is distributed around and in contact with a wall of the hollow interior fiber region; and a second set of AR elements formed as walled structures extending along the length of the AR-HCF, where the second set of AR elements is distributed around and in contact with the wall of the hollow interior fiber region and interleaved with the first set of AR elements, where an outer dimension of the first set of AR elements is larger than an outer dimension of the second set of AR elements.

In embodiments, the techniques described herein relate to a AR-HCF, where the first set of AR elements has a common number of elements as the second set of AR elements.

In embodiments, the techniques described herein relate to a AR-HCF, where the first set of AR elements has a different number of elements as the second set of AR elements.

In embodiments, the techniques described herein relate to a AR-HCF, where at least one of the first set of AR elements or the second set of AR elements includes one or more nested sets of AR elements.

In embodiments, the techniques described herein relate to a AR-HCF, where the first set of AR elements or the second set of AR elements includes a first set of one or more nested sets of AR elements, where the second set of AR elements includes a second set of one or more nested sets of AR elements.

In embodiments, the techniques described herein relate to a AR-HCF, where the first set of AR elements are spatially separated from the second set of AR elements.

In embodiments, the techniques described herein relate to a AR-HCF, where at least one of the first set of AR elements contacts at least one of the second set of AR elements.

In embodiments, the techniques described herein relate to a AR-HCF, where the first set of AR elements and the second set of AR elements contact the cladding structure.

In embodiments, the techniques described herein relate to a AR-HCF, further including one or more additional elements located between the cladding structure and at least one of the first set of AR elements or at least one of the second set of AR elements.

In embodiments, the techniques described herein relate to a AR-HCF, further including one or more additional sets of AR elements formed as walled structures extending along the length of the AR-HCF.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 1 is a simplified cross-section of an AR-HCF, in accordance with one or more embodiments of the present disclosure.

FIG. 2A is a cross-sectional view of one embodiment of an AR-HCF, in accordance with one or more embodiments of the present disclosure.

FIG. 2B is a cross-sectional view of one embodiment of an AR-HCF, in accordance with one or more embodiments of the present disclosure.

FIG. 2D is a cross-sectional view of one embodiment of an AR-HCF, in accordance with one or more embodiments of the present disclosure.

FIG. 2E is a cross-sectional view of one embodiment of an AR-HCF, in accordance with one or more embodiments of the present disclosure.

FIG. 2Q is a cross-sectional view of one embodiment of an AR-HCF, in accordance with one or more embodiments of the present disclosure.

FIG. 6A is a cross-sectional view of one embodiment of an AR-HCF with support structures including multiple air gaps, in accordance with one or more embodiments of the present disclosure.

FIG. 6B-6C are cross-sectional view of embodiments of an AR-HCF with support structures formed as walled structures, in accordance with one or more embodiments of the present disclosure.

FIG. 7H is a cross-sectional view of one embodiment of an AR-HCF with a perimeter structures, in accordance with one or more embodiments of the present disclosure.

FIG. 7I is a cross-sectional view of one embodiment of an AR-HCF with a perimeter structures, in accordance with one or more embodiments of the present disclosure.

FIG. 10 is a plot of confinement loss for variations of an AR-HCF with the design shown in FIG. 2A with varying thickness of the first support structures as well as for an AR fiber without support structures, in accordance with one or more embodiments of the present disclosure.

FIG. 15 is a cross-sectional view of one design of an AR-HCF, in accordance with one or more embodiments of the present disclosure.

FIG. 20 is a cross-sectional view of one design of an AR-HCF, in accordance with one or more embodiments of the present disclosure.

FIG. 25 is a plot of confinement losses for the fundamental mode (LP01) and higher-order modes (LP11) for an AR-HCF with a traditional nested AR nodeless fiber (NANF) design including only a single set of AR elements along with an AR-HCF with the design depicted in FIG. 14, in accordance with one or more embodiments of the present disclosure

DETAILED DESCRIPTION

Figure 2C:
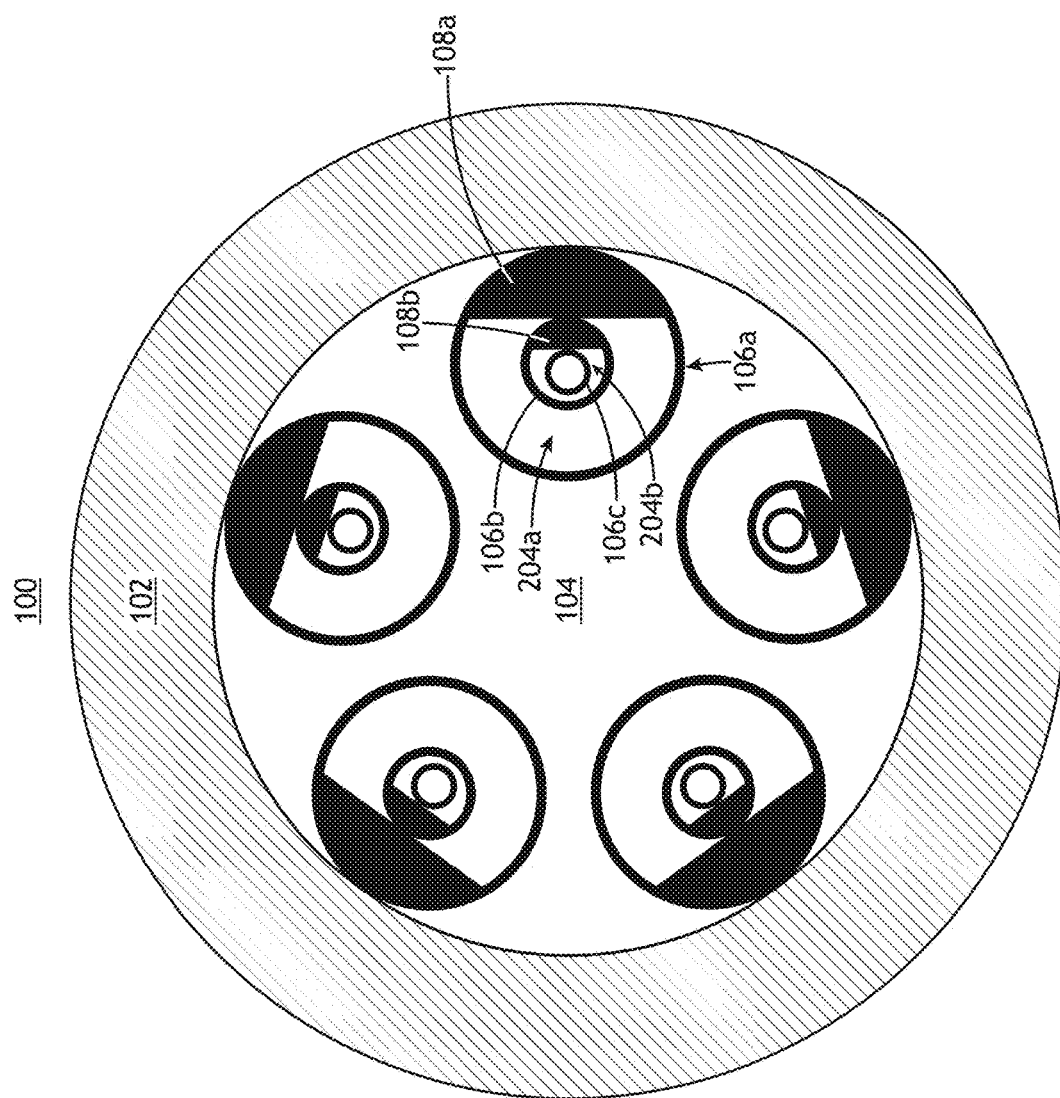
FIG. 2C is a cross-sectional view of one embodiment of an AR-HCF, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing anti-resonant hollow-core fibers (AR-HCFs). Further with anti-resonant (AR) elements and support structures. The support structures may provide various functions such as, but not limited to, positioning various AR elements, improving optical performance properties, providing structural support, or improving mechanical properties (including manufacturability, such as improved manufacturing tolerance and stability throughout the fiber-fabrication process) of the AR-HCF. Further, support structures may provide additional anti-resonant behavior and are not limited to non-resonant structures.

Designs of an AR-HCF are described in U.S. Provisional Patent Application 63/465,716 filed on May 11, 2023, U.S. Provisional Patent Application 63/465,762 filed on May 11, 2023, and U.S. Provisional Patent Application 63/470,560 filed on Jun. 2, 2023, which are all incorporated herein by reference in their entireties.

For example, an AR-HCF may include one or more cladding structures providing a hollow interior fiber region extending a length of the fiber (e.g., along a fiber length) and multiple AR elements distributed around the interior fiber region, which forms a hollow core surrounded by AR elements. Further, such an AR-HCF may have any suitable size. In some embodiments, the hollow core size of an AR-HCF fiber is between 5× and 100× the guided wavelength. For example, the hollow core size of an AR-HCF fiber may be, but is not limited to, 5×, 10×, 20×, 30×, 50×, or 100× the guided wavelength.

Any of the AR elements may include walled structures with walls that extend along the fiber length. For example, the walls of the AR elements and/or the distribution of the AR elements more generally may provide guiding of light in a central hollow interior region of the AR-HCF through anti-resonant optical phenomena. Further, some of the AR elements may be nested. As an illustration, one AR element may be located within an interior region bounded at least in part by walls of another AR element.

In some embodiments, AR elements distributed around a circumference of the hollow interior fiber region (or nested sets thereof) are spatially separated. Spatially separated sets of nested AR elements are described generally in W. Belardi and J. C. Knight, "Negative curvature fibers with reduced leakage loss," in Optical Fiber Communication Conference, OSA Technical Digest (online) (Optica Publishing Group, 2014), paper Th2A.45; which is incorporated herein by reference in its entirety. AR elements may also be non-circular in cross section. For example, AR elements may be parabolic, elliptical, shaped like a snowman or figure "8," or have other cross sections. Nested AR elements may or may not lie on an imaginary line extending from the center of the AR-HCF. For example, an inner AR element and an outer AR element (e.g., in a nested arrangement) may not lie on the same imaginary line extending from the center of the AR-HCF.

It is contemplated herein that various aspects of the performance of an AR-HCF such as, but not limited to, the confinement of light within the interior fiber region may be impacted by the placement and arrangement of the various AR elements. In some embodiments, at least one of the AR elements in an AR-HCF is connected to one or more support structures, which may extend from the cladding structure and/or another of the AR elements. Such support structures may or may not provide AR properties directly. For example, a support structure may be relatively thick and may thus not operate as an antiresonant element itself. However, such a support structure may position one or more AR elements, or portions thereof, within the AR-HCF to provide desired performance characteristics. More broadly, it is recognized herein that various aspects of the performance of an AR-HCF such as, but not limited to, the confinement of light within the interior fiber region may generally depend on the complete distribution of all associated elements including any support structures.

A support structure may generally have any shape suitable for positioning an AR element within an AR-HCF. Further, a support structure may be located at any location within an AR-HCF.

In some embodiments, a support structure extends from one AR element to another. For example, a support structure may extend from or otherwise be a part of one or more AR elements. As an illustration, an AR element may have walls with a non-uniform thickness profile (e.g., as measured in a cross-sectional plane orthogonal to a direction along the fiber length). In this configuration, a support structure may be formed as a relatively thick portion of the walls of an AR element. It is contemplated herein that such a configuration may be suitable for, but not limited to, positioning a nested AR element within an interior region of another AR element.

In some embodiments, a support structure is located between the cladding structure and one or more AR elements. For example, such a support structure may be formed as a rod, a pedestal, a tube, a slab with a rectangular cross section, a slab with a circular cross section, a slab with a cross section of less than a whole circle (such as half or a part of a circle), or a combination thereof. Further, such a support structure may be solid, porous, or hollow.

Various classes of support structures are contemplated herein. These classes may distinguish support structures based on properties such as, but not limited to, location within an AR-HCF, connections to additional elements with an AR-HCF, structural properties, and/or optical properties (e.g., antiresonant properties, resonant properties, a number of nodes, or the like).

For example, numerical designations (e.g., Class 1, Class 2, or the like) may be used herein to identify a location of a support structure within an AR-HCF. Put another way, numerical designations may identify additional elements in an AR-HCF that a support structure may contact or otherwise be integrated with. As an illustration, a Class 1 support structure may be located within an interior portion of an AR element. As another illustration, a Class 2 support structure may be located between an AR element and an interior wall of a cladding structure. Table 1 depicts numerical class designations.

TABLE 1

| Class Designator | Property |
| --- | --- |
| Class 1 | Support structure in an interior region of an AR element |
| Class 2 | Support structure attached to a cladding structure and/or an exterior region of an AR element |

As another example, alphabetic designations (e.g., Class A, Class B, or the like) may be used herein to identify a degree of integration between a support structure (or a portion thereof) and another element in an AR-HCF (e.g., an AR element, a cladding structure, or the like). As an illustration, a Class A integration may include an extended integration region (e.g., an extended touchpoint, an extended node, or the like) region with another element in an AR-HCF. As another illustration, a Class B integration may include multiple integration regions (e.g., multiple touchpoints, multiple nodes, or the like) with another element in an AR-HCF. For example, a support structure may have notches or "V" grooves providing multiple integration regions (e.g., multiple touchpoints) with another element (e.g., an AR element, a cladding structure, or the like). The use of multiple integration regions may provide various benefits including, but not limited to, providing robust alignment of elements within the AR-HCF, and providing high manufacturing tolerance and stability throughout the fiber-fabrication process as well as deployment. As another illustration, a Class C integration may include a single spatially-limited integration region (e.g., a single touchpoint, a single node, or the like). Table 2 depicts alphabetic class designations.

TABLE 2

| Class Designator | Property |
| --- | --- |
| Class A | Spatially-extended integration of a support structure with an additional element |
| Class B | Multiple integration regions of a support structure with an additional element |

TABLE 2-continued

| Class Designator | Property |
| --- | --- |
| Class C | Single spatially-limited integration region of a support structure with an additional element |

Numerical and alphabetic designations may be combined into alphanumeric designations to describe support structures with particular properties. As an illustration, a Class 1A support structure may be located in an interior region of an AR element and further be integrated to the AR element along an extended integration region.

Further, a support structure may integrate with multiple additional elements with different degrees of integration. As an illustration, a Class 1 support structure within an interior region of a first AR element (e.g., an outer AR element) may have a Class A integration with the first AR element and a Class B integration with a second AR element (e.g., an inner AR element).

It is contemplated herein that nomenclature used herein to separately describe AR elements and support structures as separate elements is merely illustrative and should not be interpreted as limiting the scope of the present disclosure. For example, the various elements of a fabricated AR-HCF (e.g., AR elements, cladding structures, support structures, and the like) may be fused together into a continuous fiber structure with a designed cross-sectional profile. In this way, the use of separate nomenclature herein to describe different aspects of the cross-sectional profile is merely for convenience of description. For example, some descriptions herein describe a support structure as extending from an AR element. However, such a support structure may be indistinguishable from the AR element such that it may also be accurate to describe the support structure as being integrated into and forming a part of the AR element. For example, a support structure may be integrated with an AR element in such a way that the AR element and the support structure are one cohesive element.

Referring now to FIGS. 1-25, systems and methods providing AR-HCFs with support structures are described in greater detail, in accordance with one or more embodiments of the present disclosure.

FIG. 1 is a simplified cross-section of an AR-HCF 100, in accordance with one or more embodiments of the present disclosure. In particular, FIG. 1 depicts a cross-section of the AR-HCF 100 in an X-Y plane, where a length of the AR-HCF 100 extends along the Z direction (e.g., a direction along the fiber length). It is to be understood that an AR-HCF 100 may generally be flexible and/or bend such that the fiber length need not extend along a straight line. In this way, the cross-sectional view depicted in FIG. 1 may correspond to a plane orthogonal to the fiber length at any selected location.

In some embodiments, an AR-HCF 100 includes one or more cladding structures 102 providing a hollow interior region 104. For example, FIG. 1 depicts an AR-HCF 100 with a single cladding structure 102 formed as a circular tube. Additional non-limiting variations of the cladding structures 102 are described below, for example, with respect to FIGS. 4A-4C.

In some embodiments, an AR-HCF 100 includes multiple AR elements 106 distributed in the hollow interior region 104 provided by the cladding structures 102. An AR-HCF 100 may generally have any number of AR elements 106 and the AR elements 106 may be evenly or unevenly distributed around a perimeter of the hollow interior region 104. For example, FIG. 1 depicts a non-limiting configuration of an AR-HCF 100 with seven AR elements 106 uniformly distributed around a perimeter of the hollow interior region 104 formed by the cladding structure 102. Further, any of the AR elements 106 may be spatially isolated from other AR elements 106, may be in contact with other AR elements 106, or may be nested within other AR elements 106. In cases where one AR element 106 is nested within another AR element 106 (e.g., within an interior cavity at least partially bounded by another AR element 106), the nested AR elements 106 may be referred to as a set of AR elements 106, a nested set of AR elements 106, or simply as nested AR elements 106. As an illustration, FIG. 1 depicts a configuration with seven sets of nested AR elements 106, where each of the nested AR elements includes a Class 1 support structure to position one AR element 106 within another AR element 106.

In some embodiments, an AR-HCF 100 includes one or more support structures 108, which may position at least one AR element 106 within the AR-HCF 100. For example, at least one AR element 106 may be connected to at least one support structure 108. The support structures 108 may generally be formed as or be in contact with the cladding structures 102 and/or any of the AR elements 106.

Further, the various AR elements 106 within the AR-HCF 100 may have a common design or may have different designs. For instance, FIG. 1 depicts a configuration of an AR-HCF 100 in which all AR elements 106 have a common design, though this is not a requirement. In some embodiments, an AR-HCF 100 includes one or more AR elements 106 with a first design and one or more AR elements 106 with a second design, and so on.

Additionally, the hollow interior region 104, as well as any interior cavities of other structures (e.g., AR elements 106, support structures 108, cladding structures 102, or the like) may be under vacuum or filled with any gas (e.g., ambient air, nitrogen, argon, or any selected composition).

Figure 2F:
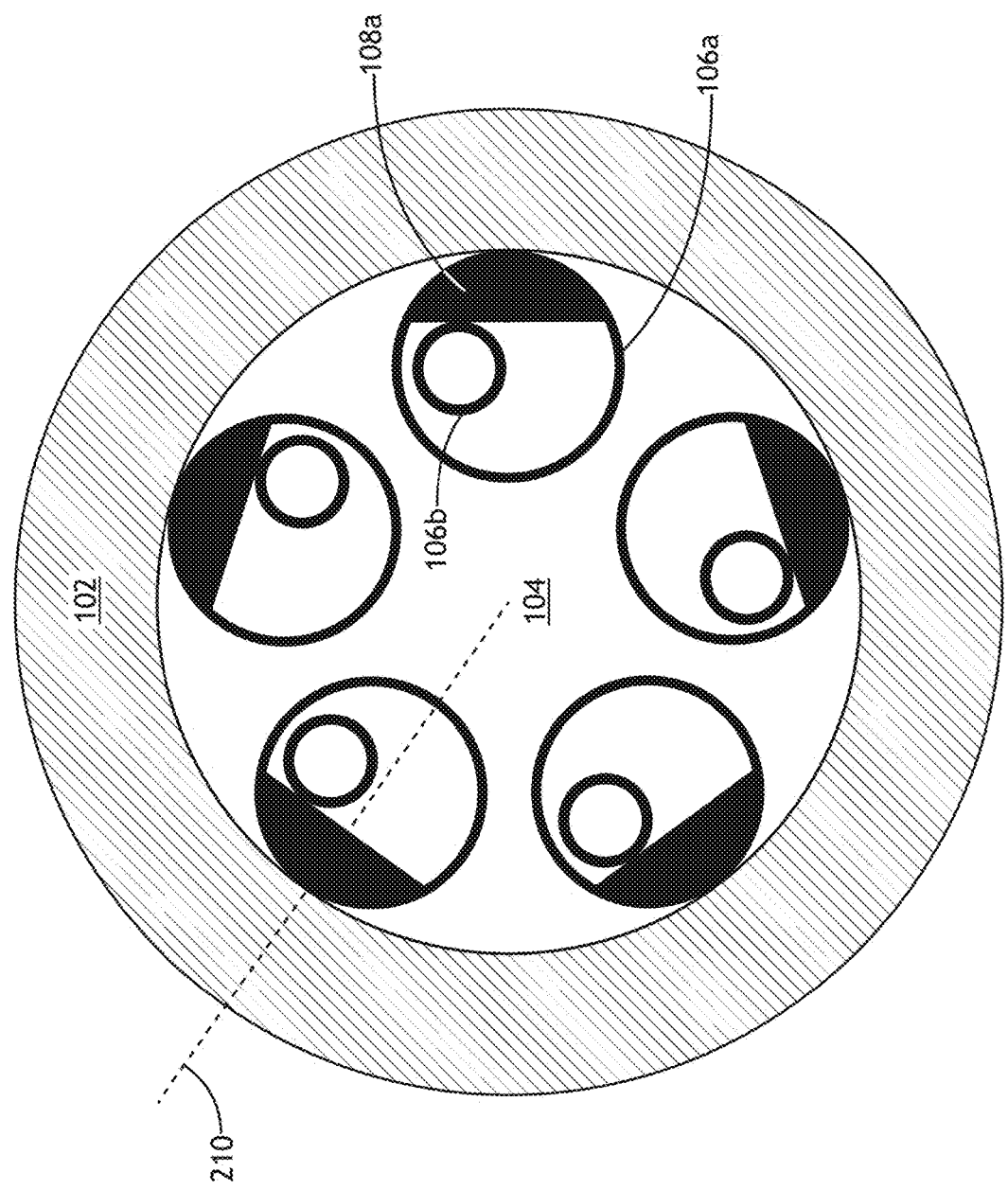
FIG. 2F is a cross-sectional view of one embodiment of an AR-HCF, in accordance with one or more embodiments of the present disclosure.
Figure 2G:
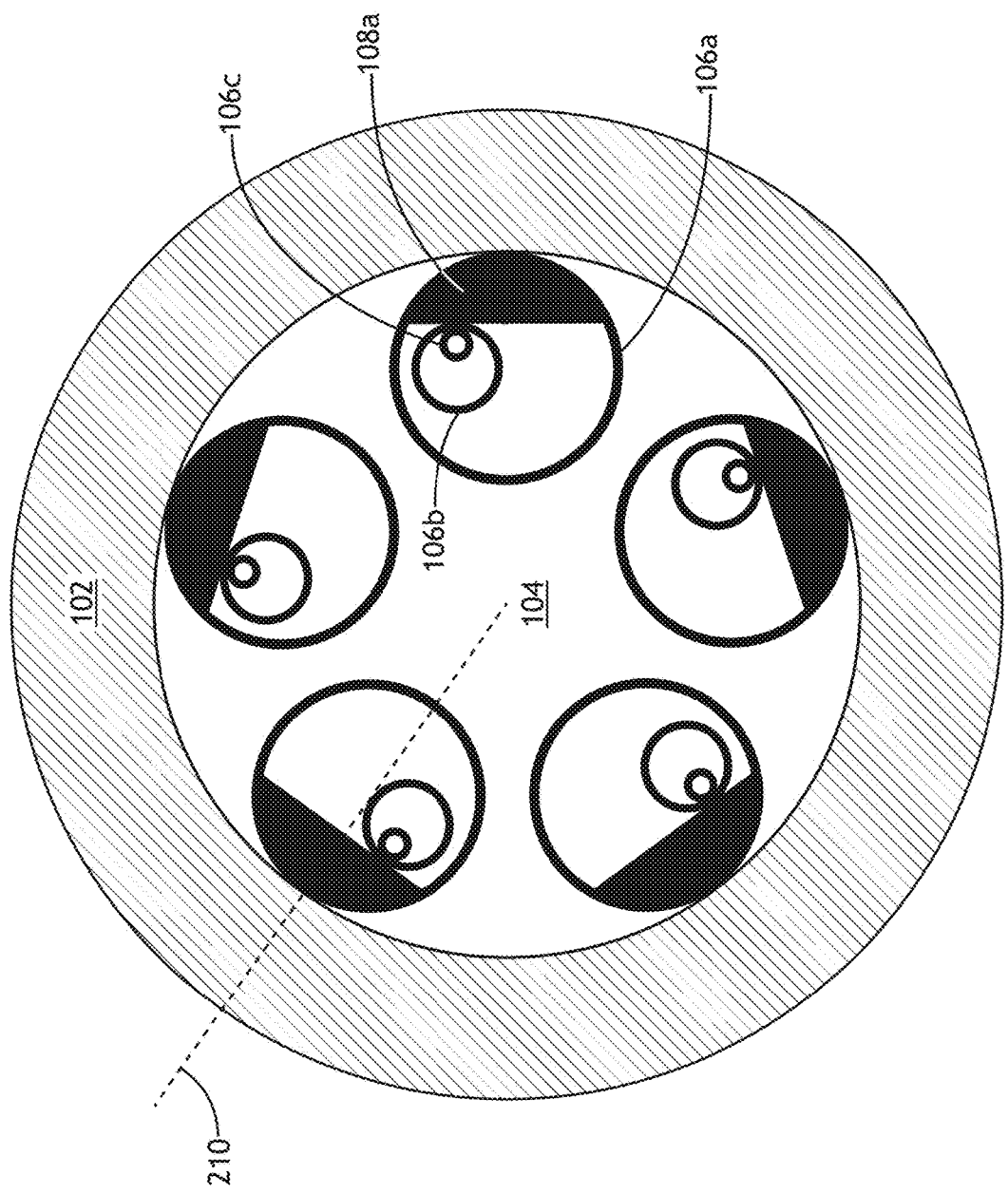
FIG. 2G is a cross-sectional view of one embodiment of an AR-HCF, in accordance with one or more embodiments of the present disclosure.
Figure 2H:
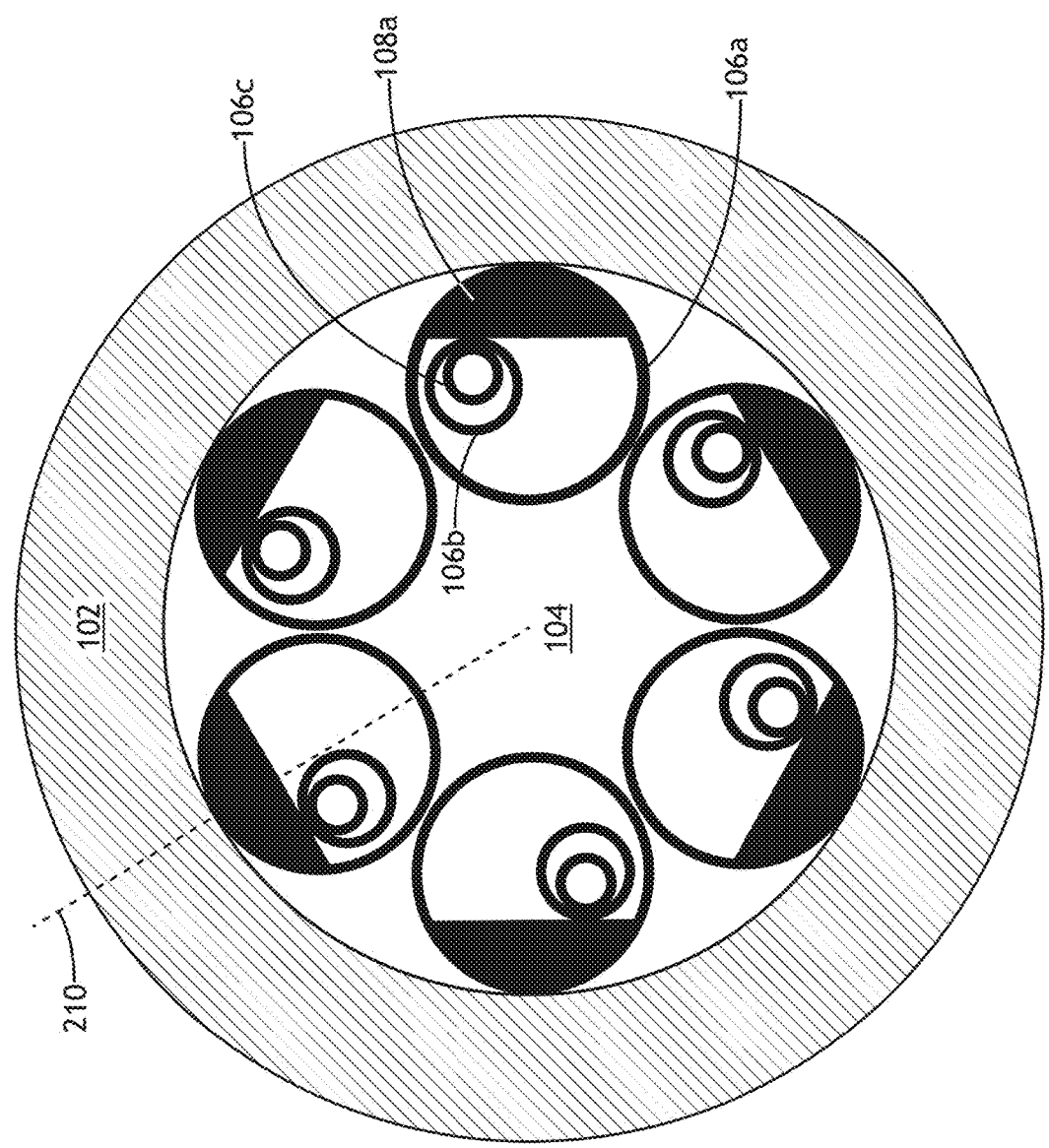
FIG. 2H is a cross-sectional view of one embodiment of an AR-HCF, in accordance with one or more embodiments of the present disclosure.
Figure 2I:
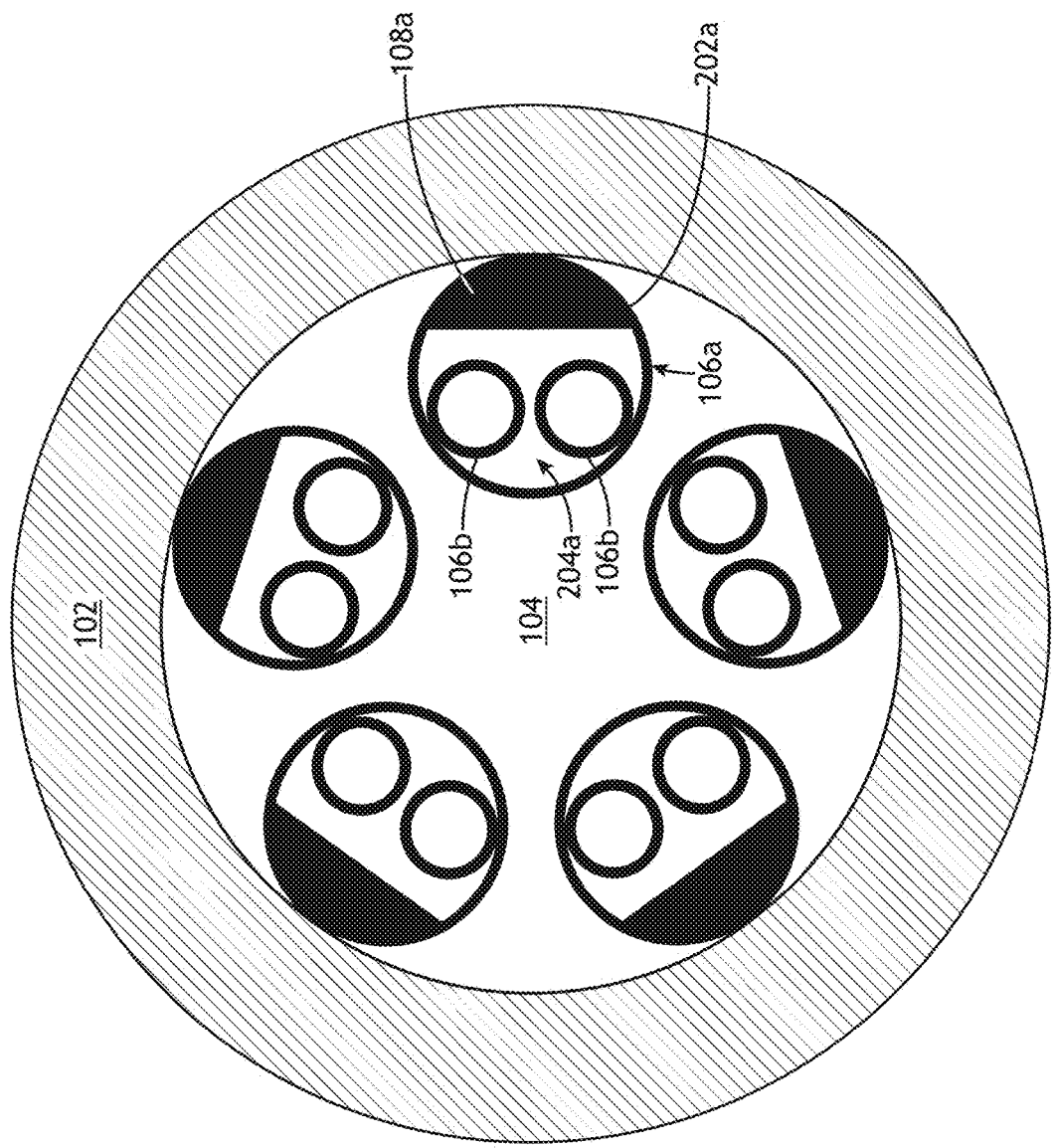
FIG. 2I is a cross-sectional view of one embodiment of an AR-HCF, in accordance with one or more embodiments of the present disclosure.
Figure 2J:
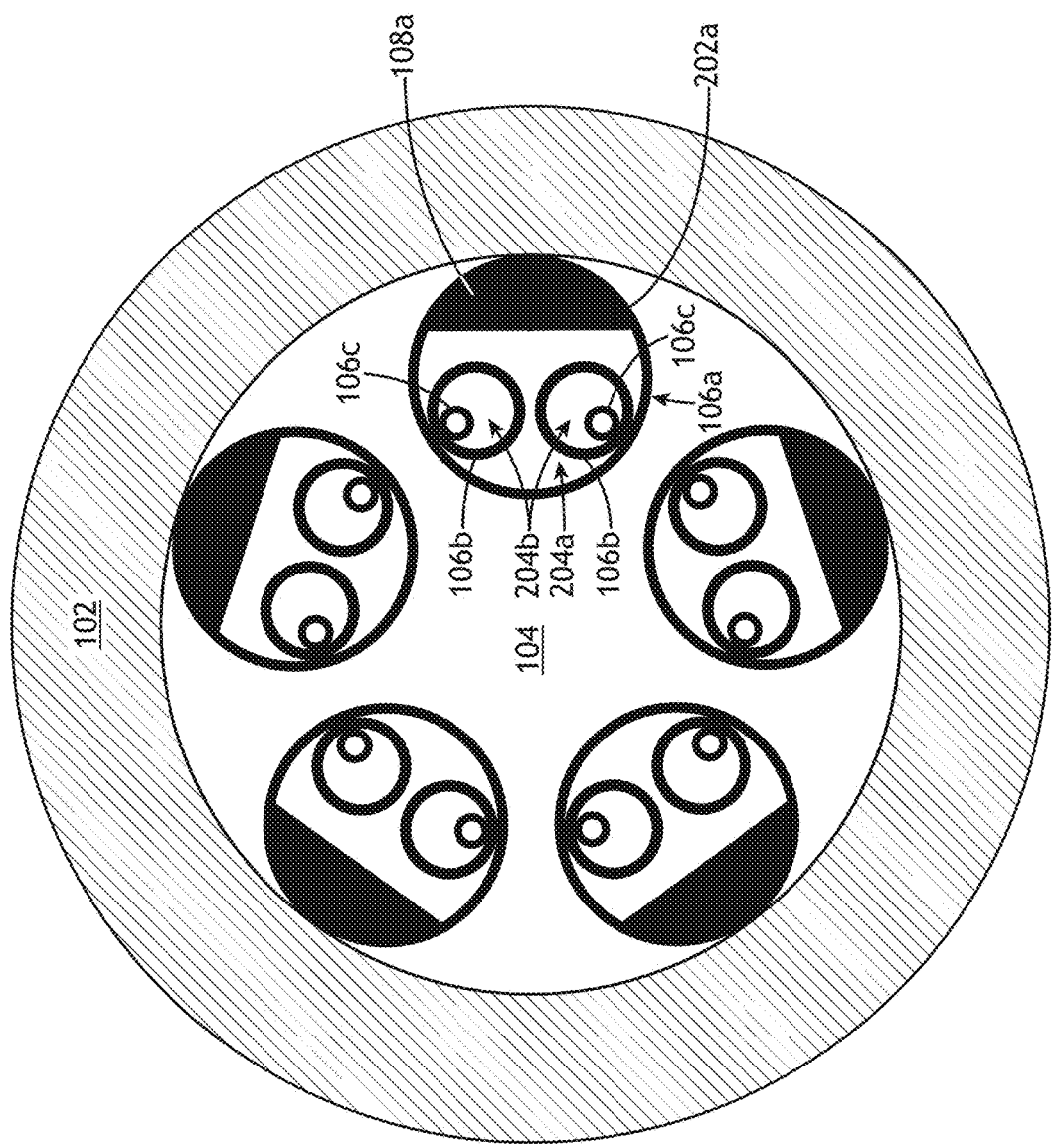
FIG. 2J is a cross-sectional view of one embodiment of an AR-HCF, in accordance with one or more embodiments of the present disclosure.
Figure 2K:
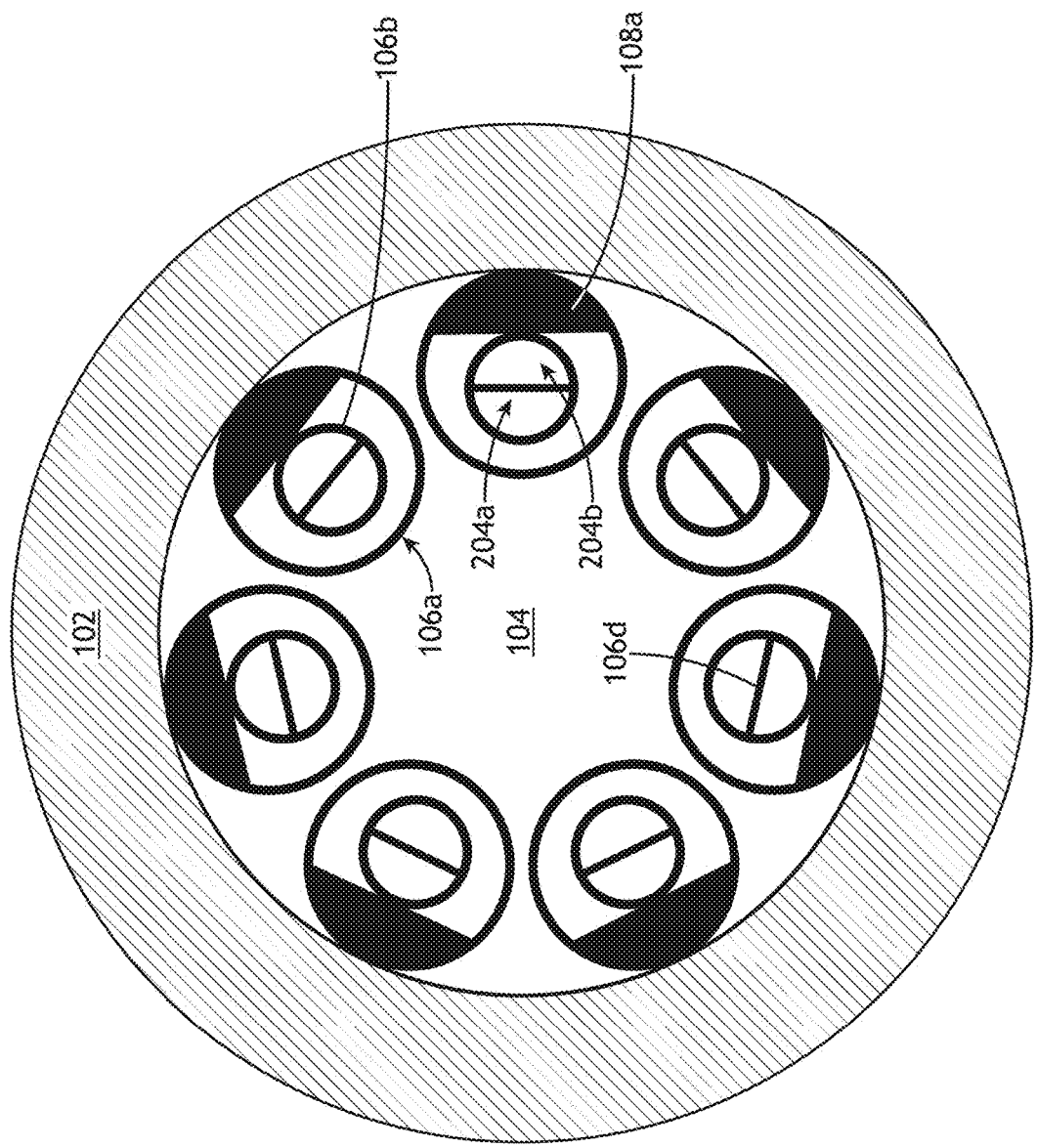
FIG. 2K is a cross-sectional view of one embodiment of an AR-HCF, in accordance with one or more embodiments of the present disclosure.
Figure 2L:
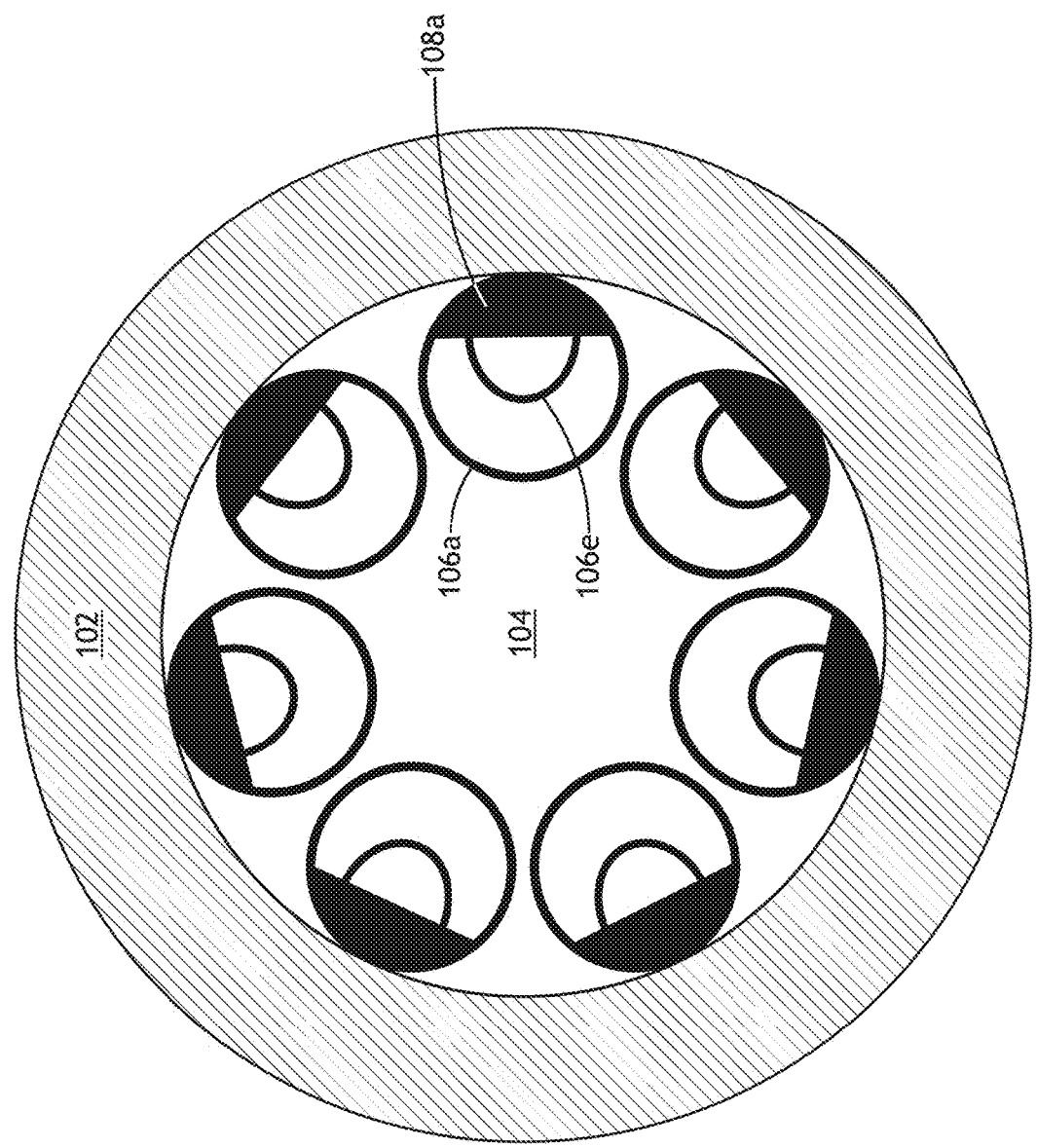
FIG. 2L is a cross-sectional view of one embodiment of an AR-HCF, in accordance with one or more embodiments of the present disclosure.
Figure 2M:
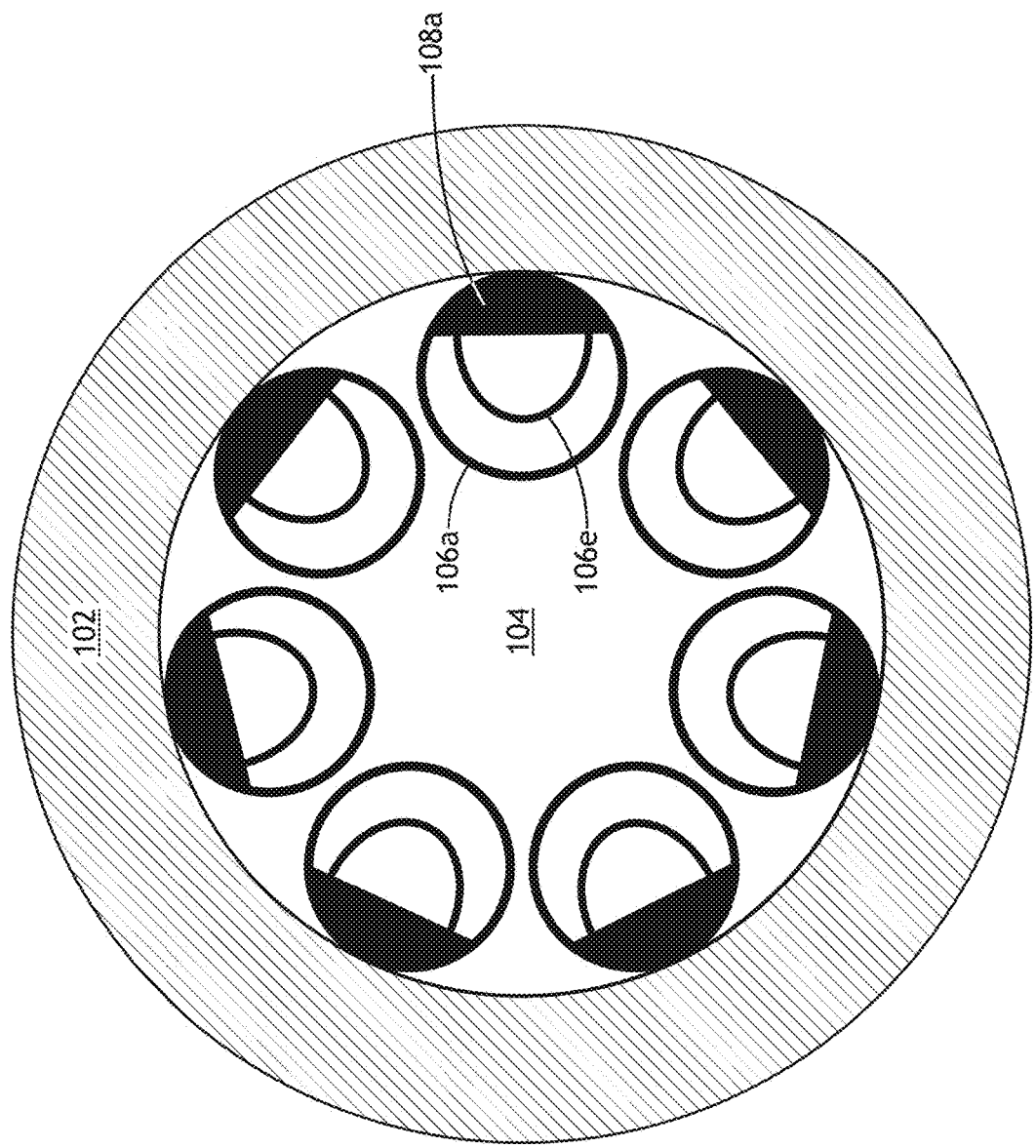
FIG. 2M is a cross-sectional view of one embodiment of an AR-HCF, in accordance with one or more embodiments of the present disclosure.
Figure 2N:
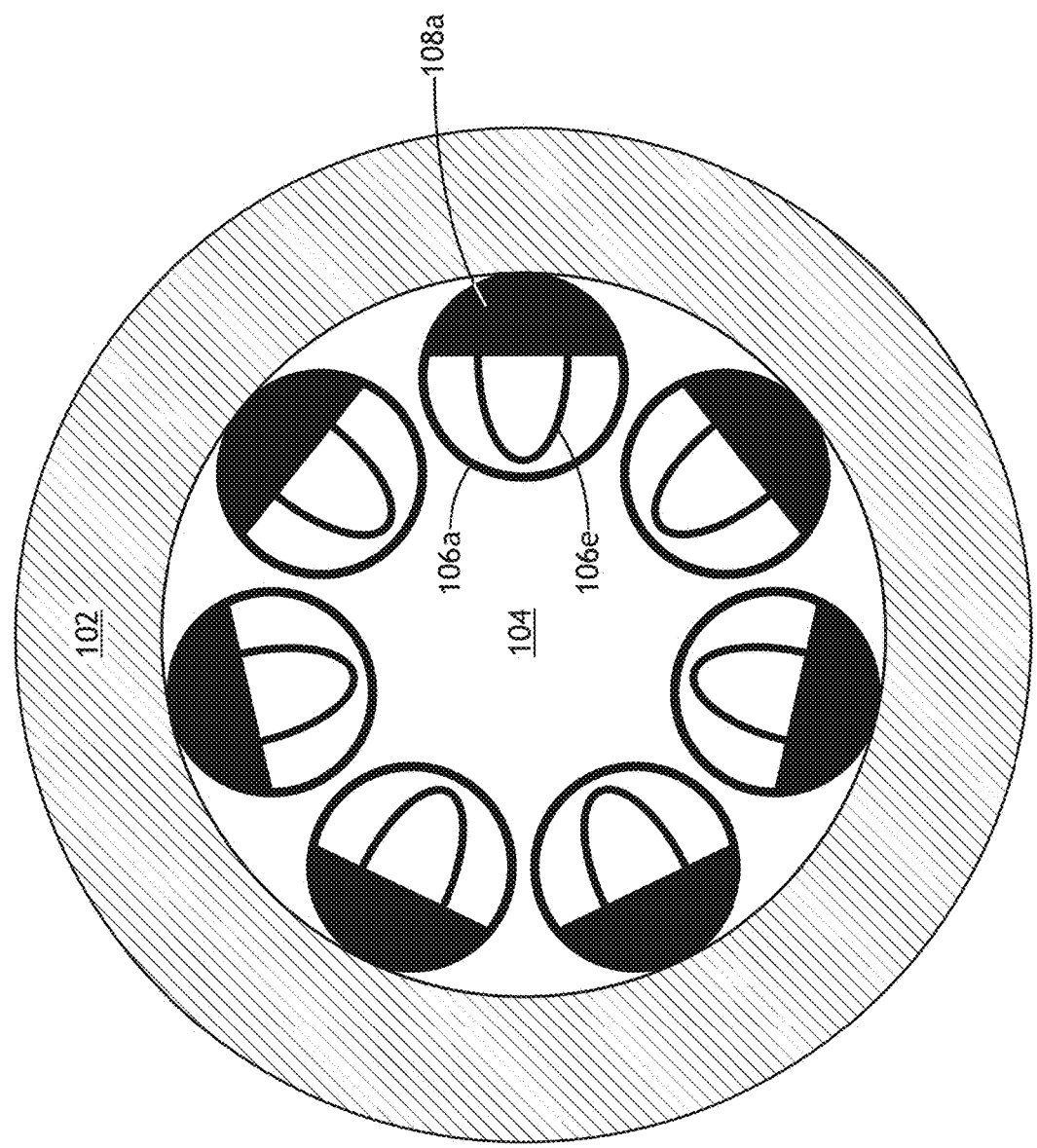
FIG. 2N is a cross-sectional view of one embodiment of an AR-HCF, in accordance with one or more embodiments of the present disclosure.
Figure 2O:
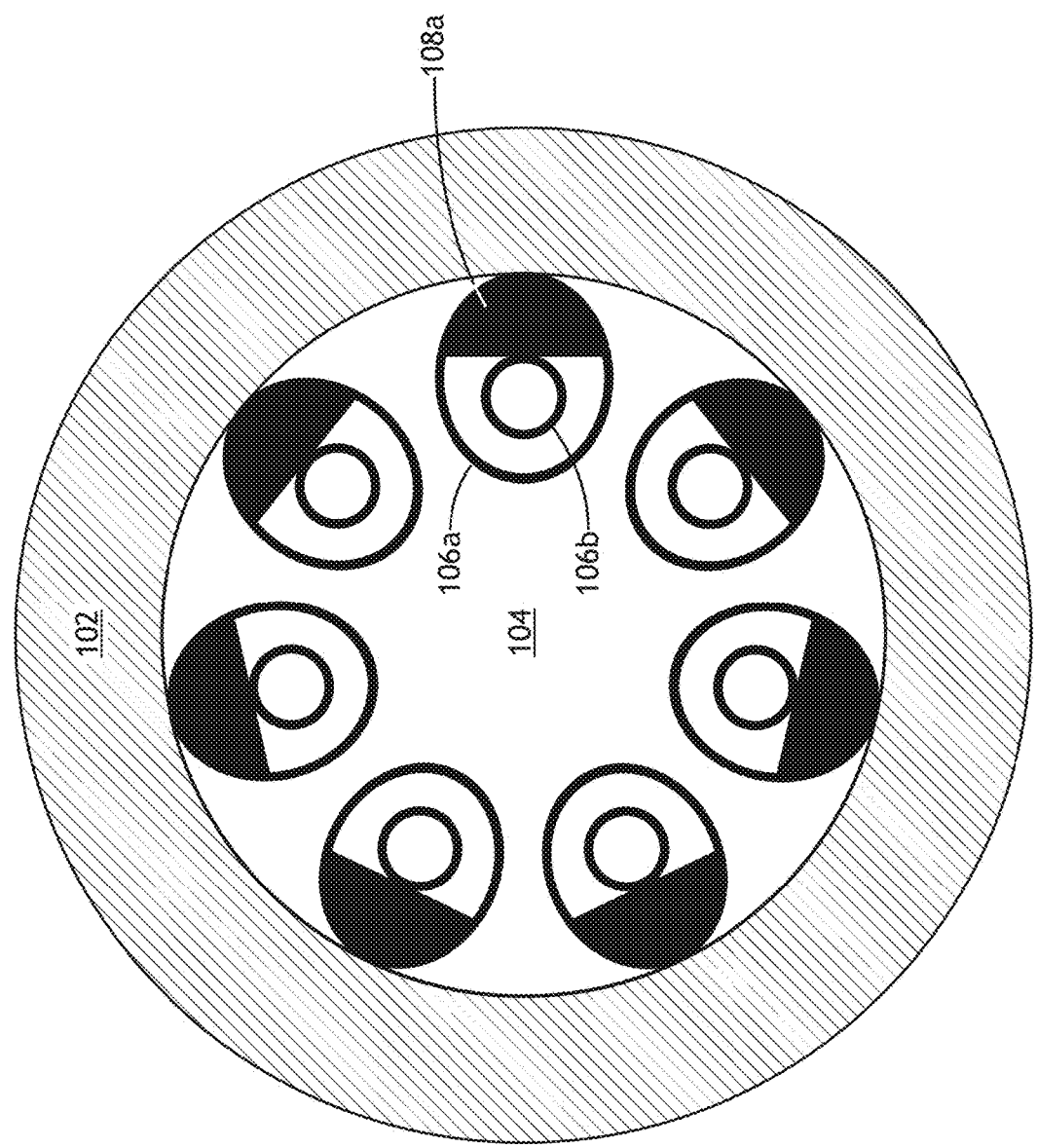
FIG. 2O is a cross-sectional view of one embodiment of an AR-HCF, in accordance with one or more embodiments of the present disclosure.
Figure 2P:
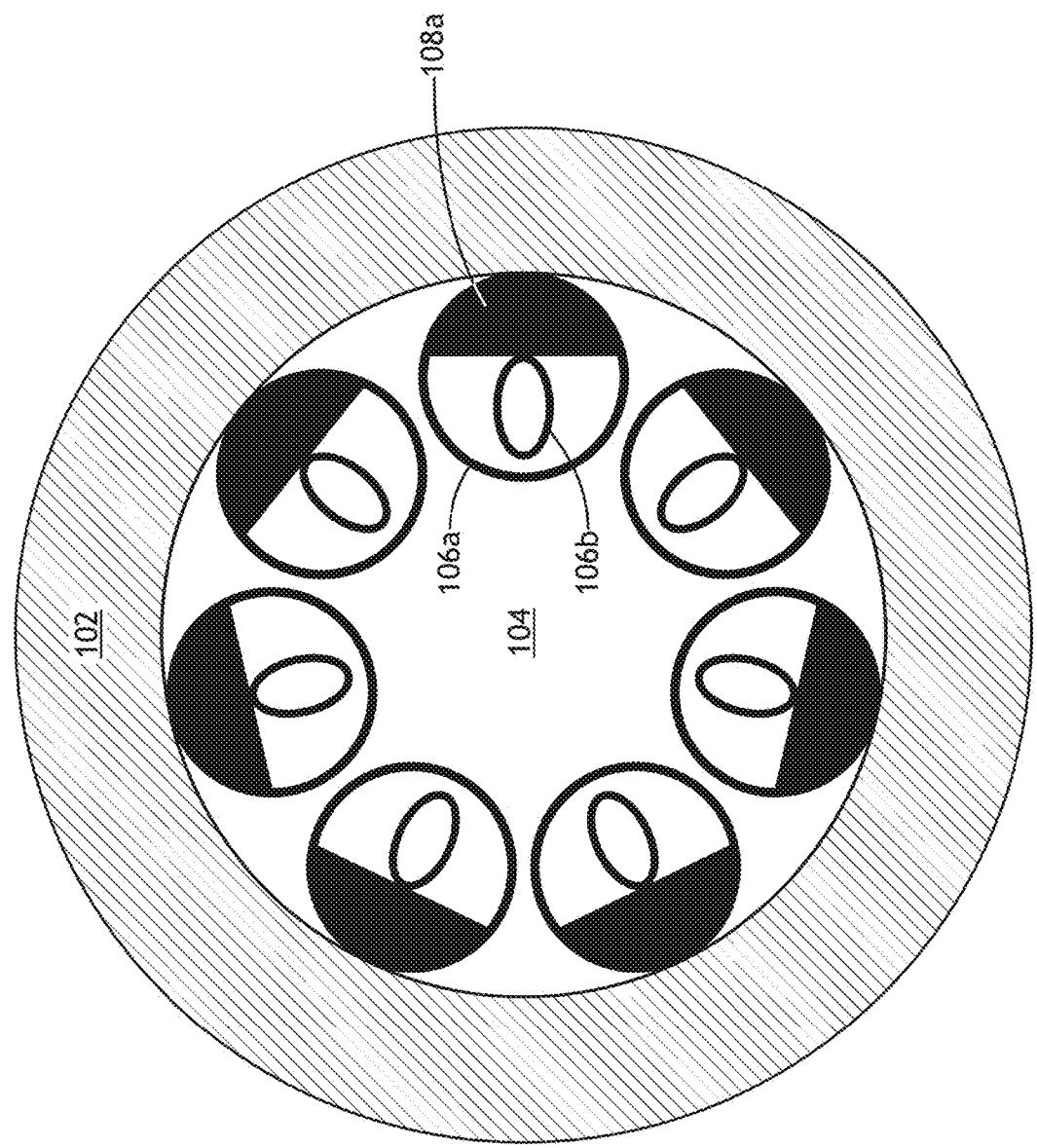
FIG. 2P is a cross-sectional view of one embodiment of an AR-HCF, in accordance with one or more embodiments of the present disclosure.
Figure 2R:
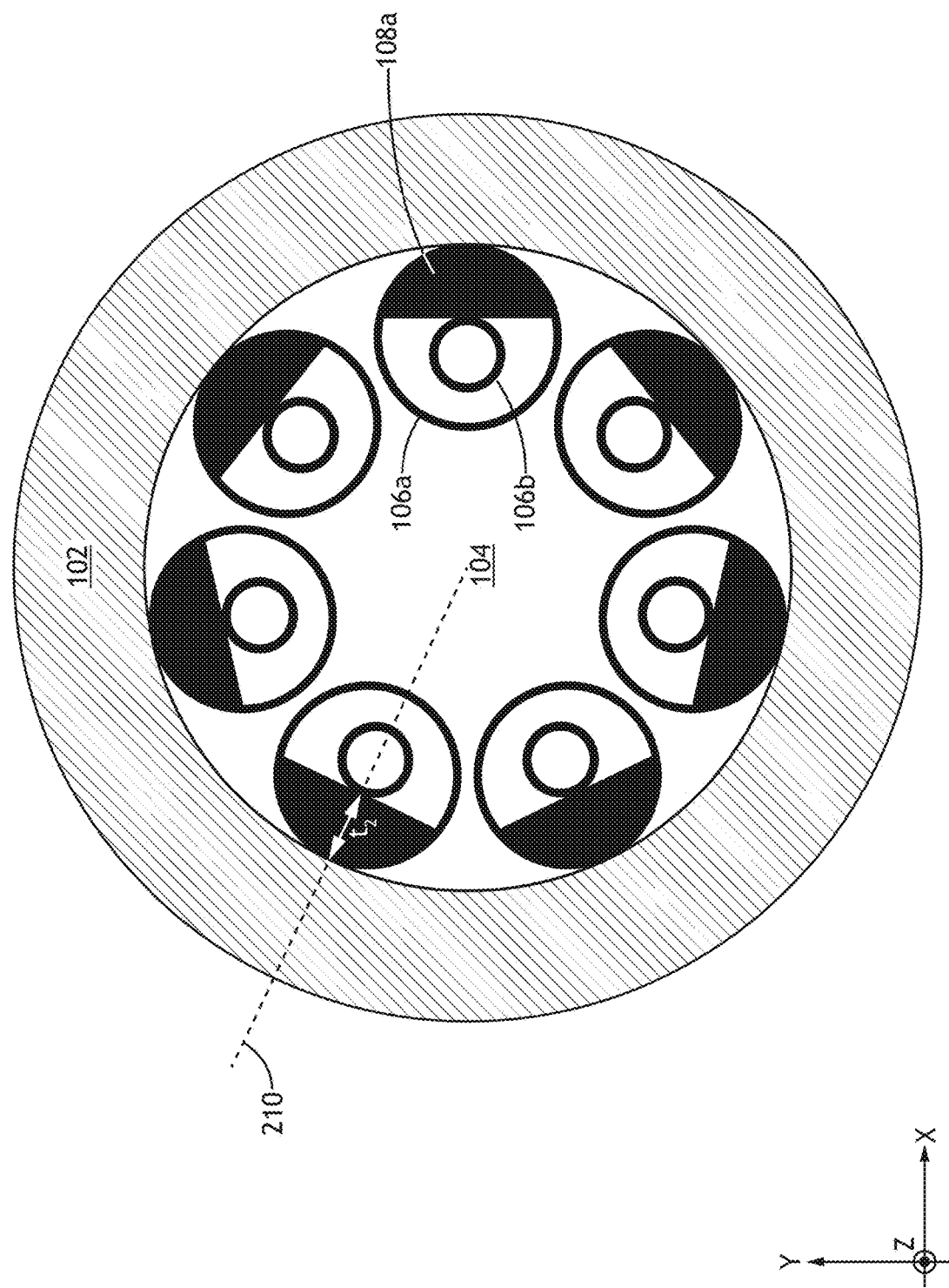
FIG. 2R is a cross-sectional view of one embodiment of an AR-HCF, in accordance with one or more embodiments of the present disclosure.
Figure 2S:
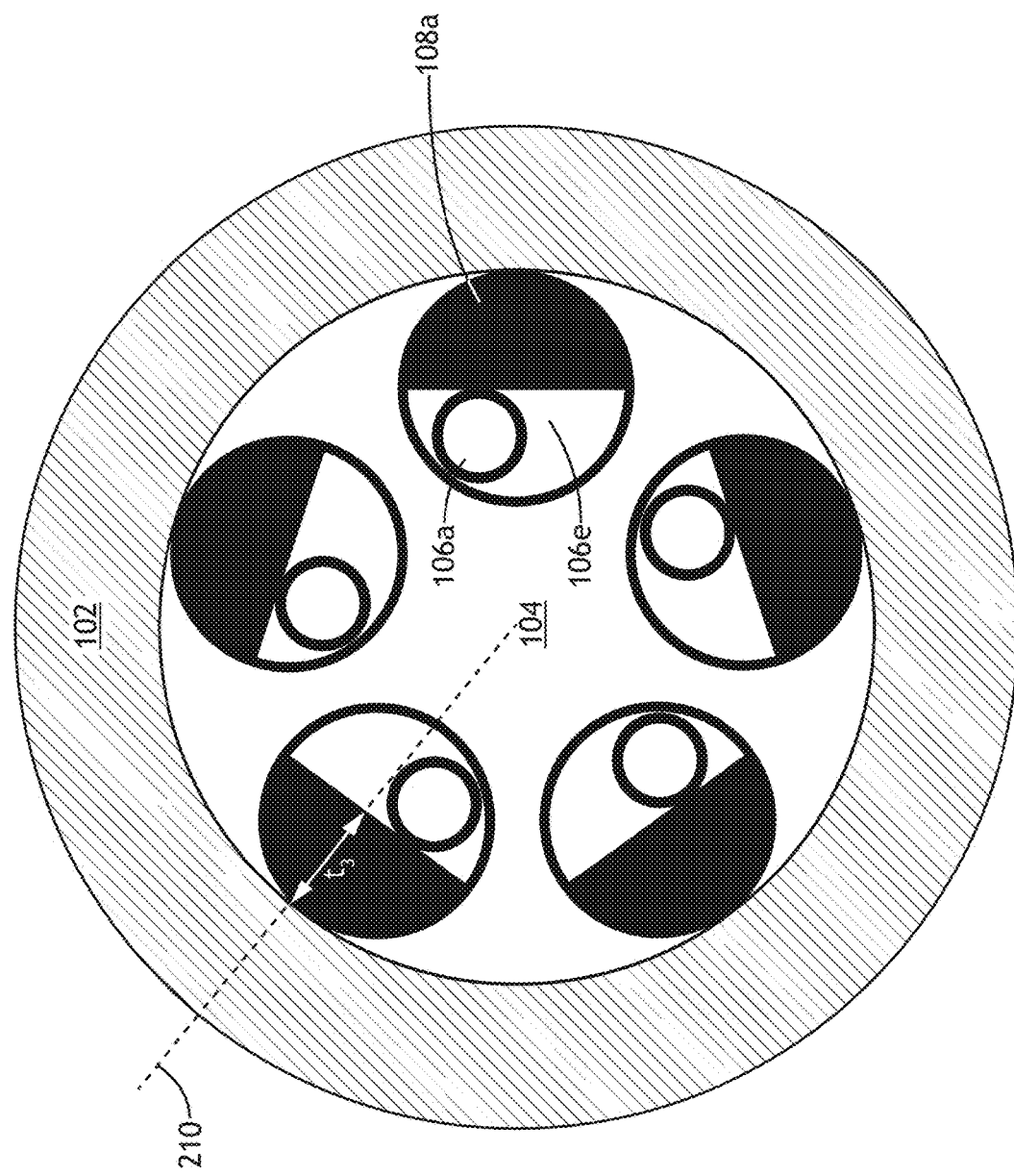
FIG. 2S is a cross-sectional view of one embodiment of an AR-HCF, in accordance with one or more embodiments of the present disclosure.
Figure 2T:
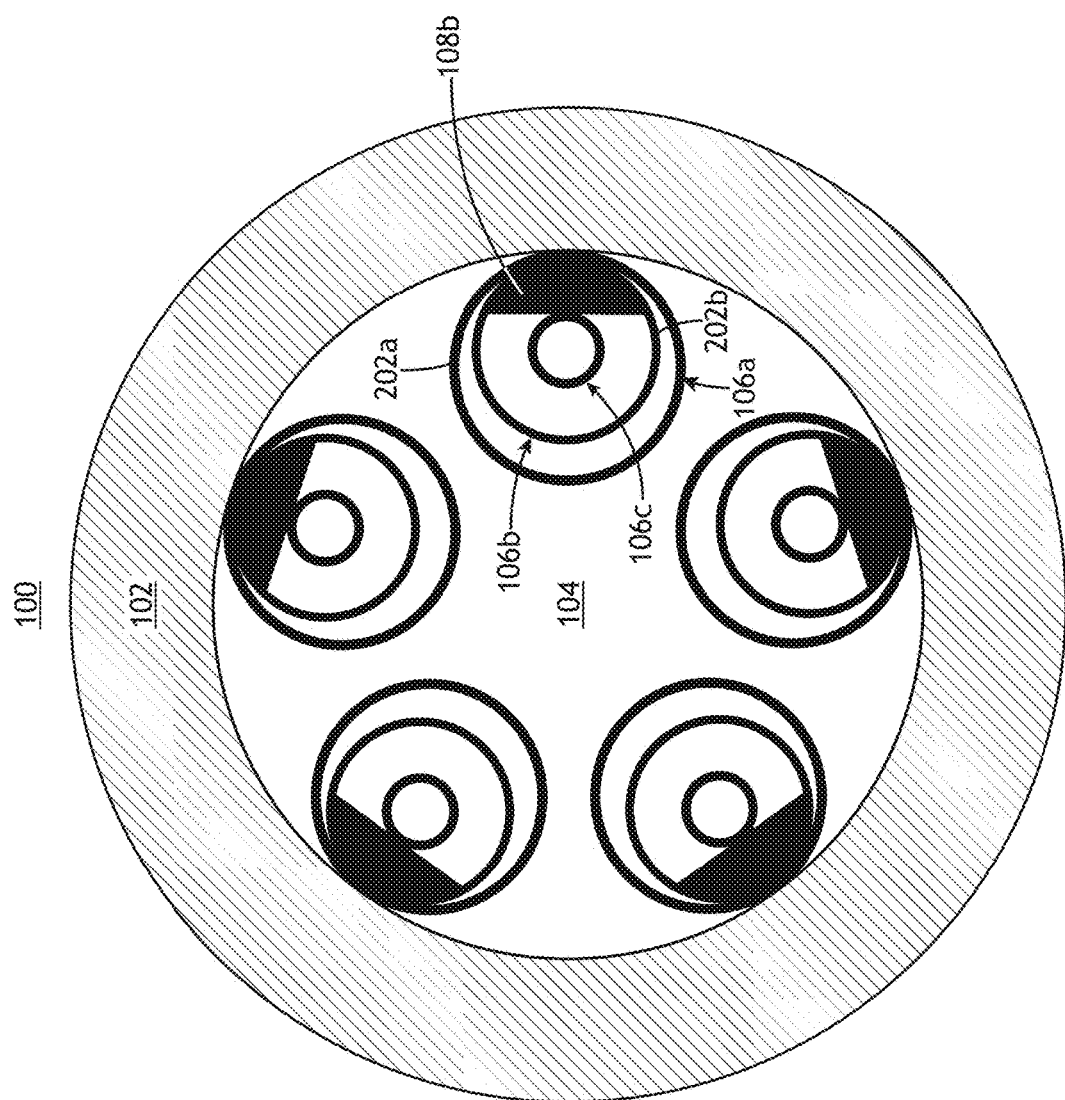
FIG. 2T is a cross-sectional view of one embodiment of an AR-HCF, in accordance with one or more embodiments of the present disclosure.

Referring now to FIGS. 2A-2T, FIGS. 2A-2T are cross-sectional views of non-limiting configurations an AR-HCF 100 including various designs of AR elements 106 and support structures 108, in accordance with one or more embodiments of the present disclosure. It is contemplated herein that an AR-HCF 100 may include any combination of the AR elements 106 illustrated in FIGS. 2A-2T, but is not limited to the particular AR elements 106 illustrated in FIGS. 2A-2T. Further, any of the AR elements 106 in FIGS. 2A-2T may be nested within any additional AR element 106 of the same or different design.

In some embodiments, an AR element 106 is a walled structure including one or more walls 202 that extend along the fiber length (e.g., along the Z direction in the figures). The walls 202 may be characterized by a thickness (or a thickness profile) in a cross-sectional plane (e.g., an X-Y plane in FIGS. 2A-2T). Further, the thickness of any of the walls 202, or portions thereof, may be selected to provide anti-resonant properties to confine and guide light through a central portion of the hollow interior region 104. In this way, at least some of the walls 202, or portions thereof, may provide confinement of light through anti-resonant phenomena.

In some embodiments, the walls 202 of an AR element 106 may be arranged to provide an interior region 204 (e.g., an interior cavity). In this way, the interior region 204 may be at least partially bounded by the walls 202 of at least one AR element 106.

In some embodiments, an AR-HCF 100 includes one or more support structures 108 suitable for positioning one or more of the AR elements 106. Such a support structure 108 may extend along the fiber length and may generally have any shape suitable for positioning one or more connected AR elements 106 within the hollow interior region 104 of the AR-HCF 100 such as, but not limited to, a circle, an ellipse, a truncated circle, a truncated ellipse, or any multi-faced shape. Further, a support structure 108 may be attached to or incorporated as part of an AR element 106 or a cladding structure 102. In some embodiments, a support structure 108 is formed as a portion of a wall 202 of an AR element 106. Put another way, an AR element 106 may have a wall 202 with a non-uniform thickness profile, where a portion of the wall 202 (e.g., a relatively thick portion) may form a support structure 108. In this configuration, the non-uniform thickness profile of a wall 202 may define a shape of the support structure 108. It is thus noted that while various figures throughout the present disclosure may depict support structures 108 and walls 202 as separate elements, this is merely illustrative of some embodiments and not limiting. Rather, any of the support structures 108 may be formed directly as part of a wall 202.

The various components of an AR-HCF 100 including, but not limited to, the AR elements 106 (e.g., the walls 202), the support structures 108, or the cladding structures 102 may be formed from any suitable material such as, but not limited to, a glass or a polymer. Individual AR elements 106 may be formed from a different material than another AR element 106. Similarly, different support structures 108 may be formed from a different material than other support structures 108. For example, any such components may be formed silica glass, doped silica glass, chalcogenide glass, fluoride glass, or the like. Further, any such components may be undoped or doped with one or more dopants. Additionally, an AR-HCF 100 may be formed from a single material or may have different components formed from different materials. For example, a support structure 108 may be formed from a different material than a connected AR element 106. As another example, nested AR elements 106 may be formed from different materials. In certain embodiments, the index of refraction of the AR elements 106 is different than the index of refraction of the support structures 108. One or more AR element 106 may have a different index of refraction from another AR element 106. One of more support structure 108 may have a different index of refraction from another support structure 108.

FIG. 2A is a cross-sectional view of one embodiment of an AR-HCF 100, in accordance with one or more embodiments of the present disclosure. It is noted that the AR elements 106 in FIG. 2A are substantially the same as shown in FIG. 1. In FIG. 2A, the AR-HCF 100 includes five sets of AR elements 106 distributed around the perimeter of the hollow interior region 104, where each set includes a first AR element 106a and a second AR element 106b nested within a first interior region 204a bounded by the first AR element 106a and connected to a first support structure 108a. In this way, the first support structure 108a may position the second AR element 106b at any location within a first interior region 204a of the first AR element 106a. For instance, as illustrated in FIG. 2A, the first support structure 108a may center the second AR element 106b within the interior region 204a of the first AR element 106a. Further, as described previously herein, the first support structure 108a may be formed as part of a wall 202a of the first AR element 106a or as a separate element.

The support structures 108 in FIG. 2 may be characterized as Class 1 support structures 108 since they are located within the first interior region 204a of the first AR element 106a. Further, each of the support structures 108 in FIG. 2 may provide a Class A integration with the first AR element 106a characterized by a spatially-extended integration region 206, and a Class C integration with the second AR element 106 characterized by a spatially-limited integration region 208.

FIG. 2B is a cross-sectional view of one embodiment of an AR-HCF 100, in accordance with one or more embodiments of the present disclosure. The AR elements 106 in FIG. 2B are substantially similar to those in FIG. 2A except that the second AR element 106b includes a second support structure 108b within a second interior region 204b. The second support structure 108b may be formed as part of a wall 202b of the second AR element 106b or as a separate element. Further, the second support structure may also be a Class 1 support structure with a Class A integration to the second AR element 106b.

FIG. 2C is a cross-sectional view of one embodiment of an AR-HCF 100, in accordance with one or more embodiments of the present disclosure. The AR elements 106 in FIG. 2C are substantially similar to those in FIG. 2B except that the AR elements 106 further include a third AR element 106c within the second interior region 204b of the second AR element 106b and connected to a second support structure 108b (e.g., with a Class C integration). In this way, FIGS. 2A-2C illustrate the cascading of multiple nested AR elements 106 (e.g., one AR element 106 within another, within another, and so on), where at least one of the nested AR elements 106 is connected to a support structure 108.

It is noted, however, that FIGS. 2A-2C are merely illustrative and should not be interpreted as limiting. For example, an AR element 106 may generally include any number of cascading nested AR elements 106. As another example, any particular AR element 106 may include multiple additional non-cascading AR elements 106 (e.g., adjacent AR elements 106) within an interior region 204. As another example, not all AR elements 106 need to include a support structure 108. Rather, any number or combination of the AR elements 106 may include a support structure 108. As another example, not all AR elements 106 need to be connected to a support structure 108. Rather, some AR elements 106 may be directly connected to an interior portion of a wall 202 of another AR element 106.

FIG. 2D is a cross-sectional view of one embodiment of an AR-HCF 100, in accordance with one or more embodiments of the present disclosure. In FIG. 2D, the AR elements 106 include a first AR element 106a as depicted in FIGS. 2A-2C. Additionally, the AR elements 106 in FIG. 2D include two second AR elements 106b within the interior region 204a of the first AR element 106a and connected to a first support structure 108a (e.g., with Class C integrations). As described previously herein, these two second AR elements 106b may be in a non-cascading configuration, but may nonetheless be nested within the first AR element 106a. Further, the AR elements 106 may be of different sizes.

FIG. 2E is a cross-sectional view of one embodiment of an AR-HCF 100, in accordance with one or more embodiments of the present disclosure. FIG. 2E is substantially the same as FIG. 2D except that the AR elements 106 further include a third AR element 106c in each of the second AR elements 106b. In this configuration, the third AR element 106c is directly in contact with an interior portion of a wall 202b of the corresponding second AR element 106b. However, this is not a requirement. In some embodiments, the third AR element 106c may be connected to a second support structure 108b.

Referring now to FIGS. 2F-2H, in some embodiments, a nested set of AR elements 106 is asymmetric (e.g., with respect to a radial line from a center of the AR-HCF 100 through an outermost AR element 106 in the nested set).

FIG. 2F is a cross-sectional view of one embodiment of an AR-HCF 100, in accordance with one or more embodiments of the present disclosure. FIG. 2F is substantially the same as FIG. 2D except that only a single offset second AR element 106b is located within the interior region of the first AR element 106a. Put another way, the second AR elements 106b are not symmetrically placed within the first AR elements 106a and are thus not centered on a radial line 210 from the center of the AR-HCF 100.

FIG. 2G is a cross-sectional view of one embodiment of an AR-HCF 100, in accordance with one or more embodiments of the present disclosure. FIG. 2G is substantially the same as FIG. 2F except that the second AR element 106b further includes a third AR element 106c nested within it.

FIG. 2H is a cross-sectional view of one embodiment of an AR-HCF 100, in accordance with one or more embodiments of the present disclosure. FIG. 2H is substantially the same as FIG. 2G except that the third AR element 106c is relatively larger than the third AR element 106c in FIG. 2G.

Referring now to FIGS. 2I-2J, in some embodiments, support structures 108 are not used to position AR elements 106, but may provide additional functions such as, but not limited to, mechanical stability, improving optical performance properties, or the like. These improvements can aid manufacturing tolerance and stability throughout the fiber-fabrication process.

FIG. 2I is a cross-sectional view of one embodiment of an AR-HCF 100, in accordance with one or more embodiments of the present disclosure. FIG. 2I is substantially the same as FIG. 2D except that the second AR elements 106b are directly connected to an interior portion of a wall 202a of the first AR element 106a rather than the first support structure 108a.

FIG. 2J is a cross-sectional view of one embodiment of an AR-HCF 100, in accordance with one or more embodiments of the present disclosure. FIG. 2J is substantially the same as FIG. 2E except that the second AR elements 106b are directly connected to an interior portion of a wall 202a of the first AR element 106a rather than the first support structure 108a.

Referring now to FIGS. 2K-2N, AR elements 106 of various shapes and configurations are described in greater detail, in accordance with one or more embodiments of the present disclosure.

FIG. 2K is a cross-sectional view of one embodiment of an AR-HCF 100, in accordance with one or more embodiments of the present disclosure. FIG. 2K is substantially the same as FIG. 2A except that the second AR elements 106b further includes a membrane AR element 106d that divides the interior regions 204 of the second AR elements 106b into two regions 204a,b. In some embodiments, the membrane AR element 106d is a walled structure that further provides AR properties and may thus contribute to guiding of light in the hollow interior region 104 of the AR-HCF 100 via optical antiresonance.

FIG. 2L is a cross-sectional view of one embodiment of an AR-HCF 100, in accordance with one or more embodiments of the present disclosure. In FIG. 2L, an arched AR element 106e is located within an interior region 204 of the first AR element 106a. In particular, two ends of the arched AR element 106e contact the first support structure 108a. However, this is not a requirement and an arched AR element 106e may contact any portion of the first AR element 106a or a first support structure 108a.

FIG. 2M is a cross-sectional view of one embodiment of an AR-HCF 100, in accordance with one or more embodiments of the present disclosure. FIG. 2M is substantially the same as FIG. 2L except that the arched AR element 106e is relatively larger than the arched AR element 106e. In a general sense, an arched AR element 106e may have any size or shape.

FIG. 2N is a cross-sectional view of one embodiment of an AR-HCF 100, in accordance with one or more embodiments of the present disclosure. FIG. 2N is substantially the same as FIG. 2M except that the arched AR element 106e is relatively taller than the arched AR element 106e, but has a narrower base width. In a general sense, an arched AR element 106e may have any size or shape.

Referring now to FIGS. 2O-2Q, elliptical AR elements 106 are shown. As described throughout the present disclosure, an AR element 106 may have any shape. In this way, the AR elements 106 with circular cross-sections are merely illustrative.

FIG. 2O is a cross-sectional view of one embodiment of an AR-HCF 100, in accordance with one or more embodiments of the present disclosure. FIG. 2O is substantially the same as FIG. 2A except that the first AR element 106a has an elliptical cross-sectional shape. Further, the first support structure 108a within the first AR element 106a matches the curvature of the first AR element 106a to provide a Class A integration with this shape.

FIG. 2P is a cross-sectional view of one embodiment of an AR-HCF 100, in accordance with one or more embodiments of the present disclosure. FIG. 2P is substantially the same as FIG. 2A except that the second AR element 106b has an elliptical cross-sectional shape.

FIG. 2Q is a cross-sectional view of one embodiment of an AR-HCF 100, in accordance with one or more embodiments of the present disclosure. FIG. 2Q is substantially the same as FIG. 2A except that both the first AR element 106a and the second AR element 106b have elliptical cross-sectional shapes. Further, as with FIG. 2O, the support structure 108 within the first AR element 106a matches the curvature of the first AR element 106a to provide a Class A integration with this shape.

Referring now to FIGS. 2R-2S, the dimensions of support structures 108 are described in greater detail, in accordance with one or more embodiments of the present disclosure. In a general sense, a support structure 108 may be used to position an AR element 106 (or any element more generally) within the hollow interior portion of the AR-HCF 100.

FIG. 2R is a cross-sectional view of one embodiment of an AR-HCF 100, in accordance with one or more embodiments of the present disclosure. FIG. 2R is substantially the same as FIG. 2A except that the support structure 108 in FIG. 2R is relatively thicker along a radial line 210. In particular, whereas the first support structures 108a in FIG. 2A have a first thickness $t_1$ selected to center the second AR element 106b within the first AR element 106a, the first support structures 108a in FIG. 2R has a second thickness $t_2$ selected position the second AR element 106 closer to a center of the AR-HCF 100. In this way, the first support structures 108a in FIG. 2R may position the second AR element 106b closer to the center of the AR-HCF 100. It is contemplated herein that the positions and/or radii of AR elements 106 within the AR-HCF 100 may impact the guiding performance (e.g., the guiding loss, or the like). A support structure 108 may generally have any thickness or dimensions suitable for positioning an AR element 106 to any location to tailor the guiding performance of the AR-HCF 100.

FIG. 2S is a cross-sectional view of one embodiment of an AR-HCF 100, in accordance with one or more embodiments of the present disclosure. FIG. 2S is substantially the same as FIG. 2F except that the support structure 108 in FIG. 2S is relatively thicker along a radial line 210. In particular, whereas the first support structures 108a in FIG. 2A have a first thickness t1 selected to center the second AR element 106b within the first AR element 106a, the first support structures 108a in FIG. 2S has a third thickness $t_3$ selected position the second AR element 106 closer to a center of the AR-HCF 100. As with FIG. 2R, the thickness of any support structure along any dimension may be selected to position any other element of the AR-HCF 100 in any desired location.

Referring now to FIG. 2T, it is noted that not all AR elements 106 need necessarily be connected to support structures 108. FIG. 2T is a cross-sectional view of one embodiment of an AR-HCF 100, in accordance with one or more embodiments of the present disclosure. The AR-HCF 100 in FIG. 2T includes a first AR element 106a connected to a cladding structure 102, a second AR element 106b nested within the first AR element 106a and directly connected to a wall 202a of the first AR element 106a, and a third AR element 106c nested within the second AR element 106b and connected to a second support structure 108b.

Referring generally to FIGS. 2A-2T, it is to be understood that FIGS. 2A-2T are provided solely for illustrative purposes and should not be interpreted as limiting. Rather, the one or more AR elements 106 and/or the one or more support structures 108 may have any design suitable for guiding light with any wavelength of interest (or ranges or wavelengths) in an interior portion of the hollow interior region 104.

Figure 3:
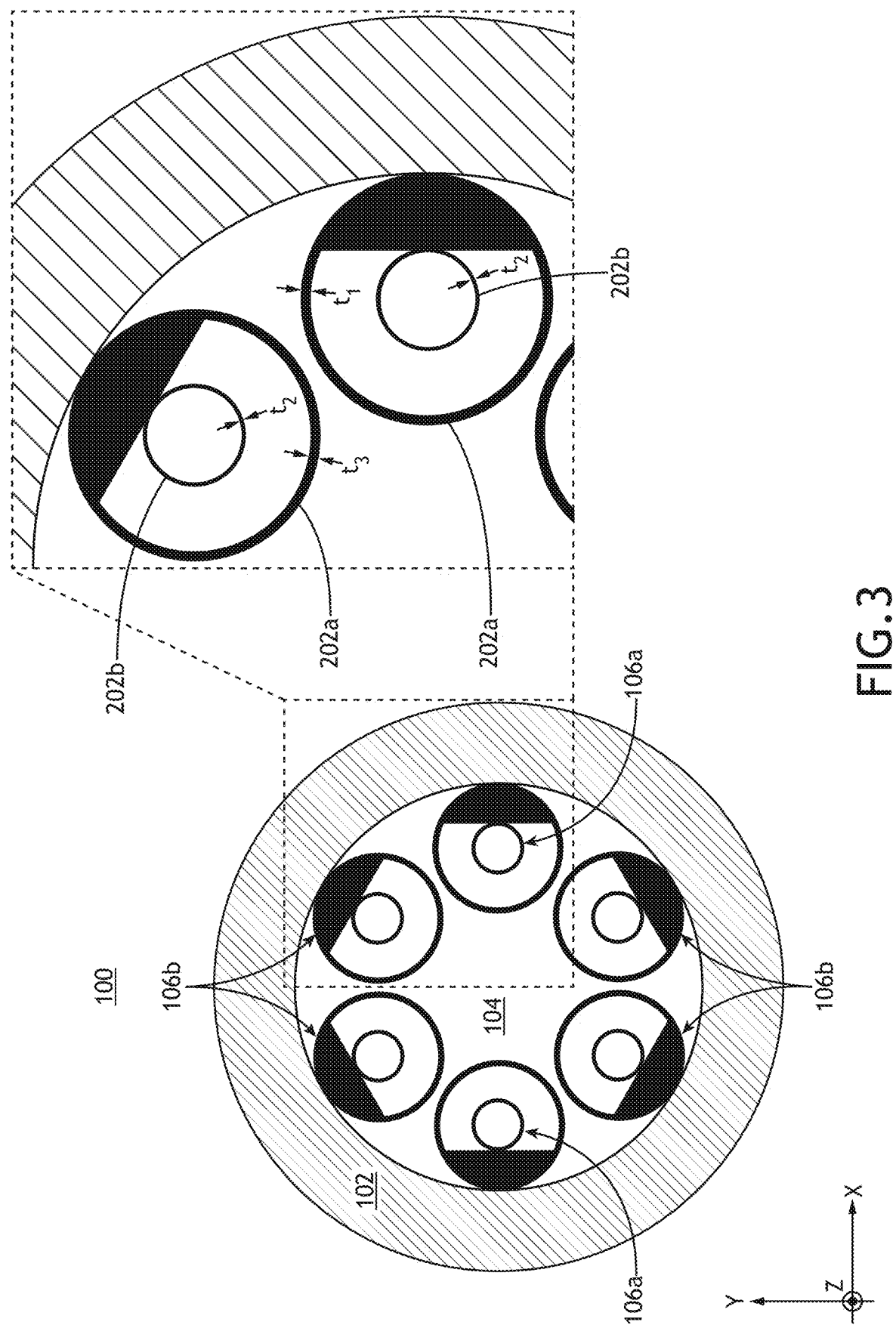
FIG. 3 is a cross-sectional view of one embodiment of an AR-HCF with five sets of AR elements but where not all of the sets have the same design, in accordance with one or more embodiments of the present disclosure.

For example, the various AR elements 106 (or the walls 202 thereof) may have the same or different thicknesses (or thickness profiles). FIG. 3 is a cross-sectional view of one embodiment of an AR-HCF 100 with five sets of AR elements 106 but where not all of the sets have the same design, in accordance with one or more embodiments of the present disclosure. In FIG. 3, a first set of AR elements 106a has a first design that is one variant of the design depicted in FIG. 1 and a second set of AR elements 106b has a second design that is another variant of the design depicted in FIG. 1. In particular, the first set of AR elements 106a has a first AR element 106a with a wall 202a thickness t1 for at least a portion and a second AR element 106b with a thickness t2 for at least a portion, whereas the second set of AR elements 106b has a first AR element 106a with a thickness t3 for at least a portion and a second AR element 106b with a thickness t2 for at least a portion.

Figure 4A:
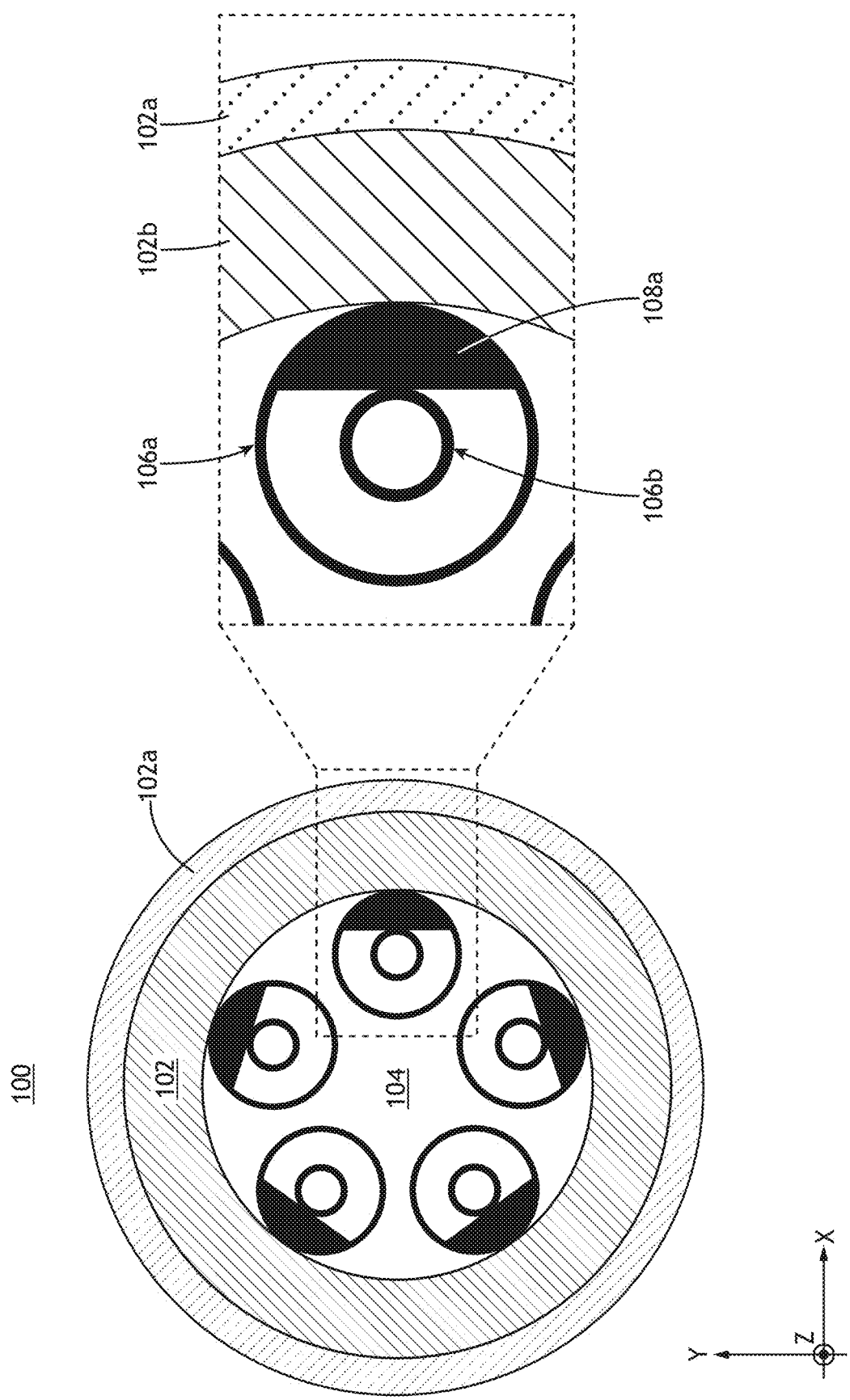
FIG. 4A is a cross-sectional view of one embodiment of an AR-HCF with a two-layer cladding structure, in accordance with one or more embodiments of the present disclosure.
Figure 4B:
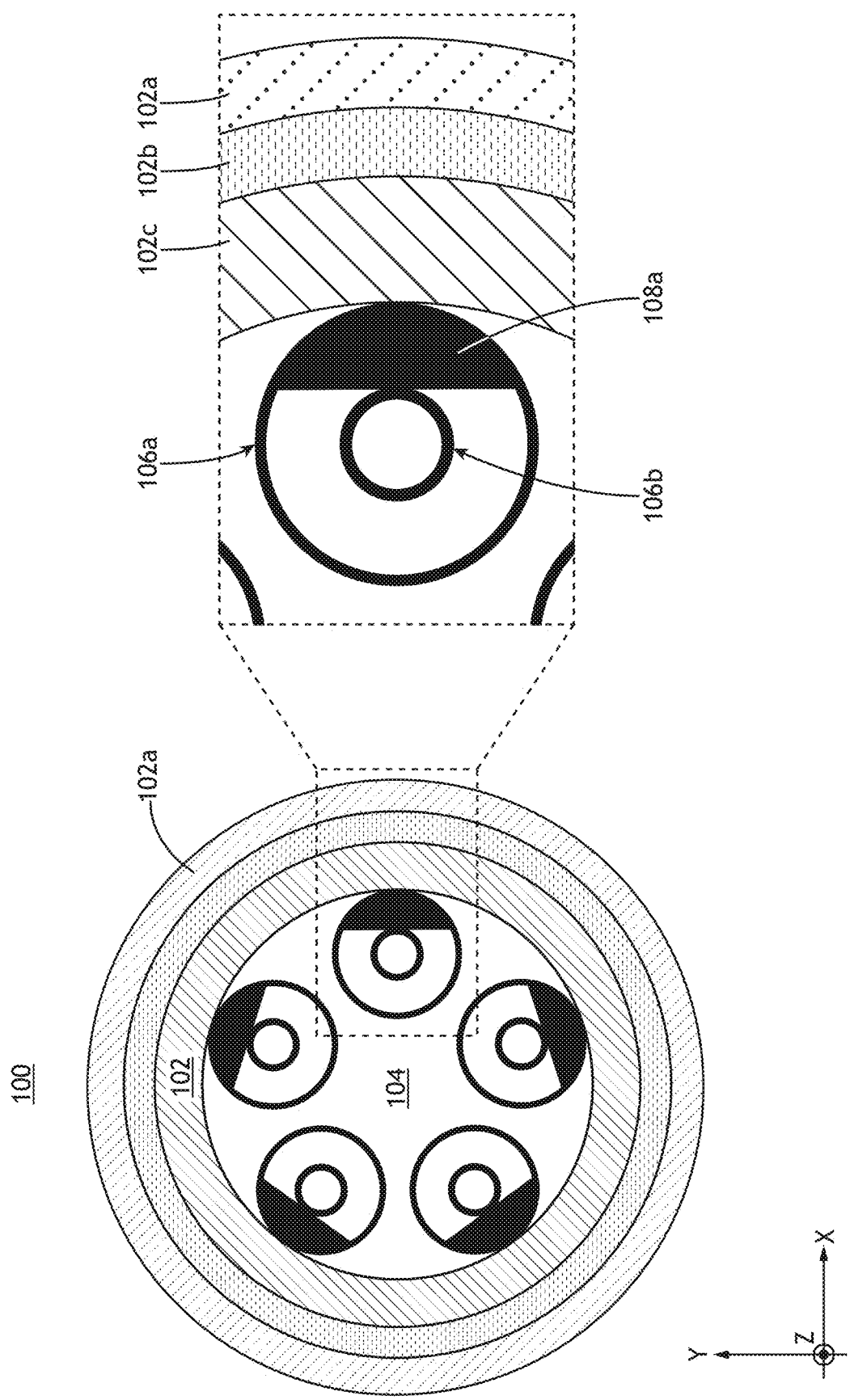
FIG. 4B is a cross-sectional view of one embodiment of an AR-HCF with a three-layer cladding structure, in accordance with one or more embodiments of the present disclosure.
Figure 4C:
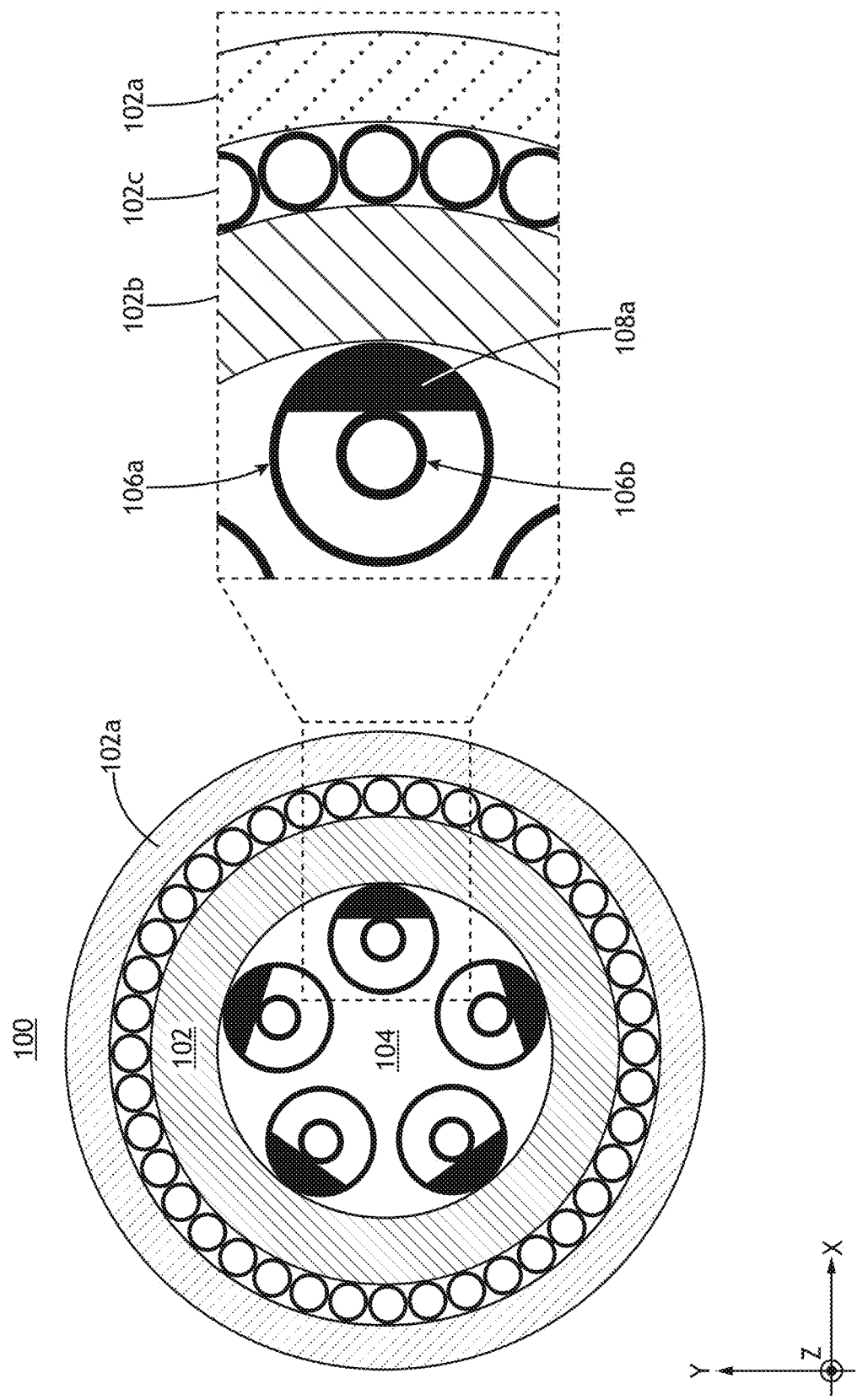
FIG. 4C is a cross-sectional view of one embodiment of an AR-HCF with multiple cladding structures, in accordance with one or more embodiments of the present disclosure.

Referring now to FIGS. 4A-4C, the cladding structures 102 are described in greater detail, in accordance with one or more embodiments of the present disclosure. An AR-HCF 100 may generally have any number of cladding structures 102 that bound or otherwise define a hollow interior region 104. Further, the cladding structures 102 (e.g., outer, interior, and/or perimeter cladding structures) may have any cross-sectional shape including, but not limited to, a circle, an ellipse, a square, a pentagon, a hexagon, a heptagon, an octagon, or the like. In some embodiments, a cladding structure 102 is formed as a tube (e.g., having an annular cross-section). As an illustration, FIGS. 1-3 each depict an AR-HCF 100 having a single cladding structure 102 formed as a tube.

In some embodiments, one or more cladding structures 102 are formed as a multi-layer tube (e.g., a tube having multiple layers of material of the same or different composition). Such a structure may have any number of layers. Further, each of the layers may be referred to as separate cladding structures 102. FIG. 4A is a cross-sectional view of one embodiment of an AR-HCF 100 with a two-layer cladding structure 102, in accordance with one or more embodiments of the present disclosure. In particular, FIG. 4A depicts a first cladding structure 102a as a first layer and a second cladding structure 102b as a second layer. FIG. 4B is a cross-sectional view of one embodiment of an AR-HCF 100 with a three-layer cladding structure 102, in accordance with one or more embodiments of the present disclosure. In particular, FIG. 4B depicts a first cladding structure 102a as a first layer, a second cladding structure 102b as a second layer, and a third cladding structure 102c as a third layer.

In some embodiments, an AR-HCF 100 includes additional cladding structures 102 between tube structures (e.g., layers of a multi-layer tube). FIG. 4C is a cross-sectional view of one embodiment of an AR-HCF 100 with multiple cladding structures 102, in accordance with one or more embodiments of the present disclosure. In FIG. 4C, the AR-HCF 100 includes a first cladding structure 102a formed as an outer tube, a second cladding structure 102b formed as an inner tube, and a series of additional cladding structures 102c between the first cladding structure 102a and the second cladding structure 102b. In particular, the additional cladding structures 102c in FIG. 4C are shown as tubes. However, this is merely illustrative and not limiting. The additional cladding structures 102c may have any cross-sectional shape or dimensions such as, but not limited to, circles, ellipses, squares, pentagons, hexagons, heptagons, octagons, or the like and may further be solid, porous, or fabricated as tubes.

Referring now to generally to FIGS. 1-6C, various non-limiting designs of support structures 108 are described in greater detail, in accordance with one or more embodiments of the present disclosure.

FIGS. 5A-5F are a series of cross-sectional diagrams of AR-HCFs 100 depicting different designs of a support structure 108, in accordance with one or more embodiments of the present disclosure. In some embodiments, a support structure 108 has one or more faces within an interior region 204 (e.g., interior faces) of an AR element 106, where such faces may be curved or flat. It is to be understood that the depictions in FIGS. 5A-5F are merely illustrative and not limiting. The support structures 108 may have a variety of designs and/or may be described in different ways within the spirit and scope of the present disclosure.

Figure 5C:
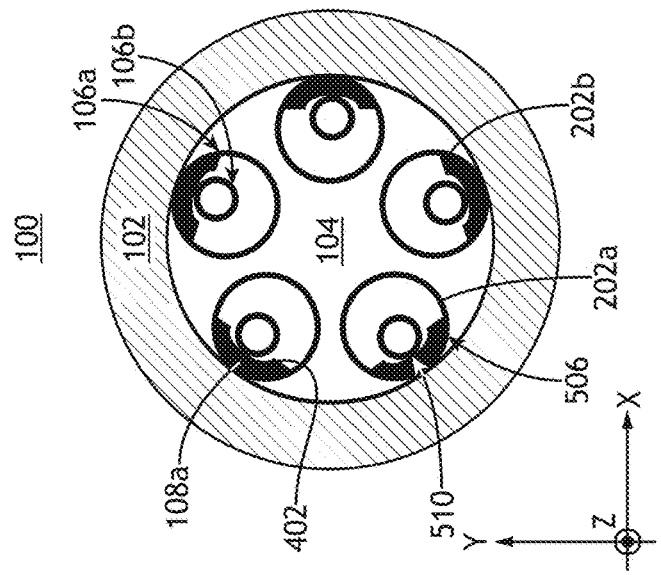
FIG. 5C is a cross-sectional view of one embodiment of an AR-HCF with first support structures shaped as truncated circles and further including U-shaped notches, in accordance with one or more embodiments of the present disclosure.
Figure 5B:
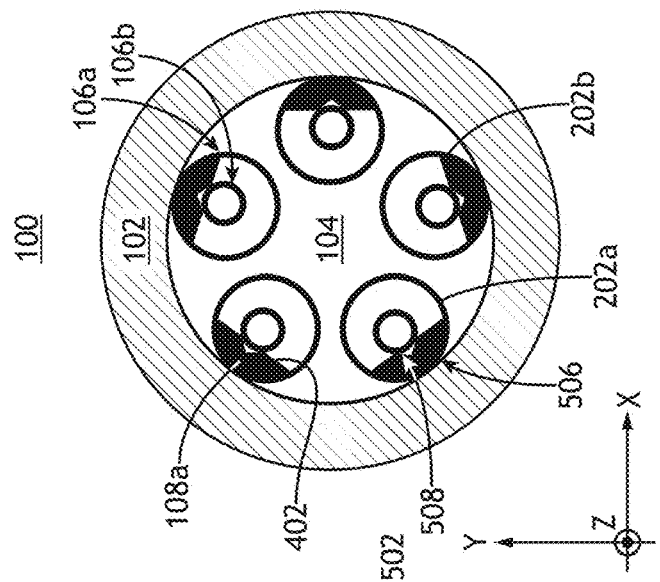
FIG. 5B is a cross-sectional view of one embodiment of an AR-HCF with first support structures shaped as truncated circles and further including V-shaped notches, in accordance with one or more embodiments of the present disclosure.
Figure 5A:
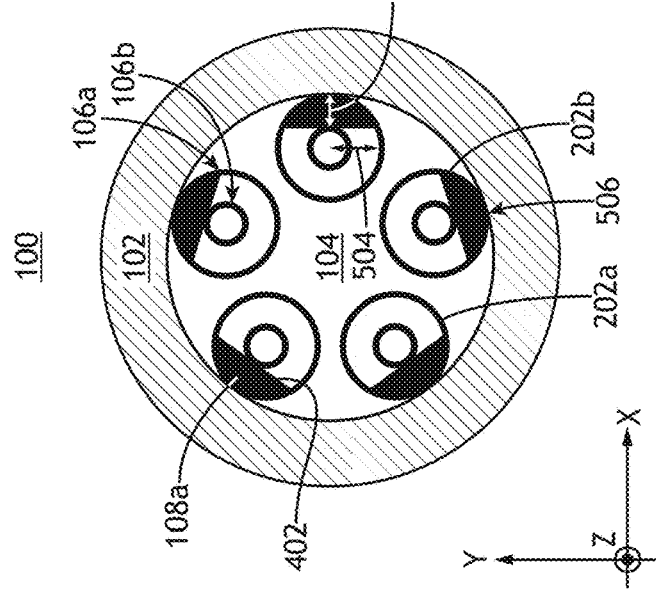
FIG. 5A is a cross-sectional view of one embodiment of an AR-HCF with support structures shaped as truncated circles, in accordance with one or more embodiments of the present disclosure.

FIG. 5A is a cross-sectional view of one embodiment of an AR-HCF 100 with support structures 108 shaped as truncated circles (e.g., truncated rods when considered in three dimensions), in accordance with one or more embodiments of the present disclosure. It is noted that FIG. 5A is a reproduction of FIG. 2A. In FIG. 5A, a first support structure 108a conforms to the interior wall of an AR element 106 on one side (e.g., forming a Class A integration) and has a flat interior face 402 to form a truncated circle. In embodiments, the support structure may be a rod, a pedestal, a tube, a slab with a rectangular cross section, a slab with a circular cross section, or a slab with a cross section of less than a whole circle (such as half or a part of a circle).

FIG. 5B is a cross-sectional view of one embodiment of an AR-HCF 100 with first support structures 108a shaped as truncated circles and further including V-shaped notches, in accordance with one or more embodiments of the present disclosure. FIG. 5B is substantially similar to FIG. 5A except that the interior face 402 has a V-shaped notch. Such a notch may provide additional contact points (e.g., Class B integrations) for an additional AR element 106 (e.g., the second AR element 106b as depicted), which may improve stability during and/or after fabrication. In this way, the support structures 108a in FIG. 5B are Class 1 support structures 108 with Class A integrations (region 506) with the first AR elements 106a, and Class B integrations (region 508) with the second AR elements 106b based on the multiple touchpoints. These improvements can aid manufacturing tolerance and stability throughout the fiber-fabrication process.

FIG. 5C is a cross-sectional view of one embodiment of an AR-HCF 100 with first support structures 108a shaped as truncated circles and further including U-shaped notches, in accordance with one or more embodiments of the present disclosure. FIG. 5C is substantially similar to FIG. 5B except that the notches in the interior face 402 are U-shaped (e.g., with curved faces). As with FIG. 5B such a notch may improve stability during and/or after fabrication. In embodiments, the inner radius of curvature of support structure 108a may be similar to the outer radius of curvature of AR element 106b such that the support structure 108a optimizes surface contact with AR element 106b. In this way, the support structures 108a in FIG. 5B are Class 1 support structures 108 with Class A integrations (region 506) with the first AR elements 106a, and Class A integrations (region 510) with the second AR elements 106b based on the extended touchpoints. The shape of the support structure can be tailored based on fiber-draw paraments, such as draw speed, draw tension, surface tension, draw ratio, temperature, AR-element material, and differential pressures. The support structure can be chosen to produce a specific, optimized geometry in the final hallow-core fiber. These improvements can aid manufacturing tolerance and stability throughout the fiber-fabrication process.

Figure 5F:
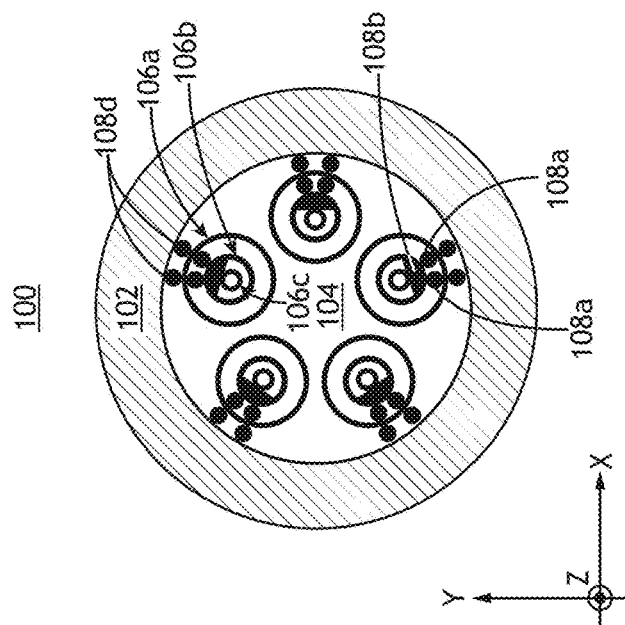
FIG. 5F is a cross-sectional view of one embodiment of an AR-HCF with multiple sets of nested AR elements and multiple support structures between each set of nested AR elements and a cladding structure, in accordance with one or more embodiments of the present disclosure.
Figure 5E:
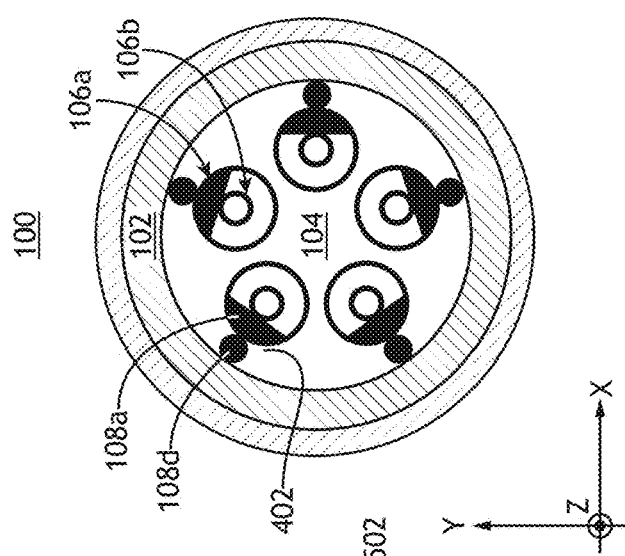
FIG. 5E is a cross-sectional view of one embodiment of an AR-HCF with multiple sets of nested AR elements and a single support structure between each set of nested AR elements and a cladding structure, in accordance with one or more embodiments of the present disclosure.
Figure 5D:
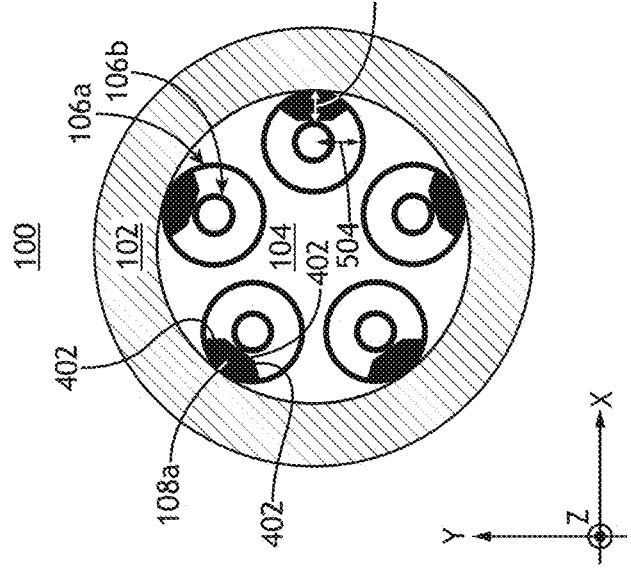
FIG. 5D is a cross-sectional view of one embodiment of an AR-HCF with first support structures shaped as trapezium structures, in accordance with one or more embodiments of the present disclosure.

FIG. 5D is a cross-sectional view of one embodiment of an AR-HCF 100 with first support structures 108a shaped as trapezium structures, in accordance with one or more embodiments of the present disclosure. For example, each support structure 108 in FIG. 5D includes multiple interior faces 402 (here flat faces, but this is not a requirement).

In some embodiments, an AR-HCF 100 includes one or more support structures 108 located between a cladding structure 102 and at least one AR element 106. Such support structures 108 may thus position one or more AR elements 106 (or sets of nested AR elements 106) within the hollow interior region 104 of an AR-HCF 100, further control the optical performance, improve structural stability, and/or improve manufacturability. In embodiments, the inner radius of curvature of support structure 108 may be similar to the outer radius of curvature of AR element 106 such that the support structure 108a optimizes surface contact with AR element 106 (e.g., forming a Class A integration). The shape of the support structure can be tailored based on fiber-draw paraments, such as draw speed, draw tension, surface tension, draw ratio, temperature, AR-element material, and differential pressures. The support structure can be chosen to produce a specific, optimized geometry in the final hallow-core fiber. These improvements can aid manufacturing tolerance and stability throughout the fiber-fabrication process.

FIG. 5E is a cross-sectional view of one embodiment of an AR-HCF 100 with multiple sets of nested AR elements 106 and a single support structure 108d between each set of nested AR elements 106 and a cladding structure 102, in accordance with one or more embodiments of the present disclosure. In particular, each set of nested AR elements 106 is the same as depicted in FIG. 2A and includes a second AR element 106b nested within a first AR element 106a and connected to a first support structure 108. Additionally, each first AR element 106a is connected to an additional support structure 108d, which is in turn connected to a cladding structure 102. Such an additional support structure 108d may be characterized as a Class 2 support structure based on the integration with the cladding structure 102 (here a Class C integration). In FIG. 5E, each additional support structure 108d is shown as a solid circle (e.g., a rod when considered in three dimensions), but this is merely illustrative and not limiting. Such an additional support structure 108d may have any suitable shape such as, but not limited to, a hollow tube or a porous rod of any cross-sectional shape, including a rectangle or square.

FIG. 5F is a cross-sectional view of one embodiment of an AR-HCF 100 with multiple sets of nested AR elements 106 and multiple support structures 108d between each set of nested AR elements 106 and a cladding structure 102, in accordance with one or more embodiments of the present disclosure. In FIG. 5E, each set of AR elements 106 includes a first AR element 106a, a second AR element 106b nested within the first AR element 106a and connected to two first support structure 108a (e.g., Class 1 support structures 108 with Class C integrations), and a third AR element 106c nested within the second AR element 106b and connected to a single second support structure 108b (e.g., a Class 1 support structure 108 with Class A and Class C integrations with the first and second AR elements 106a/b, respectively). Further, the first AR element 106a is connected to two additional support structures 108d (e.g., Class 2 support structures 108 with Class C integrations) which are in turn connected to a cladding structure 102.

Referring generally to FIGS. 5A-5F, various aspects of the support structures 108 are described in greater detail, in accordance with one or more embodiments of the present disclosure.

A Class A integration between a support structure 108 and another element may be characterized as an extended node along a circumference of the AR element 106. In this way, the support structure 108 itself and/or a region of integration with a wall 202 of an AR element 106 may be sufficiently large so as to lack antiresonant properties (e.g., may be resonant structures).

For example, FIGS. 1-5D depicts a configuration in which a first AR element 106a has a circular outer profile, but where the support structure 108 is integrated with an extended portion of the wall 202 of the first AR element 106a. As a result, a first portion of the wall 202a (e.g., shown in FIG. 5A) is sufficiently thin as to provide optical antiresonance that may contribute to guiding of light of selected wavelengths within the hollow interior region 104 of the AR-HCF 100 as a whole, whereas a second portion of the wall 202b associated with the support structure 108 is sufficiently thick as to lack such optical antiresonance for the light of selected wavelengths. Further, the second portion of the wall 202b may correspond to a substantial portion of a total circumference of the first AR element 106a (e.g., greater than 1%, greater than 5%, greater than 10%, or more).

In contrast, a Class C integration between a support structure and another element may be characterized as a spatially-limited node along a circumference of the AR element 106. For example, FIGS. 5E-5F depict configurations in which a support structure 108d is connected to both the cladding structures 102 and an exterior portion of the first AR element 106a in one or more spatially limited nodes. For instance, FIGS. 5E-5F depicts configurations in which a support structure 108d makes contact with (e.g., is integrated with) the wall 202 of the first AR element 106a at a single point (e.g., a single integration region, a single node, a single touch point, or the like). In particular, FIGS. 5E and 5F depict such support structures 108d both on interior and exterior portions of an AR element 106. In this configuration, the second portion of the wall 202b may correspond to a small and in some cases negligible portion of the total circumference of the first AR element 106a (e.g., less than 1%). In some cases, the size of this single node may be determined a size necessary to provide mechanical stability and/or firm contact between the support structure 108 and the wall 202 of the first AR element 106a.

A Class B integration between a support structure and another element may be characterized as having multiple point of contact (e.g., integration), where the associated integration regions may have any size or combination of sizes. For example, a Class B integration may include two or more Class A integrations, two or more Class C integrations, or any combination of Class A or Class C integrations. For example, the support structure 108a in FIG. 5B provides a Class B integration with the second AR element 106b that includes two spatially-limited touch points (e.g., two Class A integrations) associated with the "V" groove.

Regardless of the type of integration, it may be convenient, but not required, to describe support structures 108 as either integrated with or even a part of another element (e.g., the wall 202 of the first AR element 106a, or the like). In this way, the support structure 108 may be indistinguishable from the element with which it is integrated. Similarly, it may be convenient, but not required, to describe structures 108 as an independent element that may be simply connected to another element. For example, such a description may be convenient, but not required, when referring to Class C integrations with spatially-limited integration regions.

Regardless of the specific nomenclature, it is recognized herein that all components within a fabricated AR-HCF 100 may form a continuous structure, particularly after a draw process.

Various additional aspects of support structures 108 and/or integration regions are now described in greater detail, in accordance with one or more embodiments of the present disclosure.

A support structure 108 may be described based on an extent to which it fills an AR element 106. As an illustration, a fill factor may be defined as a ratio of an area (e.g., in a cross-sectional plane) of the support structure 108 to an area of the AR element 106 bounded by an outer face of the AR element 106. In a case where the support structure 108 is formed as a portion of a wall 202 of the AR element 106, the fill factor may be defined as a ratio of an area of the wall 202 (e.g., an area of the entire wall 202 or just a portion of the wall 202 corresponding to the support structure 108) to an area of the AR element 106. In some embodiments, the fill factor is greater than 2.5%. In some embodiments, the fill factor is between 2.5% and 60%. In some embodiments, the fill factor is greater than 60%.

A support structure 108 may also be described based on an extent to which it positions an outer face of an AR element 106 away from another object such as a cladding structure 102 or another AR element 106. As an illustration referring to FIG. 5A, the first support structure 108a may position an outer face of the second AR element 106b at a selected distance 502 from an outer face of the first AR element 106a. In some cases, this selected distance 502 may be a selected percentage of a radial distance 504 from a centroid of the first AR element 106a to the outer face of the first AR element 106a. For instance, the selected percentage may be at least 5%, 10%, 30% or greater. Further, it is to be understood that although the above example was provided for the particular geometry of FIG. 5A, this may be extended to any design or geometry.

Further, a support structure 108 may be provided in a variety of configurations. In some embodiments, as depicted in FIGS. 5A-5F, a support structure 108 is formed as a solid material. In some embodiments, though not explicitly shown, a support structure 108 may be formed as a porous material. In this way, the pores may not extend fully along the fiber length. In some embodiments, a support structure 108 has one or more air gaps that extend fully along the fiber length. For instance, a support structure 108 may be formed as a walled structure (e.g., a tube or a walled structure of any shape).

FIG. 6A is a cross-sectional view of one embodiment of an AR-HCF 100 with support structures 108 including multiple air gaps 602, in accordance with one or more embodiments of the present disclosure. Each air gap 602 may have a different size or shape, but may fully extend along the fiber length.

Figure 6B:
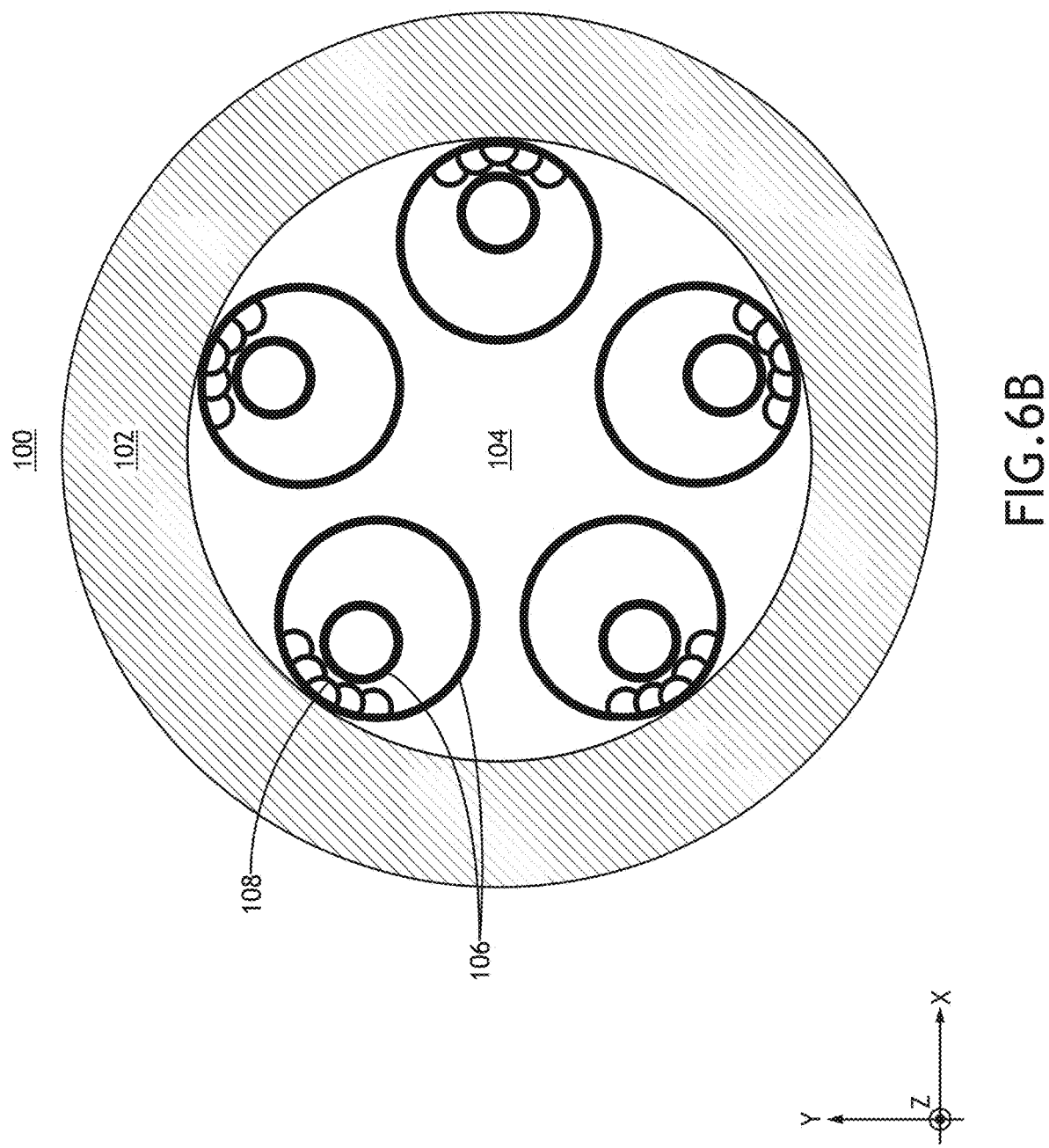

FIG. 6B-6C are cross-sectional view of embodiments of an AR-HCF 100 with support structures 108 formed as walled structures, in accordance with one or more embodiments of the present disclosure. In a manner similar to illustrated in FIG. 6A, the walled support structures 108 may provide air gaps 602 along the fiber length. Further, the walled support structures 108 may have any cross-sectional thickness. In some embodiments, the walled support structures 108 provide further anti-resonant properties and may thus improve the optical performance in ways beyond positioning the AR elements 106. Additionally, the connections between various walls of the support structures shown in FIGS. 6A-6B may provide multiple nodes and may thus be referred to as multi-node structures.

The support structures 108 in FIGS. 6B-6C may be characterized as Class 1 support structures 108 (e.g., based on their location within an interior region of an AR element 106) and providing Class B integrations (e.g., associated with multiple touch points or integration regions with additional elements).

Referring now to FIGS. 7A-7G, in some embodiments, an AR-HCF 100 may include various additional structures that extend along the fiber length, but do not necessarily support or position any AR elements 106. Such structures may have various functions such as, but not limited to, operating as AR elements themselves, operating as polarization-controlling elements, operating to increase a confinement factor of guided light, operating to increase a mechanical stability of the fiber, operating to increase a robustness to bending, operating to position AR elements 106 (or sets thereof) within the AR-HCF 100 or the like. Further such additional structures may be formed from any suitable material and may generally have any shape, design (e.g., solid, walled, porous, or the like), and may or may not include air gaps extending along the fiber length. In some embodiments, the additional structures may further be characterized as Class 2 support structures 108 based on their location between the cladding structure 102 and various AR elements 106.

Figure 7A:
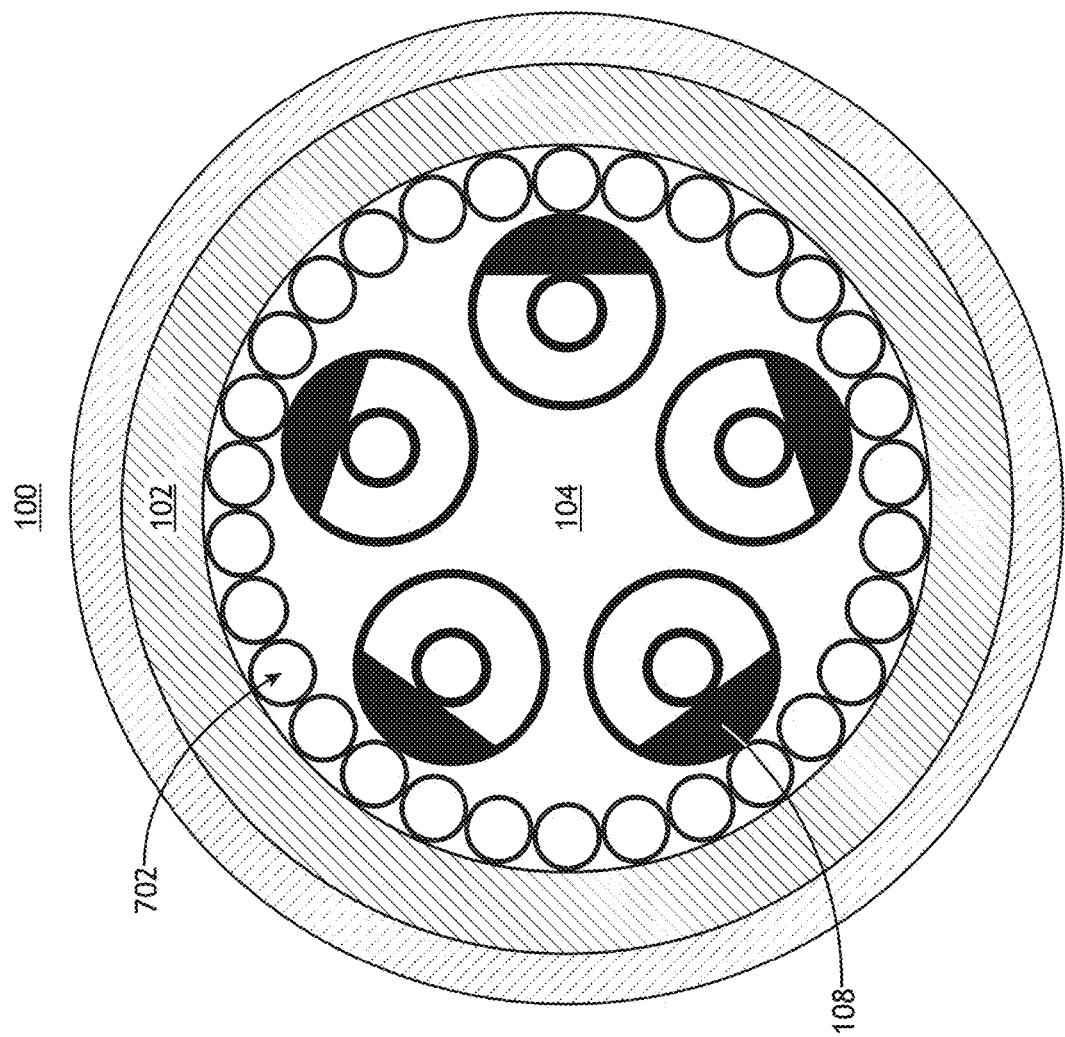
FIG. 7A is a cross-sectional view of one embodiment of an AR-HCF with a ring of perimeter structures around a perimeter of the hollow interior region shaped as tubes, in accordance with one or more embodiments of the present disclosure.
Figure 7B:
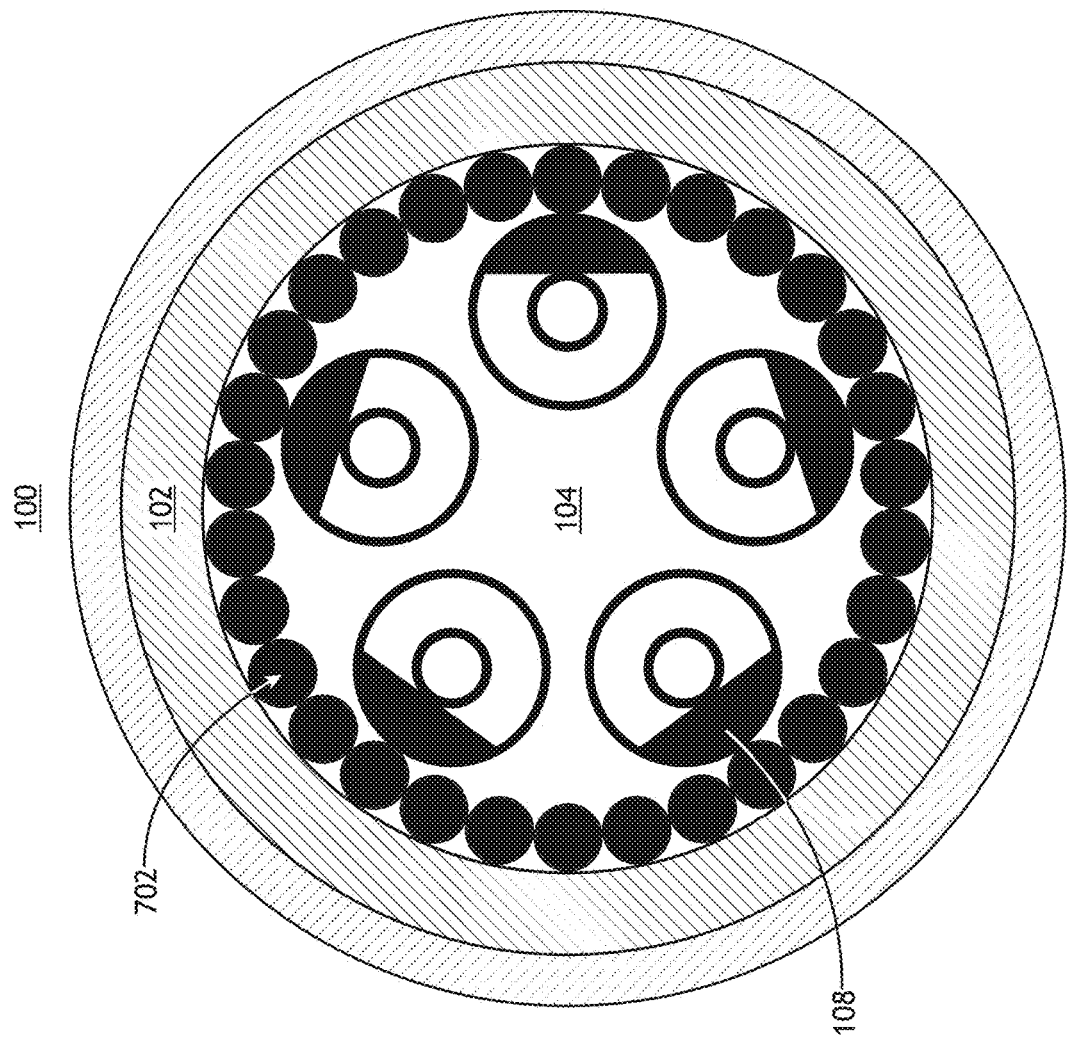
FIG. 7B is a cross-sectional view of one embodiment of an AR-HCF with a ring of perimeter structures shaped as solid rods, in accordance with one or more embodiments of the present disclosure.
Figure 7E:
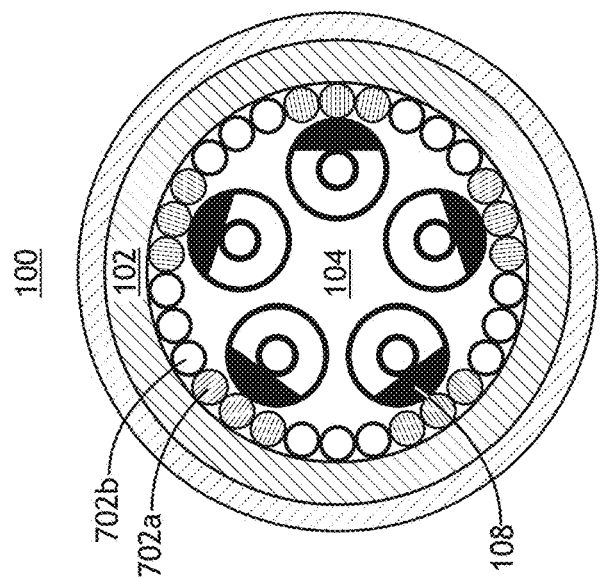
FIG. 7E is a cross-sectional view of one embodiment of an AR-HCF with a ring of perimeter structures with a second pattern of solid and tubular structures, in accordance with one or more embodiments of the present disclosure.
Figure 7D:
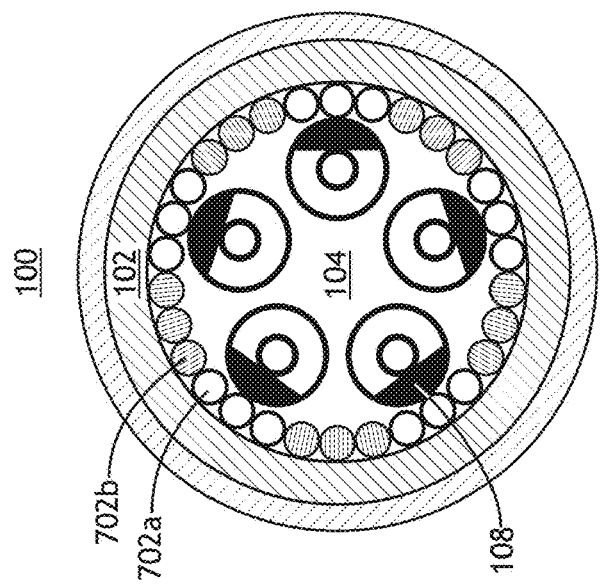
FIG. 7D is a cross-sectional view of one embodiment of an AR-HCF with a ring of perimeter structures with a first pattern of solid and tubular structures, in accordance with one or more embodiments of the present disclosure.
Figure 7C:
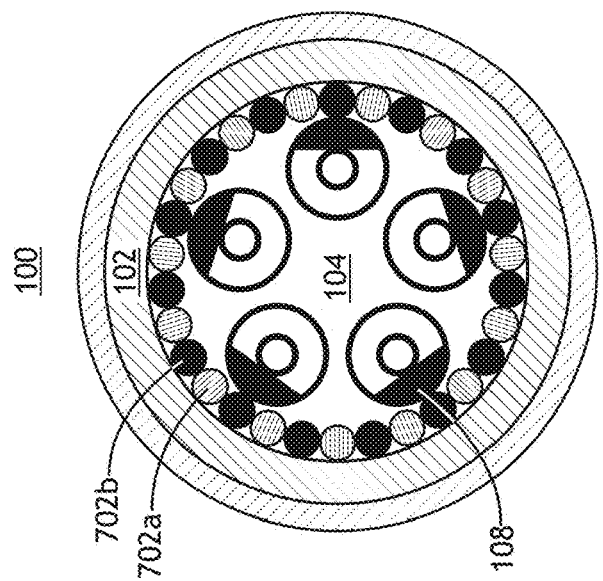
FIG. 7C is a cross-sectional view of one embodiment of an AR-HCF with a ring of perimeter structures shaped as solid rods with alternating compositions, in accordance with one or more embodiments of the present disclosure.

FIG. 7A is a cross-sectional view of one embodiment of an AR-HCF 100 with a ring of perimeter structures 702 (e.g., Class 2 support structures 108) around a perimeter of the hollow interior region 104 shaped as tubes, in accordance with one or more embodiments of the present disclosure. FIG. 7B is a cross-sectional view of one embodiment of an AR-HCF 100 with a ring of perimeter structures 702 (e.g., Class 2 support structures 108) shaped as solid rods, in accordance with one or more embodiments of the present disclosure. FIG. 7C is a cross-sectional view of one embodiment of an AR-HCF 100 with a ring of perimeter structures 702 (e.g., Class 2 support structures 108) shaped as solid rods with alternating compositions (labeled as 702a and 702b, respectively), in accordance with one or more embodiments of the present disclosure. FIG. 7D is a cross-sectional view of one embodiment of an AR-HCF 100 with a ring of perimeter structures 702 (e.g., Class 2 support structures 108) with a first pattern of solid and tubular structures, in accordance with one or more embodiments of the present disclosure. FIG. 7E is a cross-sectional view of one embodiment of an AR-HCF 100 with a ring of perimeter structures 702 (e.g., Class 2 support structures 108) with a second pattern of solid and tubular structures, in accordance with one or more embodiments of the present disclosure.

Figure 7F:
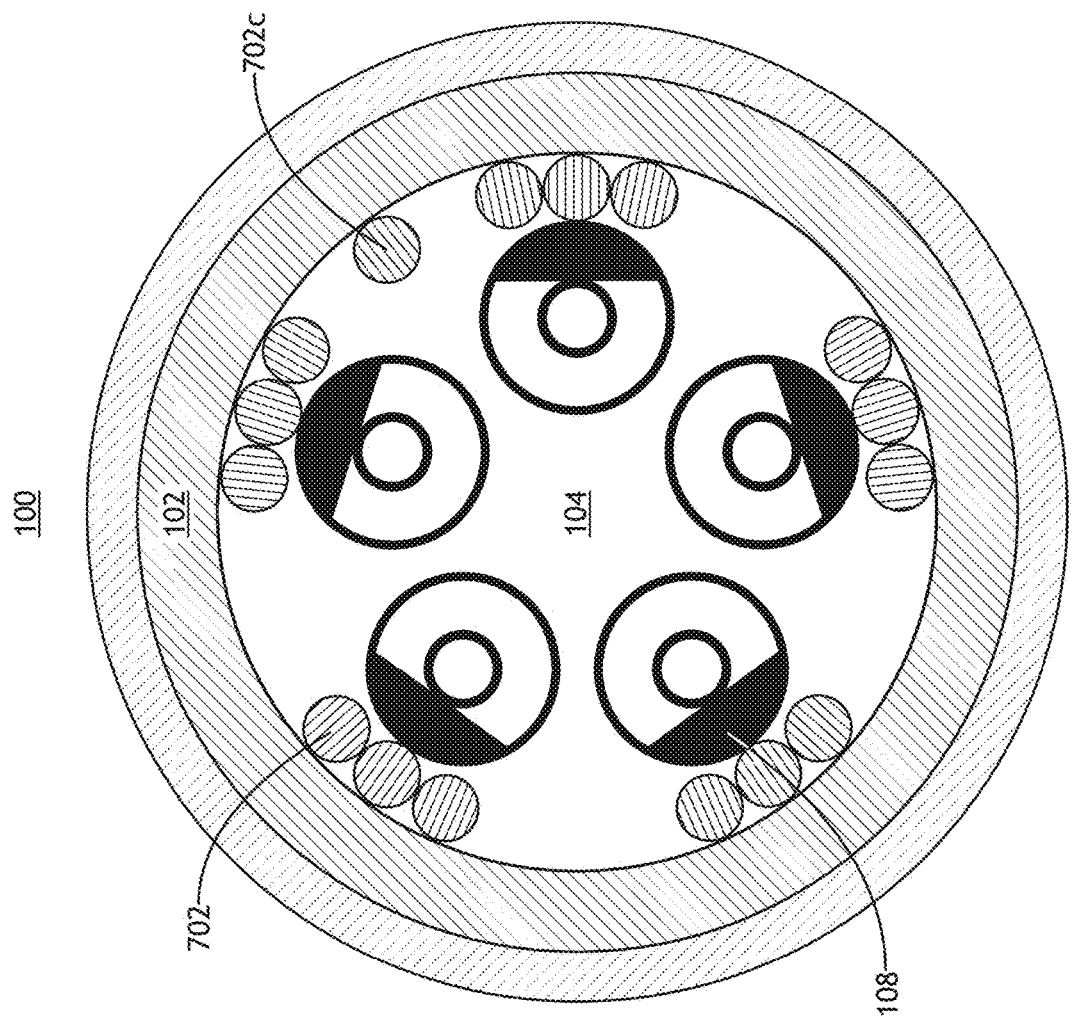
FIG. 7F is a cross-sectional view of one embodiment of an AR-HCF with a first pattern of perimeter structures, in accordance with one or more embodiments of the present disclosure.
Figure 7G:
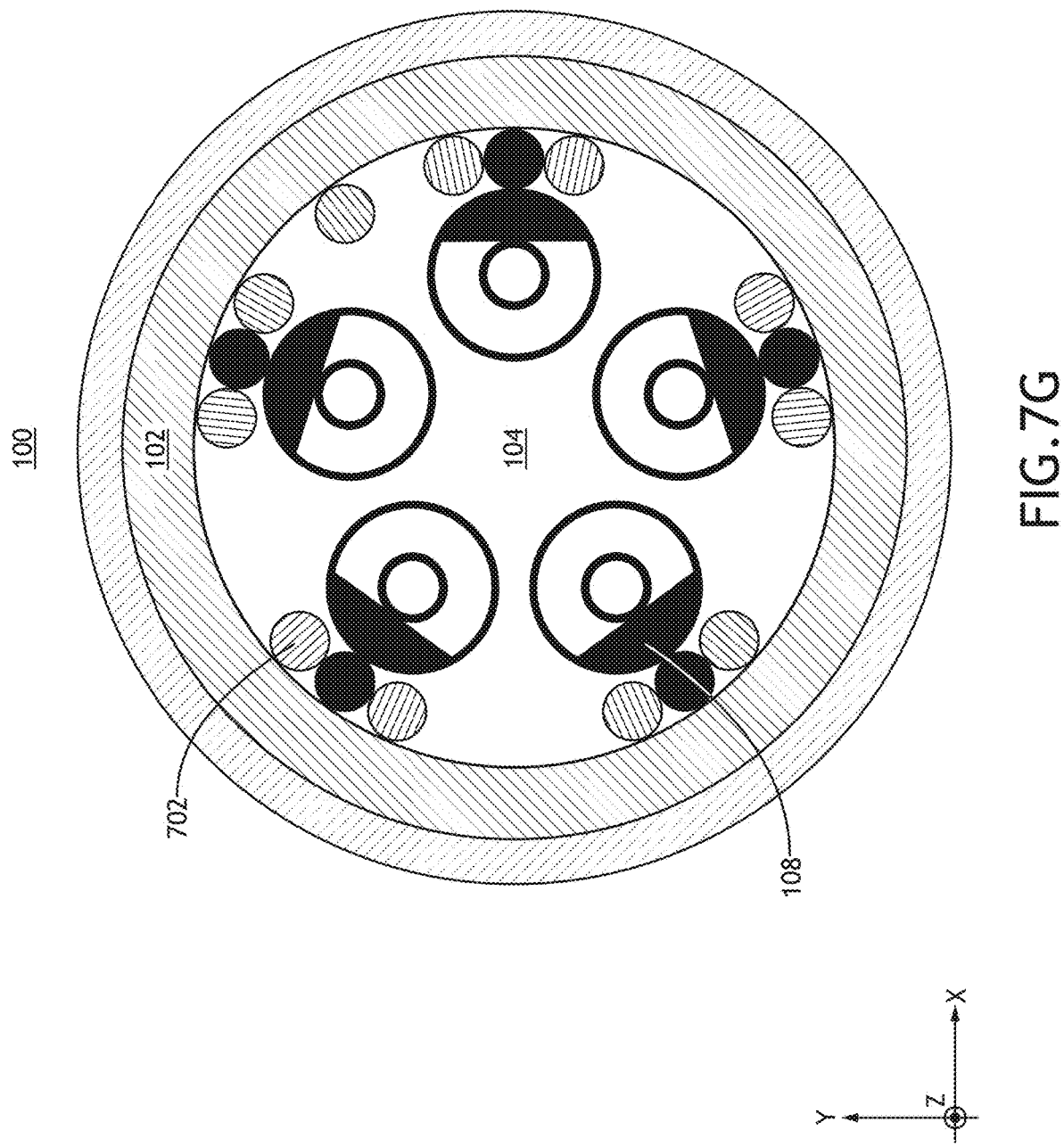
FIG. 7G is a cross-sectional view of one embodiment of an AR-HCF with a second pattern of perimeter structures, in accordance with one or more embodiments of the present disclosure.
Figure 71:
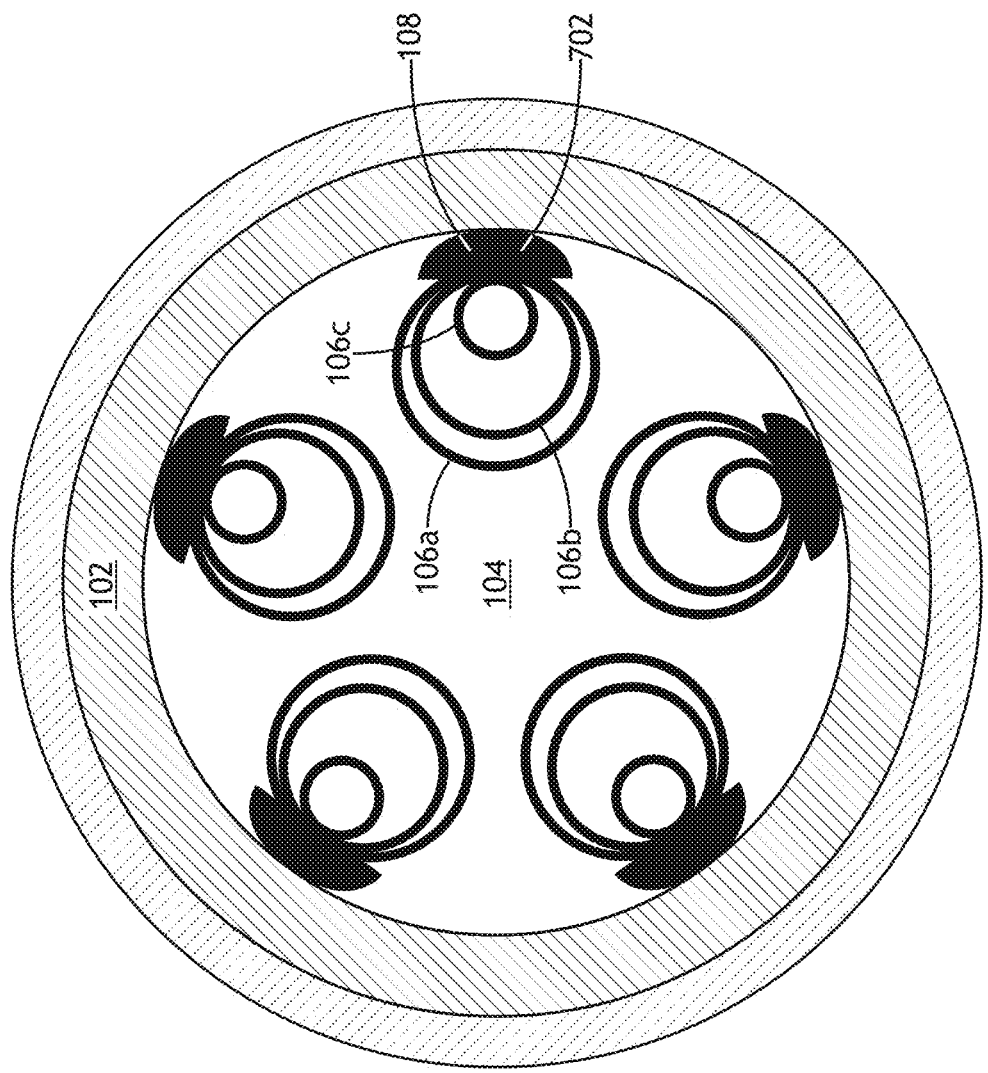

FIGS. 7F-7I show additional non-limiting designs of an AR-HCF 100 with perimeter structures 702 that do not fully cover the perimeter of the hollow interior region 104. FIG. 7F is a cross-sectional view of one embodiment of an AR-HCF 100 with a first pattern of perimeter structures 702 (e.g., Class 2 support structures 108), in accordance with one or more embodiments of the present disclosure. In FIG. 7F, the AR-HCF 100 includes sets of three perimeter structures 702 near each set of AR elements 106 and one additional perimeter structure 702c, which may provide polarization control. FIG. 7G is a cross-sectional view of one embodiment of an AR-HCF 100 with a second pattern of perimeter structures 702 (e.g., with different compositions), in accordance with one or more embodiments of the present disclosure.

Any perimeter structures 702 operating as Class 2 support structures may further have any interface type (e.g., Class A, Class B, Class C, or the like).

FIG. 7H is a cross-sectional view of one embodiment of an AR-HCF 100 with perimeter structures 702 (e.g., Class 2 support structures 108), in accordance with one or more embodiments of the present disclosure. In particular, the support structures 108 in FIG. 7H provide a Class A interface with both the cladding structure 102 and the AR elements 106. In particular, support structures 108 have a radius of curvature on one side that is matches to the radius of curvature of the cladding structure 102 to provide an extended interface region with the cladding structure 102. Similarly, the support structures 108 have a radius of curvature on an opposite side that is within a selected percentage of (e.g., within 1%, 5%, 10%, or the like) of a radius of curvature of the first AR elements 106a. Such a configuration may provide robust mechanical connections between the AR elements 106 and the cladding structure 102. Further, the support structures 108 may position the AR elements 106 (or the nested sets thereof as shown in FIG. 7H) at any selected location within the AR-HCF 100.

FIG. 7I is a cross-sectional view of one embodiment of an AR-HCF 100 with a perimeter structures 702 (e.g., Class 2 support structures 108), in accordance with one or more embodiments of the present disclosure. 7I is substantially similar to FIG. 7H, except that the support structures 108 have a different shape. In particular, the interface region with the cladding structure 102 is relatively smaller than the interface region in FIG. 7H. Further, the shape of the face contacting the first AR element 106 is different.

Figure 8:
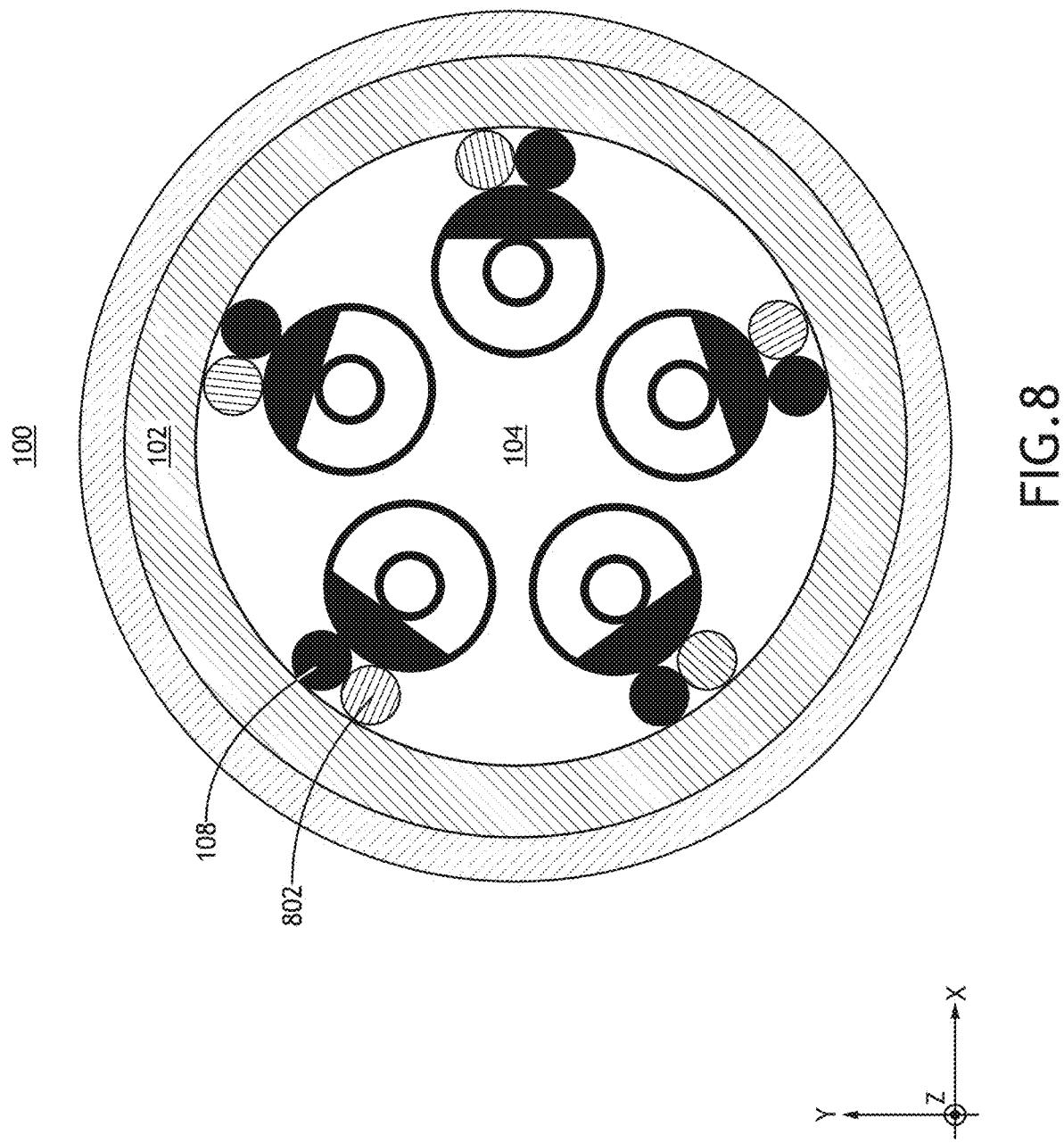
FIG. 8 is a cross-sectional view of one embodiment of an AR-HCF with additional structures, each connected to a single AR element, in accordance with one or more embodiments of the present disclosure.

In some embodiments, an AR-HCF 100 includes one or more additional structures 802 that are connected to an AR element 106, but do not position the AR element 106. For instance, such additional structures 802 may not be connected to any other AR elements 106 or to a cladding structure 102. FIG. 8 is a cross-sectional view of one embodiment of an AR-HCF 100 with additional structures 802, each connected to a single AR element 106, in accordance with one or more embodiments of the present disclosure.

Referring now to FIGS. 1-8, nomenclature associated with the description of support structures 108 and the associated classes is described in greater detail, in accordance with one or more embodiments of the present disclosure.

It is contemplated herein that a design of a support structures 108 and a design of an AR-HCF 100 more generally may be complex such that the various constituent elements may be described using different terms within the spirit and scope of the present disclosure.

As described throughout, the various support structures 108 described herein may be characterized within one or more classes, where the classes may be defined based on location within an AR-HCF 100 (e.g., as depicted in Table 1) and/or based on the extent of integration with additional elements of the AR-HCF 100 (e.g., as depicted in Table 2).

A Class A support structure 108 may be characterized as being integrated within a wall 202 and/or an interior region 204 of an AR element 106 in a manner that provides an extended node along a circumference of the AR element 106. In this way, the support structure 108 itself and/or a region of integration with a wall 202 of an AR element 106 may be sufficiently large so as to lack antiresonant properties (e.g., may be resonant structures).

For example, FIGS. 1-5D depicts a configuration in which a first AR element 106a has a circular outer profile, but where the support structure 108 is integrated with an extended portion of the wall 202 of the first AR element 106a. As a result, a first portion of the wall 202a (e.g., shown in FIG. 5A) is sufficiently thin as to provide optical antiresonance that may contribute to guiding of light of selected wavelengths within the hollow interior region 104 of the AR-HCF 100 as a whole, whereas a second portion of the wall 202b associated with the support structure 108 is sufficiently thick as to lack such optical antiresonance for the light of selected wavelengths. Further, the second portion of the wall 202b may correspond to a substantial portion of a total circumference of the first AR element 106a (e.g., greater than 5%, greater than 10%, or more).

In contrast, FIGS. 5E-5F depict configurations in which a support structure 108 is connected to the wall 202 of the first AR element 106a in one or more spatially limited nodes. For instance, FIGS. 5E-5F depicts configurations in which a support structure 108 makes contact with (e.g., is integrated with) the wall 202 of the first AR element 106a at a single point (e.g., a single node, a single touch point, or the like). In particular, FIGS. 5E and 5F depict such support structures 108 both on interior and exterior portions of an AR element 106. In this configuration, the second portion of the wall 202b may correspond to a small and in some cases negligible portion of the total circumference of the first AR element 106a (e.g., less than 1%, less than 5%, or the like). In some cases, the size of this single node may be determined a size necessary to provide mechanical stability and/or firm contact between the support structure 108 and the wall 202 of the first AR element 106a.

It may be convenient, but not required, to describe support structures 108 with Class A integrations as either integrated with or even a part of the wall 202 of the first AR element 106a. In this way, the support structure 108 may be indistinguishable from the second portion of the wall 202b as depicted in FIG. 5A. Similarly, it may be convenient, but not required, to describe class 2 support structures 108 as an independent element that may be connected to the wall 202 of the first AR element 106a.

Alternatively, it may be convenient, but not required, to describe a support structures 108 based on a number of contact points or nodes associated with the integration with a wall 202 of an AR element 106. For instance, a Class C integration may be described as having a single contact point with the wall 202 of the first AR element 106a. In contrast, a class A support structure 108 may be considered to have a continuous series of contact points or one extended contact point. A Class B integration may then have multiple contact points of any size.

Further, regardless of the specific nomenclature, it is recognized herein that all components within an AR-HCF 100 may form a continuous structure, particularly after a draw process.

As described in greater detail with respect to FIGS. 13A-13B below, an AR-HCF 100 may be fabricated by drawing a preform, where the preform has a cross-sectional profile that may resemble the final cross-sectional profile of the drawn AR-HCF 100, though it is recognized that the cross-sectional profile of the preform need not necessarily be a precisely scaled version of the cross-sectional profile of the drawn AR-HCF 100. Rather, the drawing process may induce some variations in the cross-sectional profile of the drawn AR-HCF 100 relative to the preform design.

In some embodiments, a preform used to fabricate an AR-HCF 100, or a portion thereof, may be formed by multiple fused components, which then melt into a single continuous structure during a fiber draw process. For example, a preform for a first AR element 106a with an integrated support structure 108 as depicted in FIGS. 1-5D may be formed from a first glass tube component and one or more additional components located in the glass tube, where the draw process induces at least partial melting of the associated components and ultimately results in the first AR element 106a with an integrated support structure 108. In this way, it may be convenient, but not required, to refer to various portions of a design of an AR-HCF 100 based on practical aspects of preform fabrication.

Referring now to FIGS. 9A-9D, various non-uniform distributions of AR elements 106 (or sets of AR elements 106) are illustrated. These are exemplary and different and other AR elements may be included as consistent with the inventions described herein. As described previously herein, an AR-HCF 100 may generally include any number or distribution of AR elements 106. For example, non-uniform distributions of AR elements 106 may be used to control various properties of guided light such as, but not limited to, polarization, polarization mode dispersion, or the like. This could be used, for example, to create a polarization maintaining fiber.

Figure 9A:
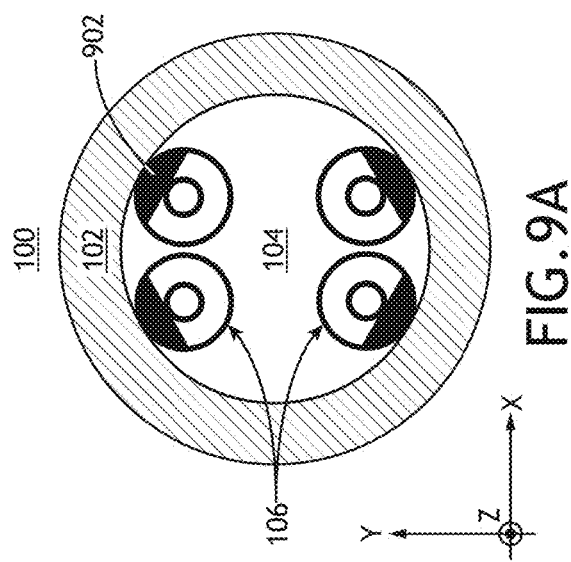
FIG. 9A is a cross-sectional view of one embodiment of an AR-HCF with a non-uniform distribution of nested AR elements, in accordance with one or more embodiments of the present disclosure.

FIG. 9A is a cross-sectional view of one embodiment of an AR-HCF 100 with a non-uniform distribution of nested AR elements 106, in accordance with one or more embodiments of the present disclosure. In particular, FIG. 9A depicts four sets of AR elements 106, each having a first design 902, but being non-uniformly distributed around the perimeter of the hollow interior region 104.

Figure 9B:
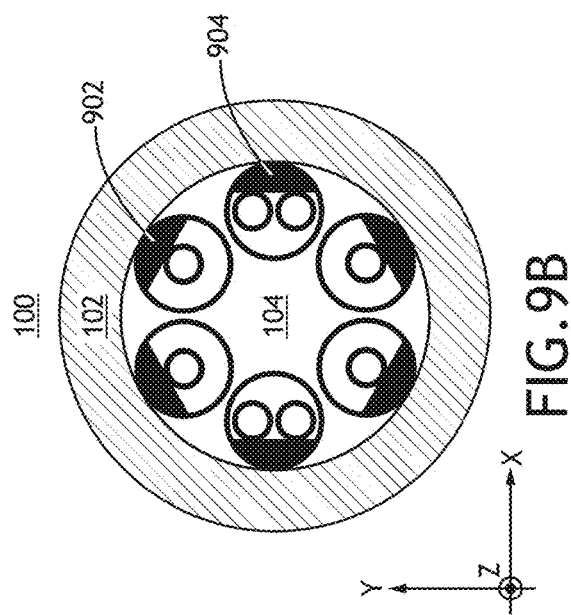
FIG. 9B is a cross-sectional view of one embodiment of an AR-HCF with a first pattern of AR elements with varying designs, in accordance with one or more embodiments of the present disclosure.

FIG. 9B is a cross-sectional view of one embodiment of an AR-HCF 100 with a first pattern of AR elements 106 with varying designs, in accordance with one or more embodiments of the present disclosure. The AR-HCF 100 in FIG. 9B includes two sets of nested AR elements 106 having a second design 904 and four sets of nested AR elements 106 having the first design 902, where all sets are uniformly distributed around the perimeter of the hollow interior region 104. Further, the sets of nested AR elements 106 having the second design 904 are on opposing sides of the fiber.

Figure 9C:
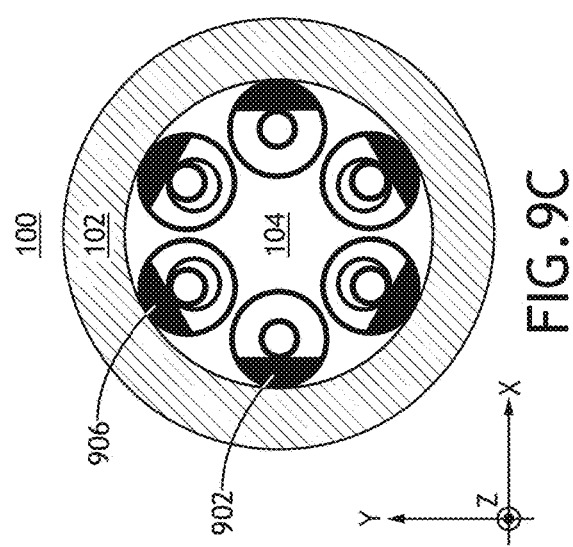
FIG. 9C is a cross-sectional view of one embodiment of an AR-HCF with a second pattern of AR elements with varying designs, in accordance with one or more embodiments of the present disclosure.

FIG. 9C is a cross-sectional view of one embodiment of an AR-HCF 100 with a second pattern of AR elements 106 with varying designs, in accordance with one or more embodiments of the present disclosure. FIG. 9C is substantially similar to FIG. 9B except that it includes two sets of nested AR elements 106 having the first design 902 and four sets of nested AR elements 106 having a third design 906.

Figure 9D:
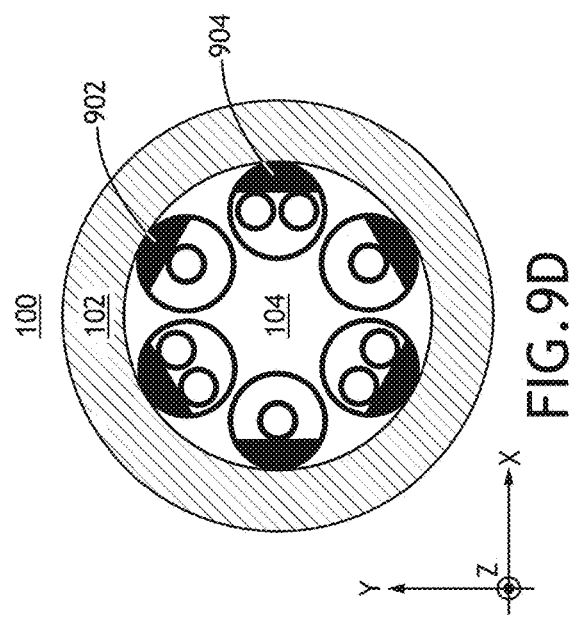
FIG. 9D is a cross-sectional view of one embodiment of an AR-HCF with a third pattern of AR elements with varying designs, in accordance with one or more embodiments of the present disclosure.

FIG. 9D is a cross-sectional view of one embodiment of an AR-HCF 100 with a third pattern of AR elements 106 with varying designs, in accordance with one or more embodiments of the present disclosure. In FIG. 9D, sets of AR elements 106 with the first design 902 and the second design 904 are in an alternating arrangement.

Figure 11:
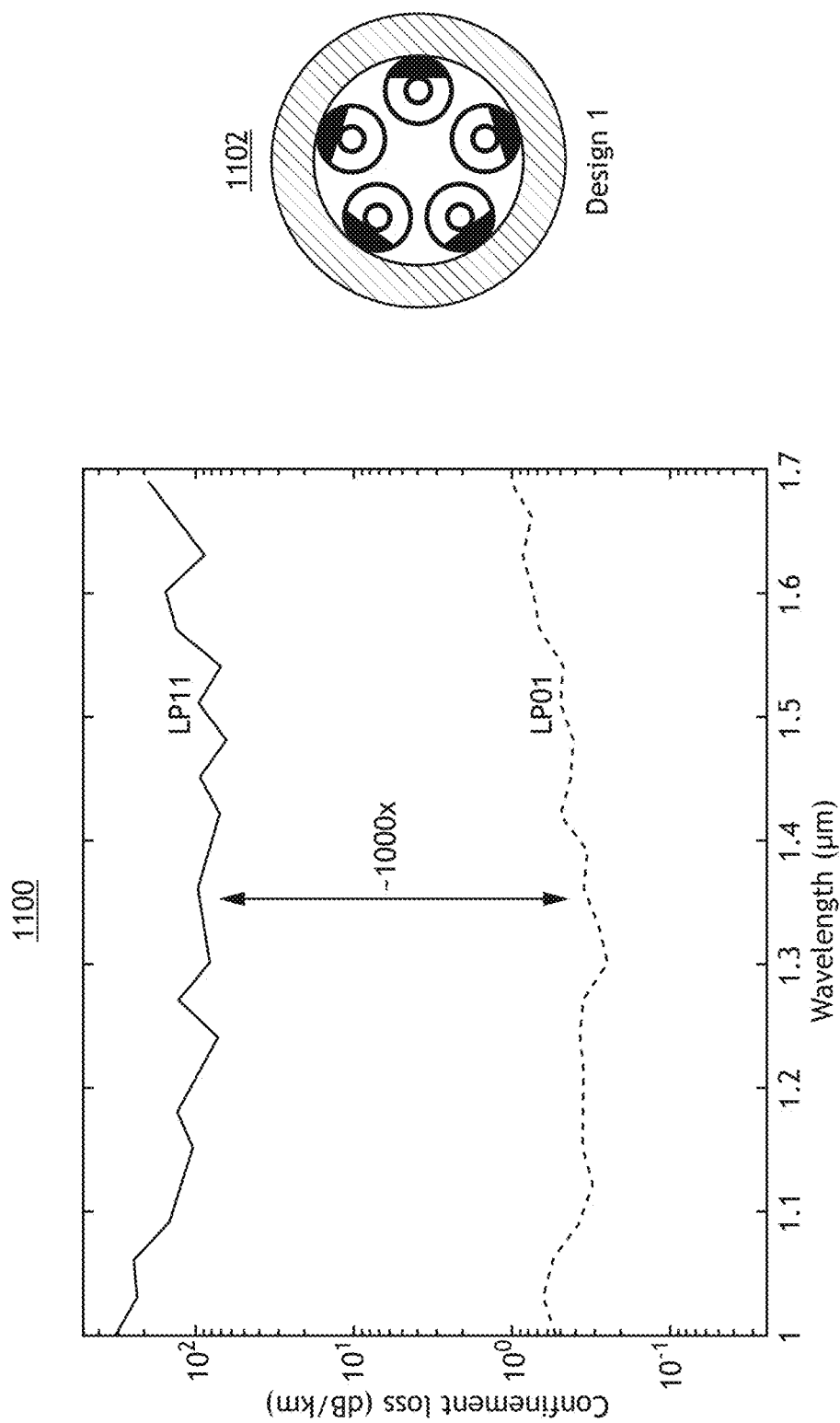
FIG. 11 is a plot of confinement losses for the fundamental mode (LP01) and higher-order modes (LP11) for an AR-HCF with support structures 108 based on the first design, in accordance with one or more embodiments of the present disclosure.
Figure 12:
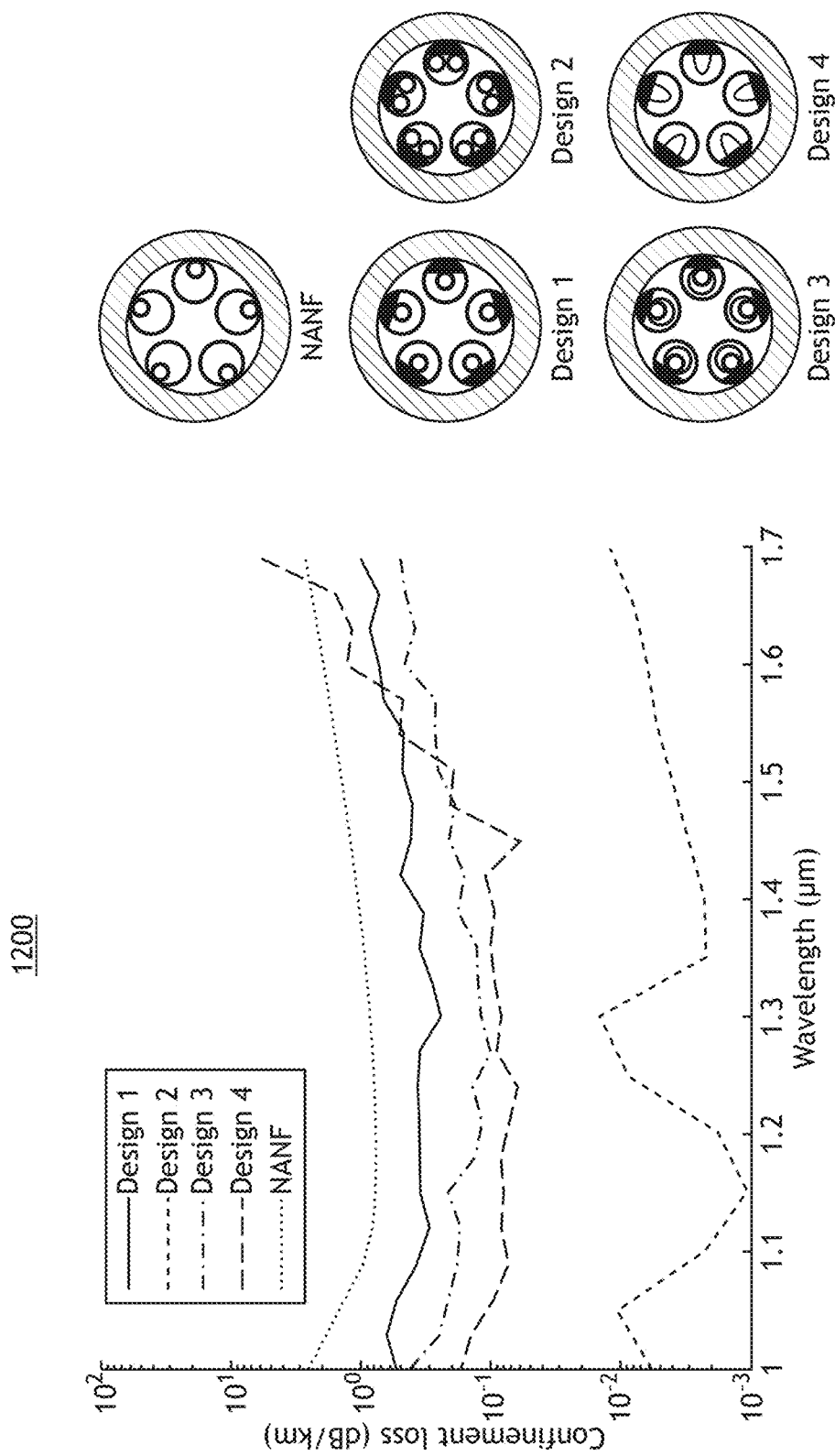
FIG. 12 is a plot 1200 of confinement losses for different designs of an AR-HCF with support structures as well as for an AR fiber without support structures, in accordance with one or more embodiments of the present disclosure.

Referring now to FIGS. 10-12, the simulated performance of various designs of an AR-HCF 100 formed from silica glass are described to highlight the beneficial use of support structures 108 to improve performance.

FIG. 10 is a plot 1000 of confinement loss for variations of an AR-HCF 100 with the design shown in FIG. 2A with varying thickness of the first support structures 108$a$ as well as for an AR fiber without support structures 108, in accordance with one or more embodiments of the present disclosure. The inset 1002 depicts a first design (e.g., Design 1) with a thickness of 10 μm, inset 1004 depicts the first design (e.g., Design 1) but with a thickness of 12 μm, and inset 1006 depicts a design with no support structures 108 (e.g., a thickness of zero). The design in inset 1006 is referred to as a nested AR nodeless fiber (NANF) design. As shown in plot 1000, the first design (Design 1) outperforms the NANF design for both simulated thicknesses of the support structures 108. It is contemplated herein that the performance increase may be achieved at least in part by positioning the second AR element 106$b$ away from a wall 202 of the first AR element 106$a$. This is just one example. The wavelength position of the low loss spectral band can be shifted to shorter or longer wavelengths by altering the fiber design, for example, by scaling the size of the AR-HCF structure.

FIG. 11 is a plot 1100 of confinement losses for the fundamental mode (LP01) and higher-order modes (LP11) for an AR-HCF 100 with support structures 108 based on the first design (Design 1) in inset 1102, in accordance with one or more embodiments of the present disclosure. As depicted in plot 1100, the confinement loss of the fundamental mode (LP01) is approximately two orders of magnitude lower than the higher-order modes, which may provide excellent fundamental mode performance.

FIG. 12 is a plot 1200 of confinement losses for different designs of an AR-HCF 100 with support structures 108 as well as for an AR fiber without support structures 108, in accordance with one or more embodiments of the present disclosure. Further, inset 1202 provides cross-sectional views of the various simulated designs. As shown in plot 1200, Designs 1-4 including support structures 108 all outperform the NANF design. Further, the inclusion of multiple nested AR elements 106 in Design 2 along with the support structures 108 provides substantially improved performance (e.g., over to over two orders of magnitude relative to the NANF for some wavelengths).

Referring now to FIG. 13, fabrication of an AR-HCF 100 with nested AR elements 106 having support structures 108 is described in greater detail, in accordance with one or more embodiments of the present disclosure. In a general sense, nested AR elements 106 with support structures 108 may be generated using any suitable technique.

Figure 13B:
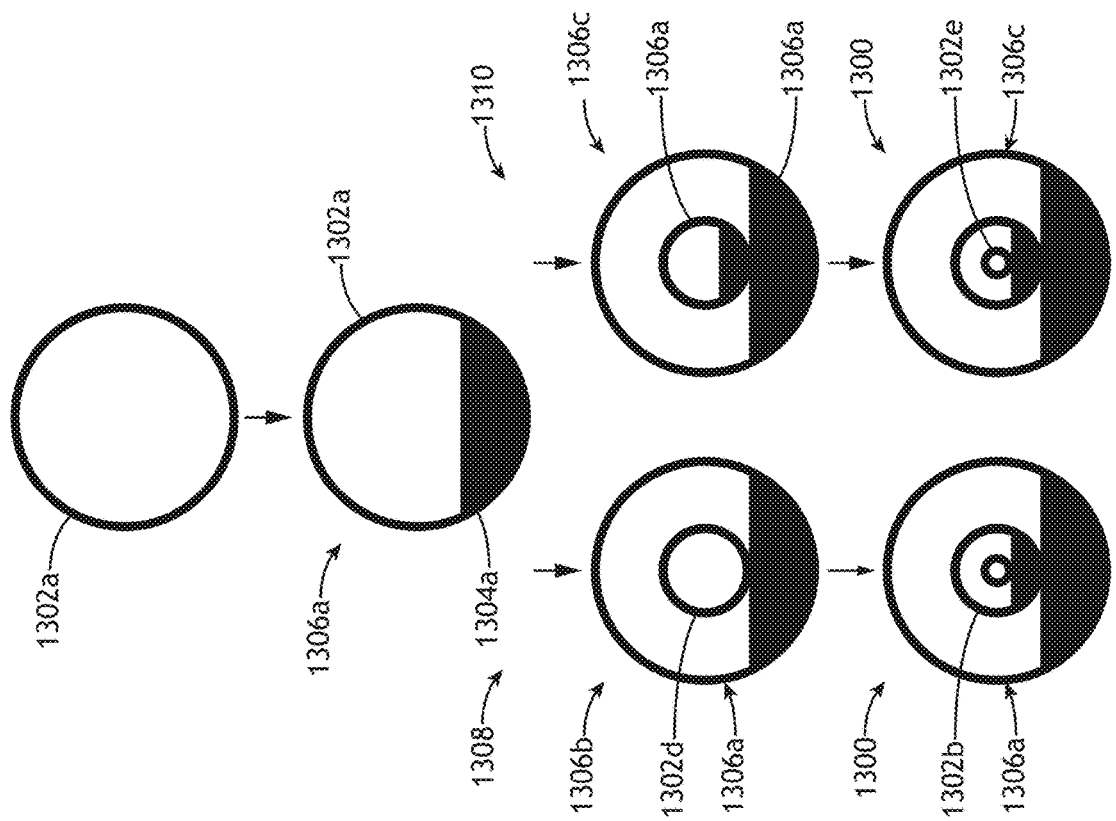
FIG. 13B shows multiple pathways for obtaining the final design of the nested-element preform, in accordance with one or more embodiments of the present disclosure.
Figure 13A:
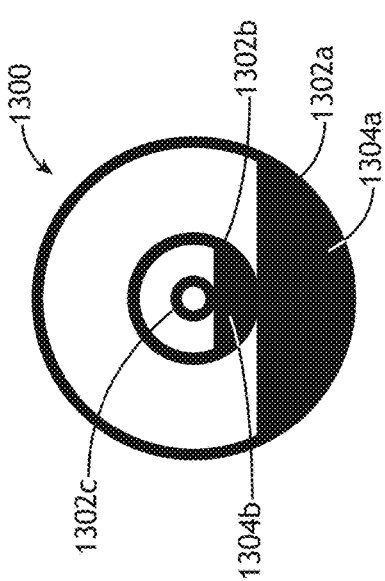
FIG. 13A is a simplified schematic illustrating the fabrication of a nested-element preform for a set of nested AR elements with support structures, in accordance with one or more embodiments of the present disclosure.

FIG. 13A is a simplified schematic illustrating the fabrication of a nested-element preform 1300 for a set of nested AR elements 106 with support structures 108, in accordance with one or more embodiments of the present disclosure. Although not shown multiple instances of such a nested-element preform 1300 (or different preforms with different designs) may be arranged along with cladding preforms to provide a full preform for an entire AR-HCF 100.

In some embodiments, such a nested-element preform 1300 for a set of nested AR elements 106 with support structures 108 may be fabricated in a single step by arranging various preform elements in a desired pattern. For example, the nested-element preform 1300 in FIG. 13A may be formed with a first tubular preform element 1302$a$, a first support structure preform element 1304$a$ nested within the first tubular preform element 1302$a$, a second tubular preform element 1302$b$ connected to the first support structure preform element 1304$a$, a second support structure preform element 1304$b$ within the second tubular preform element 1302$b$, and a third tubular preform element 1302$c$ connected to the second support structure preform element 1304$b$.

In some embodiments, one or more composite preforms are fabricated and drawn in order to scale down the dimensions. Such drawn down composite preforms may then be used as preform elements used to generate a more complex preform.

As an illustration, the nested-element preform 1300 in FIG. 13A may be fabricated in multiple steps. For example, a first composite preform element 1306$a$ may include a first tubular preform element 1302$a$ and a first support structure preform element 1304$a$ within the first tubular preform element 1302$a$. Multiple instances of this composite preform element 1306 may then be fabricated, either with the same dimensions or with dimensions that are scaled or otherwise modified.

FIG. 13B shows multiple pathways for obtaining the final design of the nested-element preform 1300, in accordance with one or more embodiments of the present disclosure.

In a first pathway 1308, a second composite preform element 1306$b$ is generated by adding an additional tubular preform element 1302$d$ to the first composite preform element 1306$a$. Finally, the nested-element preform 1300 may be formed by adding a drawn-down (e.g., scaled) instance of the second composite preform element 1306$b$ to the first composite preform element 1306$a$.

In a second pathway 1310, a third composite preform element 1306$c$ may be fabricated by placing a drawn-down (e.g., scaled) instance of the first composite preform element 1306$a$ within another original-size instance of the first composite preform element 1306$a$. Finally, the nested-element preform 1300 may be formed by adding an additional tubular preform element 1302$e$ to the third composite preform element 1306$c$.

It is to be understood that FIGS. 13A-B and the associated descriptions are provided solely for illustrative purposes and should not be interpreted as liming. For example, the particular nested-element preform 1300 may be fabricated using numerous techniques including individual or composite preform elements.

Further, as described previously herein, a support structure 108, and thus a support structure preform element 1304 need not be solid, but may be porous, include one or more air gaps extending along the fiber length, or the like. Additionally, any particular support structure 108 may be formed using a single support structure preform element 1304 or multiple support structure preform elements 1304. For example, although not shown, a particular support structure 108 may be formed using multiple support structure preform elements 1304, which may each have any shape including, but limited to, a rod or a tube. When drawn, such support structure preform elements 1304 may fuse together or may retain their shapes. As an illustration, a support structure 108 including air gaps that extend along the fiber length may be formed using one or more tubular support structure preform elements 1304 and/or a series of solid support structure preform elements 1304 arranged with air gaps between them.

Referring generally to FIGS. 1-13B, it is emphasized that any of the features of an AR-HCF 100 such as, but not limited to, AR elements 106, support structures 108, or cladding structures 102 may have any cross-sectional shape such as, but not limited to, a circle, an ellipse, a triangle, a square, a pentagon, a hexagon, a heptagon, an octagon, a figure "8," or the like. Any such shapes may be complete or truncated. Further, any such shapes may be solid, porous, tubular, or have air gaps extending along the fiber length. Finally, the various features of an AR-HCF 100 may be formed from a single composition or different compositions. In this way, the specific designs provided herein are merely illustrative and not limiting.

Referring now to FIGS. 14-25, designs of an AR-HCF 100 incorporating differently-sized AR elements 106 distributed around a circumference of the cladding structure 102 are described, in accordance with one or more embodiments of the present disclosure.

In embodiments, an AR-HCF 100 includes a first set of AR elements 106 distributed around an interior wall of a cladding structure 102, where the first set of AR elements 106 include negative curvature elements surrounding a hollow core to provide light guiding within the hollow core through optical anti-resonance. Any of the AR elements 106 within this first set of AR elements 106 may include, but is not required to include, multiple nested AR elements 106. It is contemplated herein that such a configuration of an AR-HCF 100 may provide high light confinement and low losses when the fiber is straight, but may exhibit light leakage and thus increased loss when the fiber is bent at certain diameters. Accordingly, in embodiments, an AR-HCF 100 further includes a second set of AR elements 106 distributed around the interior wall of the cladding and interleaved with the first set of AR elements 106. This second set of AR elements 106 may aid in the confinement of light even and enable low-loss performance for a greater range of bend diameters than achievable without these elements. In some cases, the second set of AR elements 106 is smaller than (e.g., has outer dimensions smaller than) the first set of AR elements 106. In this way, the guiding of light through optical anti-resonance under nominal conditions (e.g., a straight fiber) may be provided primarily based on the design of the first set of AR elements 106, whereas the second set of AR elements 106 may supplement and improve guiding performance under various bending conditions (e.g., microbending, macrobending, or the like). However, it is to be understood that the guiding performance of light in an AR-HCF 100 may be impacted by all elements of the fiber including the first and second sets of AR elements. In this way, the above characterization is merely illustrative and should not be interpreted as limiting the scope of the present disclosure.

In some embodiments, an AR-HCF 100 includes multiple AR elements 106 distributed in the hollow interior region 104 provided by the cladding structures 102. An AR-HCF 100 may generally have any number of AR elements 106 located at any locations or distribution of locations within the hollow interior region 104. For example, the AR-HCF 100 may include one or more sets of AR elements 106 distributed evenly or unevenly around a perimeter of the hollow interior region 104, where any such AR elements 106 may be in direct contact with a cladding structure 102 or may be separated from the cladding structure 102 by additional elements. For example, designs of an AR-HCF 100 including additional elements between AR elements 106 and a cladding structure 102 are described in U.S. Provisional Patent Application 63/465,716 filed on May 11, 2023, U.S. Provisional Patent Application 63/465,762 filed on May 11, 2023, and U.S. Provisional Patent Application 63/470,560 filed on Jun. 2, 2023, which are all incorporated herein by reference in their entireties.

FIGS. 14-25 depict different designs of AR-HCFs 100 with two sets of AR elements 106 distributed around a perimeter of a hollow interior region 104. It is to be understood that FIGS. 14-25 are provided merely for illustrative purposes and should not be interpreted as limiting on the scope of the present disclosure.

Figure 14:
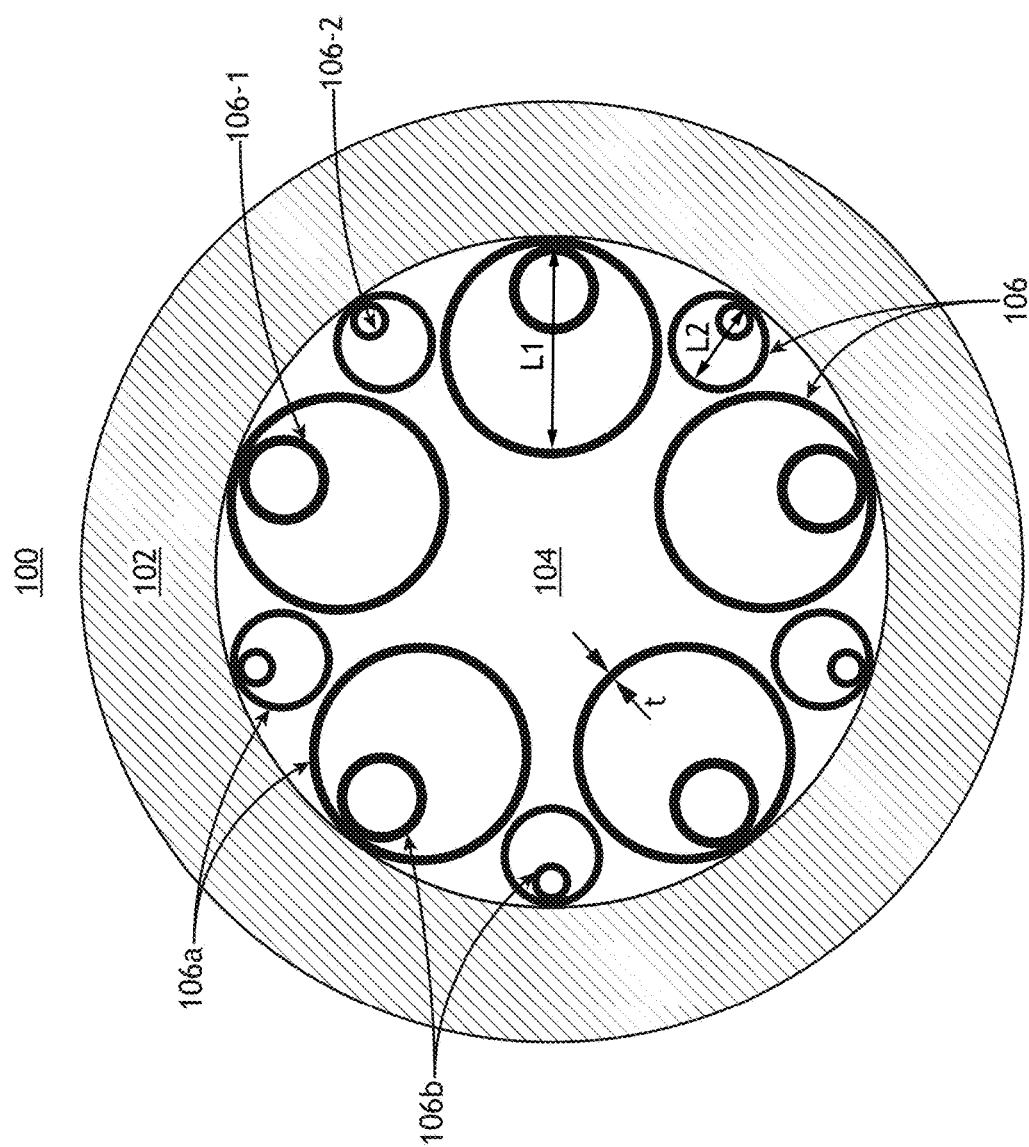
FIG. 14 is a cross-sectional view of one design of an AR-HCF, in accordance with one or more embodiments of the present disclosure.

FIG. 14 is a cross-sectional view of one design of an AR-HCF 100, in accordance with one or more embodiments of the present disclosure. In FIG. 14, the AR-HCF 100 includes a first set of five AR elements 106-1 and a second set of five AR elements 106-2 interleaved with the first set of AR elements 106-1. In this configuration, an outer dimension $L_1$ of the first set of AR elements 106-1 is larger than an outer dimension $L_2$ of the second set of AR elements 106-2. In this way, the hollow interior region 104 in which light is guided is primarily defined by the first set of AR elements 106-1.

FIG. 14 further depicts a configuration in which both the first set of AR elements 106-1 and the second set of AR elements 106-2 include multiple instances of a pattern of nested AR elements 106, except that the sizes of the constituent AR elements 106 are different. For example, each instance includes a first AR element 106*a* (e.g., an outer AR element 106) and a second AR element 106*b* (e.g., an inner AR element 106). In this configuration, all of the AR elements 106 have a common wall thickness t, though this is not a requirement. Further, in this configuration, the first set of AR elements 106-1 are spatially separated from (e.g., not in contact with) the second set of AR elements 106-2. However, this is not a requirement. In some embodiments, at least one of the first set of AR elements 106-1 contacts at least one of the second set of AR elements 106-2.

FIG. 15 is a cross-sectional view of one design of an AR-HCF 100, in accordance with one or more embodiments of the present disclosure. The design depicted in FIG. 15 is substantially similar to the design depicted in FIG. 14, except that the second set of AR elements 106-2 lacks the second AR element 106*b* (e.g., the inner AR element 106).

Figure 16:
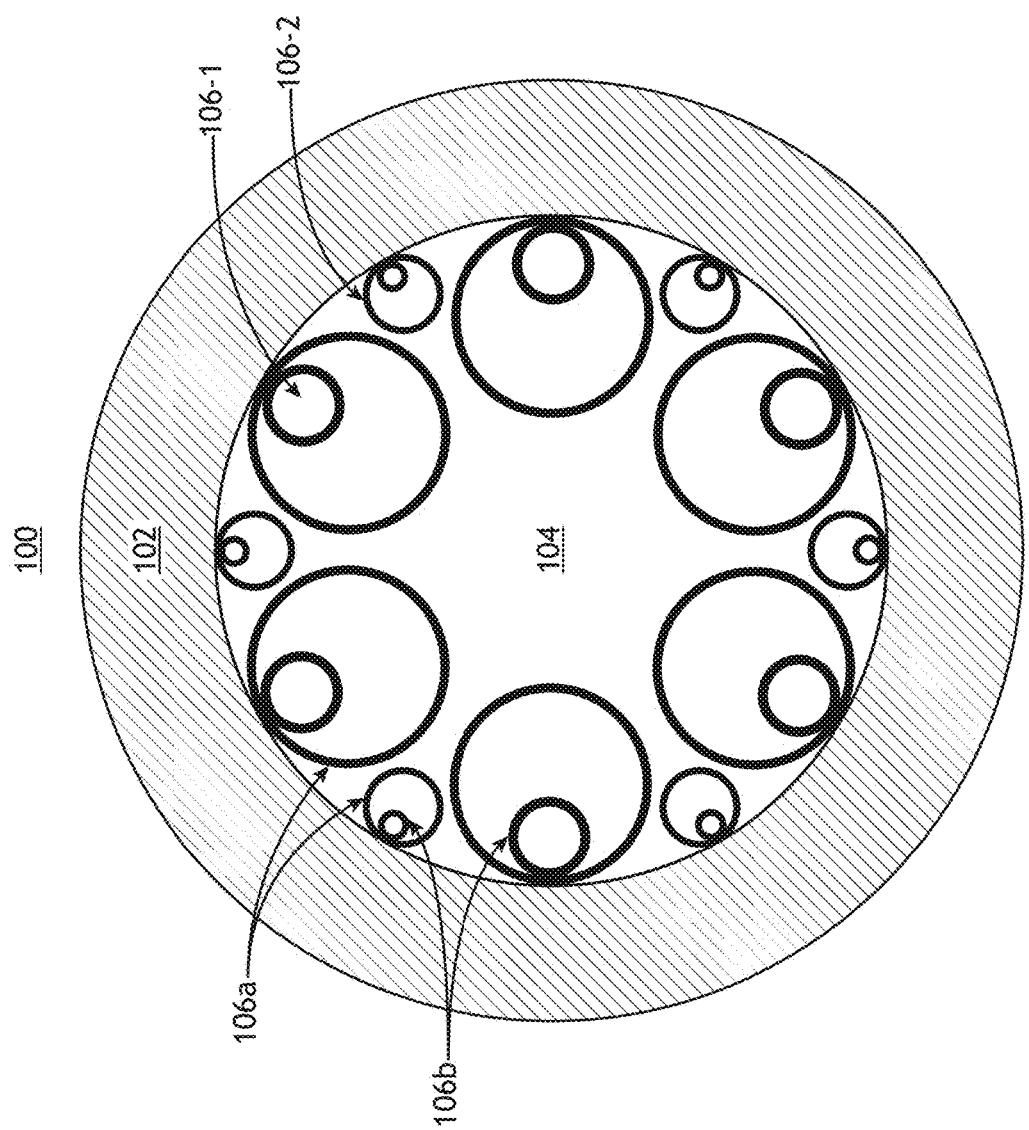
FIG. 16 is a cross-sectional view of one design of an AR-HCF, in accordance with one or more embodiments of the present disclosure.

FIG. 16 is a cross-sectional view of one design of an AR-HCF 100, in accordance with one or more embodiments of the present disclosure. The design depicted in FIG. 16 is substantially similar to the design depicted in FIG. 14, except that the design depicted in FIG. 16 includes six instances of nested AR elements 106 in both the first set of AR elements 106-1 and the second set of AR elements 106-2.

Figure 17:
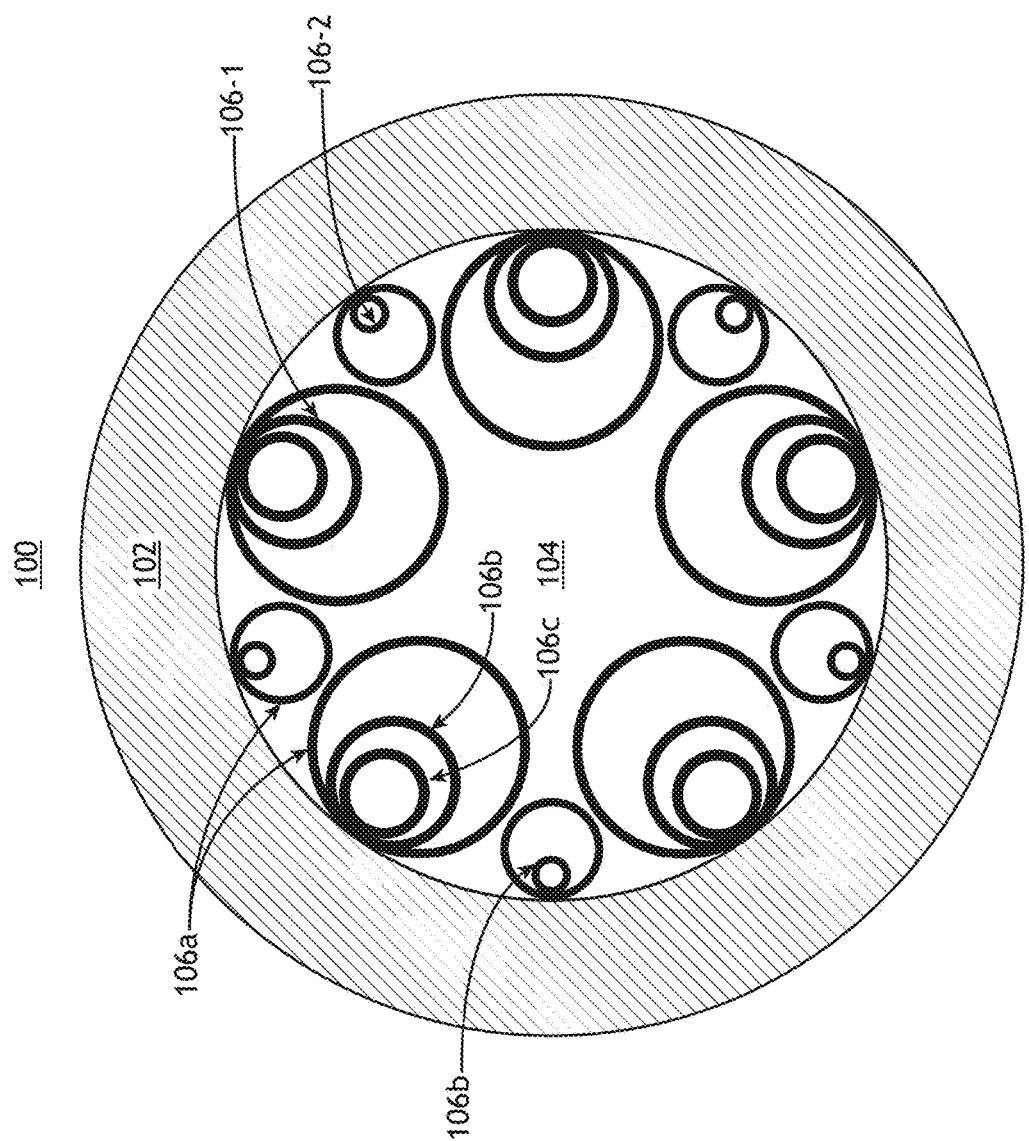
FIG. 17 is a cross-sectional view of one design of an AR-HCF, in accordance with one or more embodiments of the present disclosure.

FIG. 17 is a cross-sectional view of one design of an AR-HCF 100, in accordance with one or more embodiments of the present disclosure. The design depicted in FIG. 17 is substantially similar to the design depicted in FIG. 14, except that the first set of AR elements 106-1 includes third AR elements 106c within an interior region of the second AR elements 106b.

Figure 18:
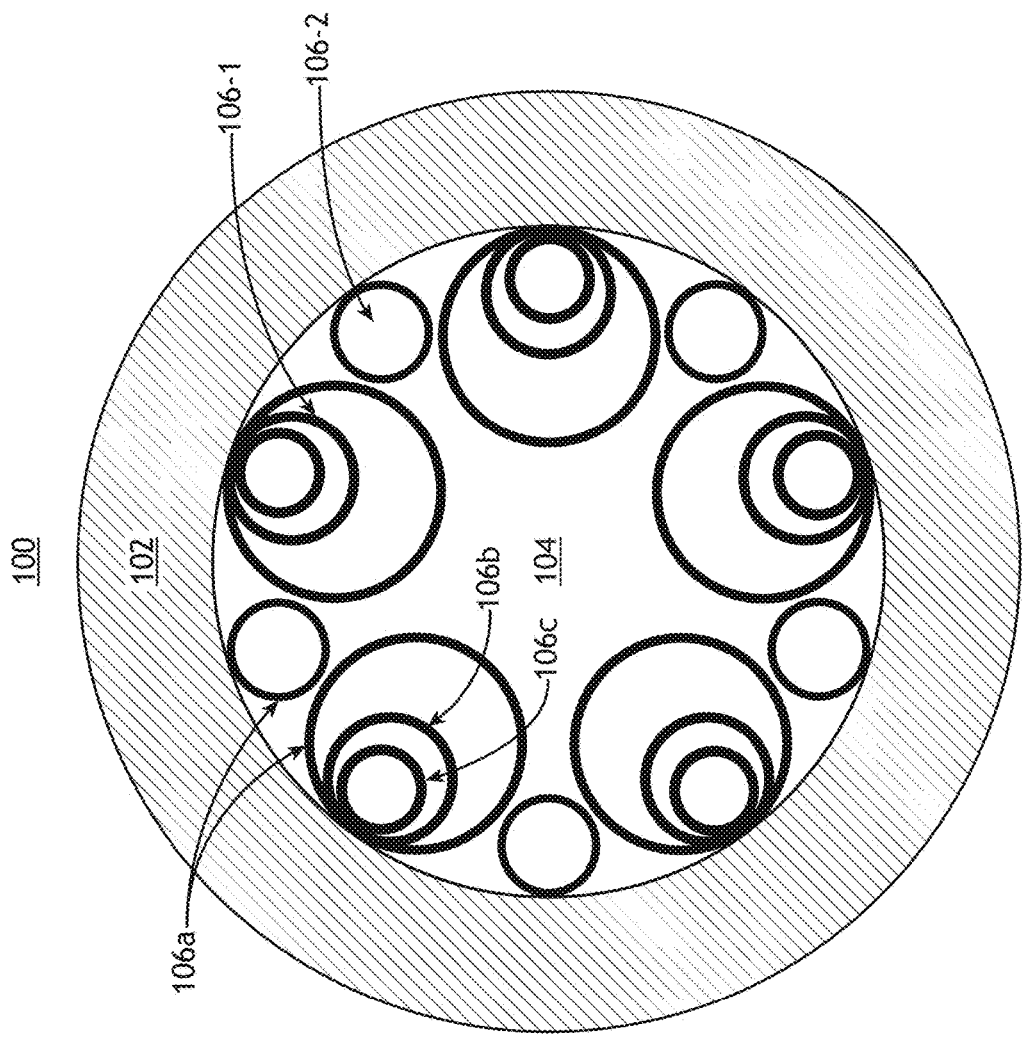
FIG. 18 is a cross-sectional view of a fifth design of an AR-HCF, in accordance with one or more embodiments of the present disclosure.

FIG. 18 is a cross-sectional view of a fifth design of an AR-HCF 100, in accordance with one or more embodiments of the present disclosure. In FIG. 18, the first set of AR elements 106-1 is substantially the same as the first set of AR elements 106-1 in the design depicted in FIG. 17, while the second set of AR elements 106-2 is substantially the same as the second set of AR elements 106-2 in the design depicted in FIG. 15.

Figure 19:
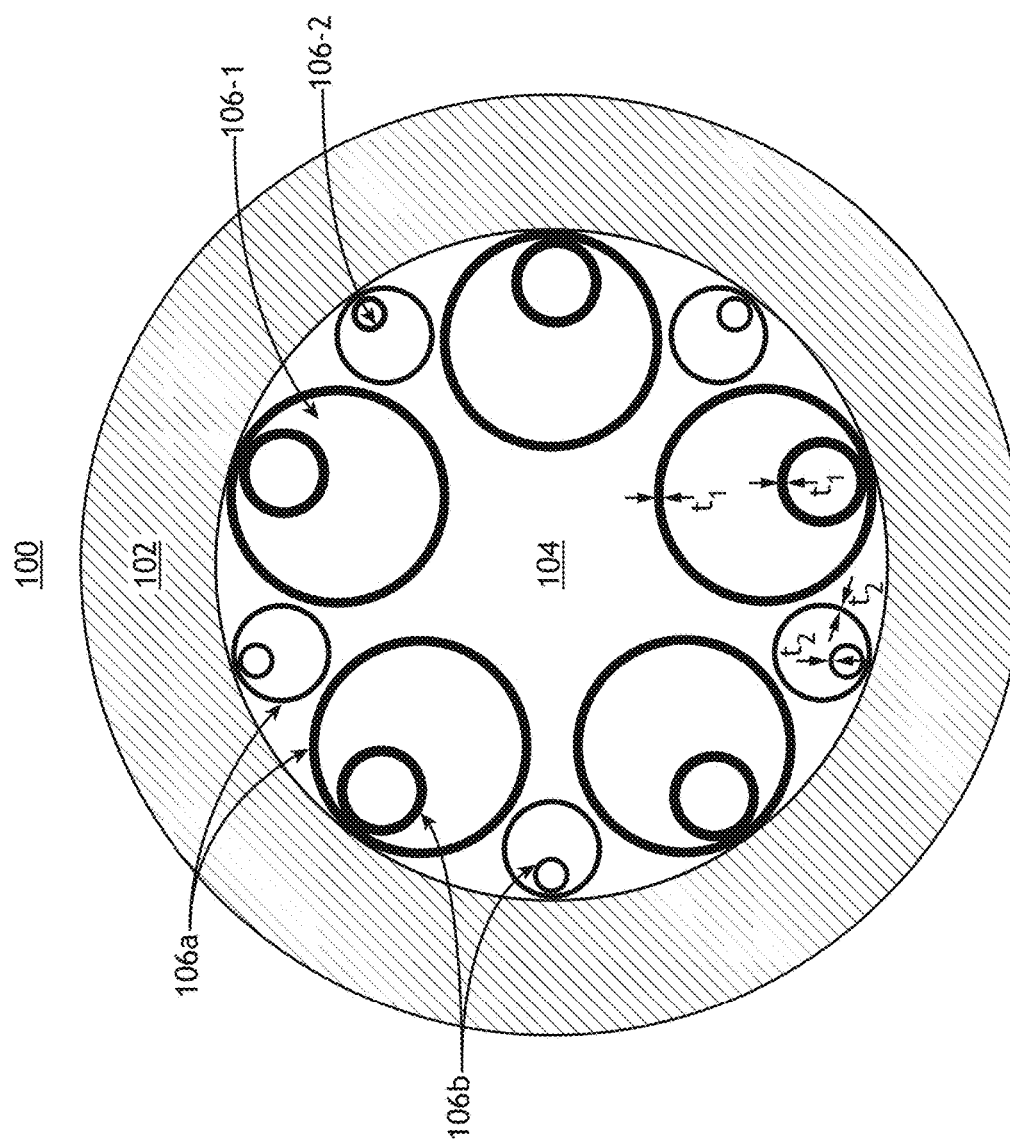
FIG. 19 is a cross-sectional view of one design of an AR-HCF, in accordance with one or more embodiments of the present disclosure.

FIG. 19 is a cross-sectional view of one design of an AR-HCF 100, in accordance with one or more embodiments of the present disclosure. The design depicted in FIG. 19 is substantially similar to the design depicted in FIG. 14, except that the wall thicknesses of the first set of AR elements 106-1 ($t_1$) is different than the wall thicknesses of the second set of AR elements 106-2 ($t_2$). FIG. 19 is merely illustrative, however, and any wall of any AR element 106 may have any thickness.

Figure 21:
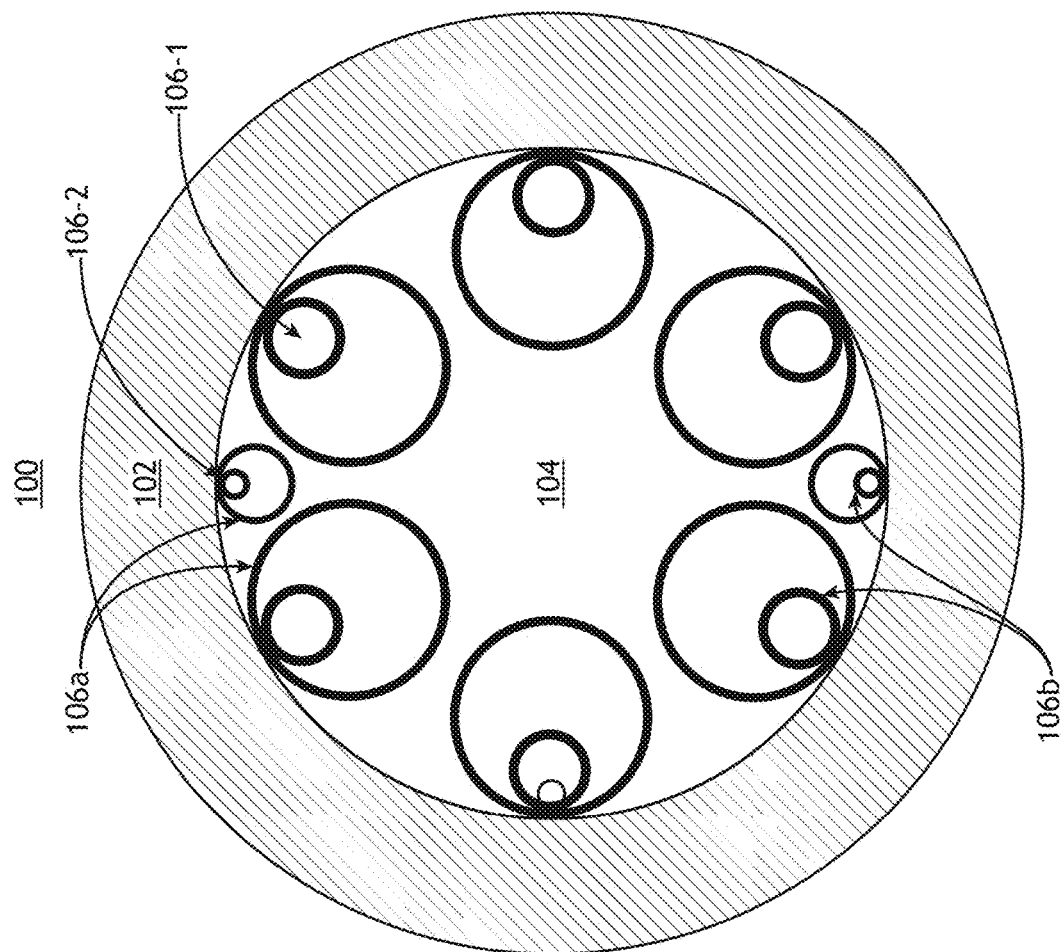
FIG. 21 is a cross-sectional view of one design of an AR-HCF, in accordance with one or more embodiments of the present disclosure.
Figure 22:
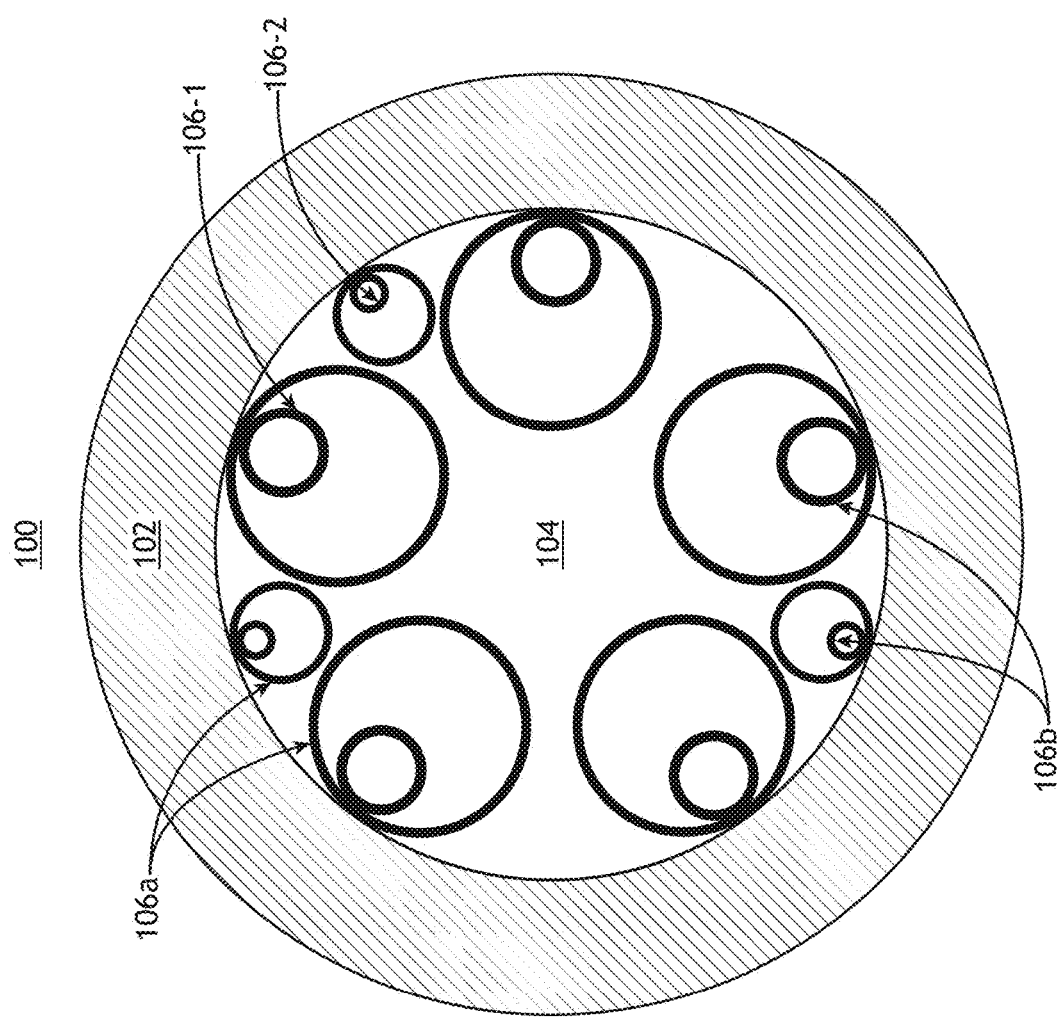
FIG. 22 is a cross-sectional view of one design of an AR-HCF, in accordance with one or more embodiments of the present disclosure.
Figure 23:
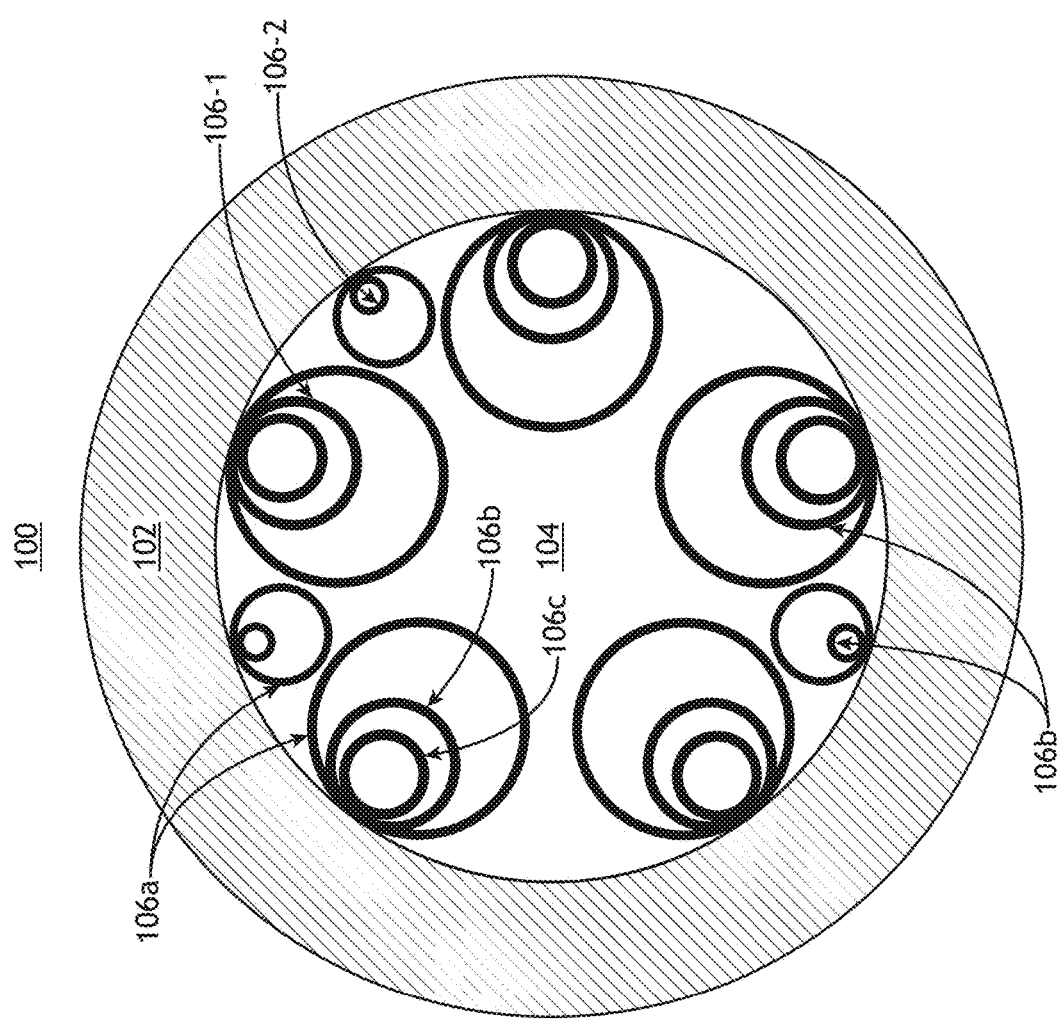
FIG. 23 is a cross-sectional view of one design of an AR-HCF, in accordance with one or more embodiments of the present disclosure.

It is noted that FIGS. 14-19 depicted designs of an AR-HCF 100 in which a first set of AR elements 106-1 and a second set of AR elements 106-2 have common numbers of constituent features. Referring now to FIGS. 20-23, designs of an AR-HCF 100 having different numbers of features in different sets of AR elements 106 are shown. Further, FIG. 20 depicts a configuration in which at least some of the AR elements 106 are symmetrically distributed around a perimeter of the hollow interior region 104, which may provide polarization-independent guiding of light. FIGS. 21-23 depict configurations in which at least some of the AR elements 106 are asymmetrically distributed around a perimeter of the hollow interior region 104, which may provide polarization-sensitive (e.g., polarization-maintaining) guiding of light.

FIG. 20 is a cross-sectional view of one design of an AR-HCF 100, in accordance with one or more embodiments of the present disclosure. The design depicted in FIG. 20 is substantially similar to the design depicted in FIG. 16, except that the second set of AR elements 106-2 includes three instances of nested AR elements 106 rather than 6. Additionally, the second set of AR elements 106-2 are symmetrically distributed around a perimeter of the hollow interior region 104.

FIG. 21 is a cross-sectional view of one design of an AR-HCF 100, in accordance with one or more embodiments of the present disclosure. The design depicted in FIG. 21 is substantially similar to the design depicted in FIG. 20, except that the second set of AR elements 106-2 has only two AR elements 106, which are distributed on opposite sides of the AR-HCF 100.

FIG. 22 is a cross-sectional view of one design of an AR-HCF 100, in accordance with one or more embodiments of the present disclosure. In FIG. 22, the AR-HCF 100 includes a first set of five AR elements 106-1 and a second set of three AR elements 106-2 interleaved with the first set of AR elements 106-1. Notably, the second set of AR elements 106-2 in this configuration provide an asymmetric configuration. Further, the design of the first set of AR elements 106-1 and the second set of AR elements 106-2 is the same as shown in FIG. 14.

FIG. 23 is a cross-sectional view of one design of an AR-HCF 100, in accordance with one or more embodiments of the present disclosure. In FIG. 23, the first set of AR elements 106-1 is the same as depicted in the design of FIG. 17, but the second set of AR elements 106 is the same as depicted in the design of FIG. 22.

Referring generally to FIGS. 14-23, it is to be understood that FIGS. 14-23 are provided merely for illustrative purposes and should not be interpreted as limiting the scope of the present disclosure. For example, an AR-HCF 100 may include any number of sets of AR elements 106 having different sizes and/or designs of constituent features. In this way, the depiction of only two sets of AR elements 106 in FIGS. 14-23 is merely illustrative. As another example, any particular set of AR elements 106 may have any combination of AR elements 106 with any selected size, shape, wall thickness, or any other property. Further, any particular set of AR elements 106 may have any number of nested AR elements 106 in any arrangement. For instance, any AR element 106 may be attached to a wall of a cladding structure 102 or may be attached to any other feature such as, but not limited to, another AR element 106 of any shape, or a support structure that does not itself provide anti-resonant properties. As another example, the AR-HCF 100 may include any number or design of cladding structures 102. Designs of AR-HCFs 100 are generally described in U.S. Provisional Patent Application 63/465,716 filed on May 11, 2023, U.S. Provisional Patent Application 63/465,762 filed on May 11, 2023, and U.S. Provisional Patent Application 63/470,560 filed on Jun. 2, 2023, which are all incorporated herein by reference in their entireties. It is contemplated herein that any of the designs of AR-HCFs 100 or nested sets of AR elements 106 in U.S. Provisional Patent Applications 63/465,716, 63/465,762, and/or 63/470,560 may be extended to include multiple sets of AR elements 106 with different properties as described herein to provide enhanced bending performance.

Figure 24:
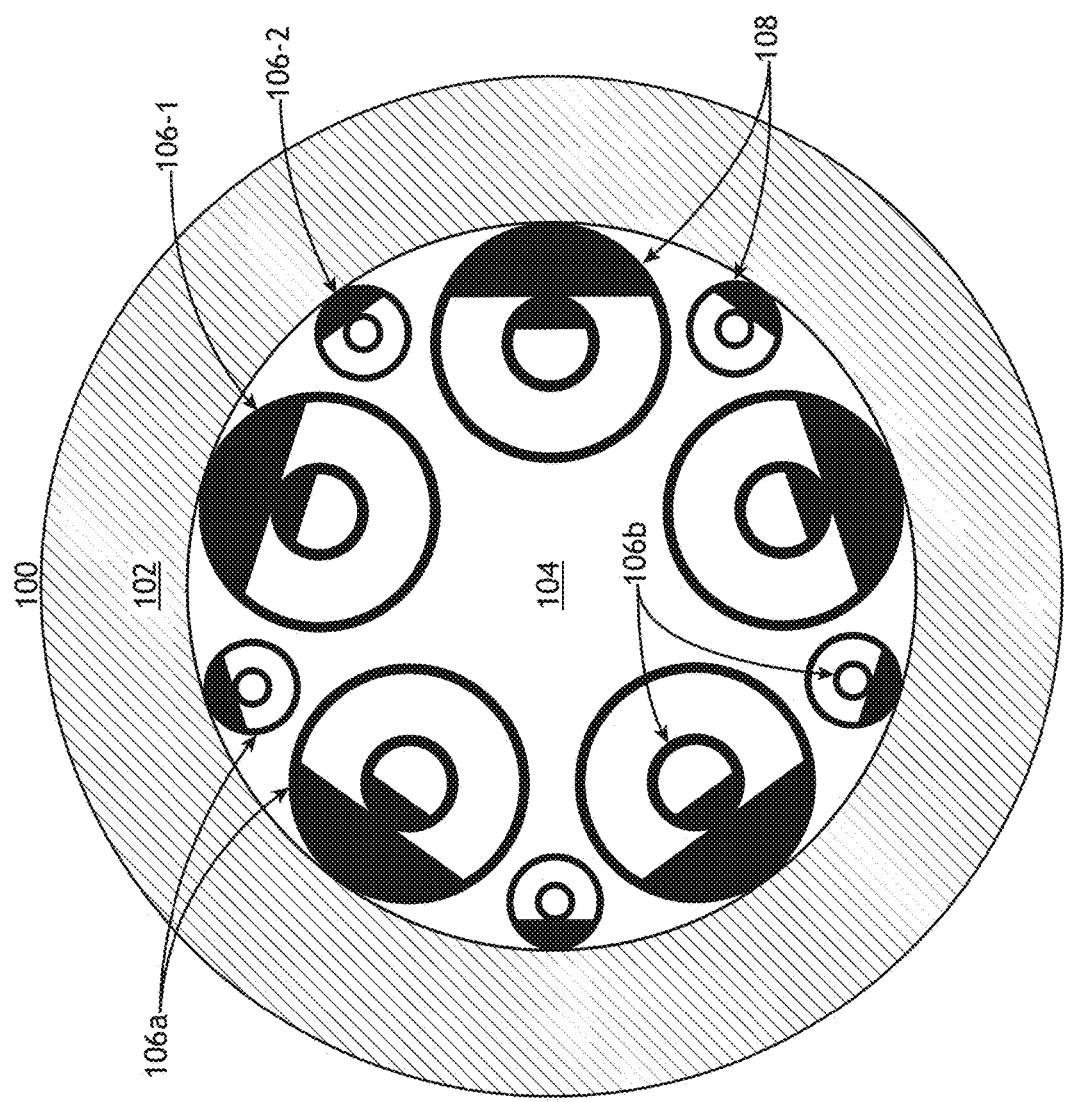
FIG. 24 is a cross-sectional view of one design of an AR elements, in accordance with one or more embodiments of the present disclosure.

As an illustration, FIG. 24 is a cross-sectional view of one design of an AR elements 106, in accordance with one or more embodiments of the present disclosure. The design depicted in FIG. 24 is substantially similar to the design depicted in FIG. 14, except that the inner AR element 106b within all instances of both the first set of AR elements 106-1 and the second set of AR elements 106-2 is connected to a support structure 108. The embodiments shown in FIGS. 15-23 may similarly include support structures. These support structures, like those shown in FIG. 24, may be separate from the AR elements 106 or may be a part of the AR elements 106. Support structures may exist within inner AR elements, either separate from those AR elements or combined with those AR elements.

Referring now to FIG. 25, the bending performance of selected designs of an AR-HCF 100 is described. FIG. 25 is a plot 2500 of confinement losses for the fundamental mode (LP01) and higher-order modes (LP11) for an AR-HCF 100 with a traditional nested AR nodeless fiber (NANF) design including only a single set of AR elements 106 (shown in panel 2502) along with an AR-HCF 100 with the design depicted in FIG. 14 (shown in panel 2504), in accordance with one or more embodiments of the present disclosure. As depicted in plot 2500, the design depicted in FIG. 14 including multiple sets of AR elements 106 with different sizes have superior bending performance. In some cases, an AR-HCF 100 as disclosed herein with multiple sets of AR elements 106 with different sizes provides a microbending and/or macrobending loss improvement of at least 10%.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical fiber comprising:
   a cladding structure extending along a fiber length providing a hollow interior fiber region; and
   a plurality of anti-resonant (AR) elements formed as walled structures with walls extending along the fiber length, wherein the plurality of AR elements is configured to guide light along the fiber length in a central portion of the hollow interior fiber region based on optical anti-resonance, wherein the plurality of AR elements includes at least one nested set of AR elements comprising:
      a first AR element formed as a wall extending along the fiber length and located entirely within the hollow interior fiber region, wherein the wall of the first AR element, in a cross-sectional plane orthogonal to the fiber length, fully surrounds an interior region and further has a non-uniform thickness profile between the first interior region and an outer perimeter of the first AR element, wherein the non-uniform thickness profile forms a support structure with a solid shape in the cross-sectional plane; and
      a second AR element located within the interior region of the first AR element and exclusively in contact with the support structure.

2. The optical fiber of claim 1, wherein a fill factor defined as a ratio of an area of the walls of the first AR element in the cross-sectional plane to an area of the first AR element bounded by an outer face in the cross-sectional plane is at least 20%.

3. The optical fiber of claim 1, wherein the second AR element is connected to the support structure at one or more contact points, wherein the non-uniform thickness profile of the first AR element is selected to provide selected separation distances between the one or more contact points and an outer face of the first AR element.

4. The optical fiber of claim 3, wherein the second AR element is connected to the support structure at two or more contact points.

5. The optical fiber of claim 1, wherein the support structure is porous.

6. The optical fiber of claim 1, wherein the support structure is shaped as at least one of an ellipse or a circle in the cross-sectional plane.

7. The optical fiber of claim 1, wherein the support structure is shaped as at least one of a truncated ellipse or a truncated circle in a cross-sectional plane.

8. The optical fiber of claim 1, wherein the at least one set of nested AR elements further comprises:
   one or more additional second AR elements located within an interior region of the first AR element bounded at least in part by the walls of the second AR element and attached to the support structure.

9. The optical fiber of claim 1, wherein the at least one set of nested AR elements further comprises:
   a third AR element of the plurality of AR elements located within an interior region of the second AR element bounded at least in part by the walls of the second AR element.

10. The optical fiber of claim 9, wherein the third AR element is connected to one or more additional support structures.

11. The optical fiber of claim 1, wherein the plurality of AR elements is divided into two or more sets of AR elements, wherein each of the two or more sets of AR elements is connected to at least one of the cladding structure or one or more additional support structures, wherein the two or more sets of AR elements comprise:
    a first set of AR elements having a first design; and
    a second set of AR elements having a second design.

12. An optical fiber comprising:
    a cladding structure extending along a fiber length providing a hollow interior fiber region; and
    one or more nested sets of anti-resonant (AR) elements formed as walled structures with walls extending along the fiber length, wherein a particular one of the one or more nested sets of AR elements comprises:
       a first AR element formed as a wall extending along the fiber length and located entirely within the hollow interior fiber region, wherein the wall of the first AR element, in a cross-sectional plane orthogonal to the fiber length, fully surrounds an interior region; and
       a second AR element within the interior region of the first AR element, wherein the second AR element is exclusively coupled with a slab support structure and positioned with the interior region by the slab support structure, wherein the slab support structure has a non-uniform thickness profile, wherein the one or more nested sets of AR elements are configured to guide light along the fiber length in a central portion of the hollow interior fiber region based on optical anti-resonance.

13. The optical fiber of claim 12, wherein the slab support structure is formed from the walls of the first AR element, wherein the walls of the first AR element have the non-uniform thickness profile in a cross-sectional plane defining a shape of the slab support structure, wherein the cross-sectional plane is orthogonal to a direction along the fiber length.

14. The optical fiber of claim 13, wherein a fill factor defined as a ratio of an area of the walls of the first AR element in the cross-sectional plane to an area of the first AR element bounded by an outer face in the cross-sectional plane is at least 20%.

15. The optical fiber of claim 12, wherein the second AR element is connected to the slab support structure at one or more contact points, wherein the non-uniform thickness profile of the slab support structure is selected to provide selected separation distances between the one or more contact points and an outer face of the first AR element.

16. The optical fiber of claim 15, wherein the second AR element is connected to the slab support structure at two or more contact points.

17. The optical fiber of claim 12, wherein the slab support structure is porous.

\* \* \* \* \*